United States Patent
Mehrvar et al.

(10) Patent No.: US 9,491,120 B2
(45) Date of Patent: Nov. 8, 2016

(54) METHOD FOR CROSSTALK AND POWER OPTIMIZATION IN SILICON PHOTONIC BASED SWITCH MATRICES

(71) Applicant: Huawei Technologies Co., Ltd., Shenzhen (CN)

(72) Inventors: Hamid Mehrvar, Kanata (CA); Yi Qian, Shenzhen (CN); Patrick Dumais, Ottawa (CA); Dominic John Goodwill, Ottawa (CA); Eric Bernier, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 14/018,273

(22) Filed: Sep. 4, 2013

(65) Prior Publication Data

US 2014/0328154 A1 Nov. 6, 2014

Related U.S. Application Data

(60) Provisional application No. 61/818,296, filed on May 1, 2013.

(51) Int. Cl.
*H04J 1/12* (2006.01)
*H04L 12/947* (2013.01)
*H04Q 11/00* (2006.01)

(52) U.S. Cl.
CPC .......... *H04L 49/25* (2013.01); *H04Q 11/0005* (2013.01); *H04Q 2011/0049* (2013.01); *H04Q 2011/0054* (2013.01)

(58) Field of Classification Search
None
See application file for complete search history.

(56) References Cited

U.S. PATENT DOCUMENTS

| 4,932,735 A | 6/1990 | Koai |
| 5,258,978 A | 11/1993 | Cloonan et al. |

(Continued)

FOREIGN PATENT DOCUMENTS

| CN | 1392696 A | | 1/2003 |
| CN | 1392696 A | * | 1/2003 |

(Continued)

OTHER PUBLICATIONS

Bianco, A., "Optical Interconnection Networks Based on Microring Resonators," Journal of Optical Communications and Networking, IEEE/OSA, vol. 4, No. 7, pp. 546-556, Jul. 2012.
Chen, L., et al., "Compact, Low-loss and Low-power 8×8 Broadband Silicon Optical Switch," Optics Express, vol. 20, No. 17, Aug. 13, 2012, 9 pages.

(Continued)

*Primary Examiner* — Willie J Daniel, Jr.
(74) *Attorney, Agent, or Firm* — Slater Matsil, LLP

(57) ABSTRACT

Crosstalk can be suppressed in photonic switching fabrics by activating unused photonic elements in a manner that manipulates the inactive connections and inhibits the propagation of cross-talk over the switching fabric. For example, unused photonic elements can be set to a cross or bar configuration to block first and second order crosstalk from propagating to the output ports, thereby reducing noise in the output signals. All of the unused elements can be activated in order to maximize crosstalk suppression. Alternatively, fewer than all of the unused elements may be activated to achieve a balance between crosstalk suppression and power conservation. Photonic switch architectures can be configured to use pre-determined cross-talk suppression maps (e.g., patterns of activated unused cells) for the various switching configurations, which may be computed using a recursive algorithm.

23 Claims, 53 Drawing Sheets

(56) References Cited

U.S. PATENT DOCUMENTS

| | | | |
|---|---|---|---|
| 5,467,211 A | | 11/1995 | Haney et al. |
| 5,570,218 A | | 10/1996 | Sotom |
| 5,737,103 A | * | 4/1998 | Jackel .................... H04B 10/85 |
| | | | 398/45 |
| 6,335,930 B1 | | 1/2002 | Lee |
| 6,567,573 B1 | | 5/2003 | Domash et al. |
| 8,792,787 B1 | | 7/2014 | Zhao et al. |
| 9,282,384 B1 | | 3/2016 | Graves |
| 2003/0035165 A1 | | 2/2003 | Schofield |
| 2003/0235145 A1 | * | 12/2003 | Shanbhag ............... H04J 14/02 |
| | | | 370/201 |
| 2014/0161447 A1 | | 6/2014 | Graves et al. |
| 2014/0161450 A1 | | 6/2014 | Graves et al. |
| 2014/0269351 A1 | | 9/2014 | Graves et al. |
| 2014/0334818 A1 | | 11/2014 | Mehrvar |
| 2014/0334819 A1 | | 11/2014 | Mehrvar et al. |
| 2014/0334821 A1 | | 11/2014 | Mehrvar |
| 2015/0055951 A1 | * | 2/2015 | Mehrvar ............ H04Q 11/0005 |
| | | | 398/45 |
| 2015/0350753 A1 | | 12/2015 | Mehrvar |

FOREIGN PATENT DOCUMENTS

| | | |
|---|---|---|
| EP | 2365703 A2 | 9/2011 |
| WO | 2013028241 A1 | 2/2013 |

OTHER PUBLICATIONS

Chen, L., "Silicon Photonic Integrated Circuits for WDM Technology and Optical Switch," Optical Society of America Optical Fiber Communication Conference, Mar. 17-21, 2013, 3 pages.

Nashimoto, K., et al., "Nano-Second Response, Polarization Insensitive and Low-Power Consumption PLZT 4×4 Matrix Optical Switch." Optical Society of America Optical Fiber Communication Conference, Mar. 6-10, 2011, 3 pages.

International Search Report and Written Opinion received in International Application No. PCT/CN2014/076534 mailed Jul. 28, 2014, 12 pages.

Bianco, A., "Optical Switch Architectures Based on Microring Resonators," Dipartimento di Elettronica e Telecomunicazioni Politecnico di Torino Italy, Ajaccio, Corse, Sep. 2012, 36 pages.

International Search Report received in Application No. PCT/US14/63541 mailed Apr. 3, 2015, 8 pages.

Kabacinski, W., "Modified Dilated Benes Networks for Photonic Switching," IEEE Transactions on Communications, vol. 47, No. 8, Aug. 1999, pp. 1253-1259.

Qian, Y., et al., "Crosstalk Optimization in Low Extinction-Ratio Switch Fabrics," Optical Fiber Communications conference and Exhibition (OFC), Mar. 2014, San Francisco, CA, pp. 1-3.

Song, G., "Asymmetric Dilation of Multiwavelength Cross-Connect Switches for Low-Crosstalk WDM Optical Networks," Journal of Lightwave Technology, vol.15, No. 3, Mar. 1997, pp. 430-436.

* cited by examiner

| | OCCURRENCE | 1ST | 2ND | 3RD | 4TH | 5TH |
|---|---|---|---|---|---|---|
| CLASS 1 | 4608 | 0 | 1 | 2 | 4 | 0 |
| CLASS 2 | 2880 | 0 | 1 | 4 | 2 | 0 |
| CLASS 3 | 4608 | 0 | 1 | 3 | 3 | 0 |
| CLASS 4 | 4608 | 0 | 0 | 5 | 2 | 0 |
| CLASS 5 | 11520 | 0 | 0 | 4 | 3 | 0 |
| CLASS 6 | 3072 | 0 | 1 | 1 | 5 | 0 |
| CLASS 7 | 4608 | 0 | 0 | 3 | 4 | 0 |
| CLASS 8 | 1536 | 0 | 1 | 2 | 3 | 1 |
| CLASS 9 | 768 | 0 | 0 | 3 | 3 | 1 |
| CLASS 10 | 1536 | 0 | 0 | 2 | 5 | 0 |
| CLASS 11 | 576 | 0 | 1 | 0 | 6 | 0 |

| RESULTS/ METHOD | FIRST CROSS-TALK | SECOND CROSS-TALK | THIRD CROSS-TALK | FOURTH CROSS-TALK | FIFTH CROSS-TALK | AVERAGE ELECTRICAL LEVEL | AVERAGE GLOBAL POWER | NUMBER OF IDLE CELLS ASSIGNED | ACTUAL ASSIGNED NUMBER |
|---|---|---|---|---|---|---|---|---|---|
| -3db SPLITTER OR COUPLER (NO CROSSTALK OPTIMIZATION) | 0 | 1.2857 WORST CASE: 3 | 0 | 0 | 0 | 0.0204 | 42.4 | 0 | 0 |
| St:5 INACTIVE CELLS REDEFINED | 0 | 1.169047 | 0.495238 | 0 | 0 | 0.0195 | 46.9 | 8 | 0 TO 8 |
| FIXED-16 | 0 | 0.992225 | 0.997018 | 0 | 0 | 0.0177 | 51.9 | 16 | FIXED |
| St.4 INACTIVE CELLS REDEFINED | 0 | 1 | 0.952380 | 0 | 0 | 0.0177 | 52.8 | 24 | 0 TO 24 |
| St.4 AND 5 INACTIVE CELLS REDEFINED | 0 | 0.964286 | 1.038095 | 0.190476 | 0 | 0.0174 | 54.3 | 32 | 0 TO 32 |
| FIXED-40 | 0 | 0.80729 | 2.485125 | 0 | 0 | 0.0178 | 61.8 | 40 | FIXED |
| St.3 AND 4 INACTIVE CELLS REDEFINED | 0 | 0.714286 | 2.857143 | 0 | 0 | 0.0170 | 65 | 48 | FIXED |
| ALL IDLE OFF (CROSS) | 0 | 0.714286 | 2.571429 | 3.714286 | 0 | 0.0174 | 68 | 64 | FIXED |
| PERFORMANCE OPTIMIZED | 0 | 0.4286 | 3.2 | 3.3143 | 0.0571 | 0.014 | 71.9 | 64 | FIXED |

FIG. 11

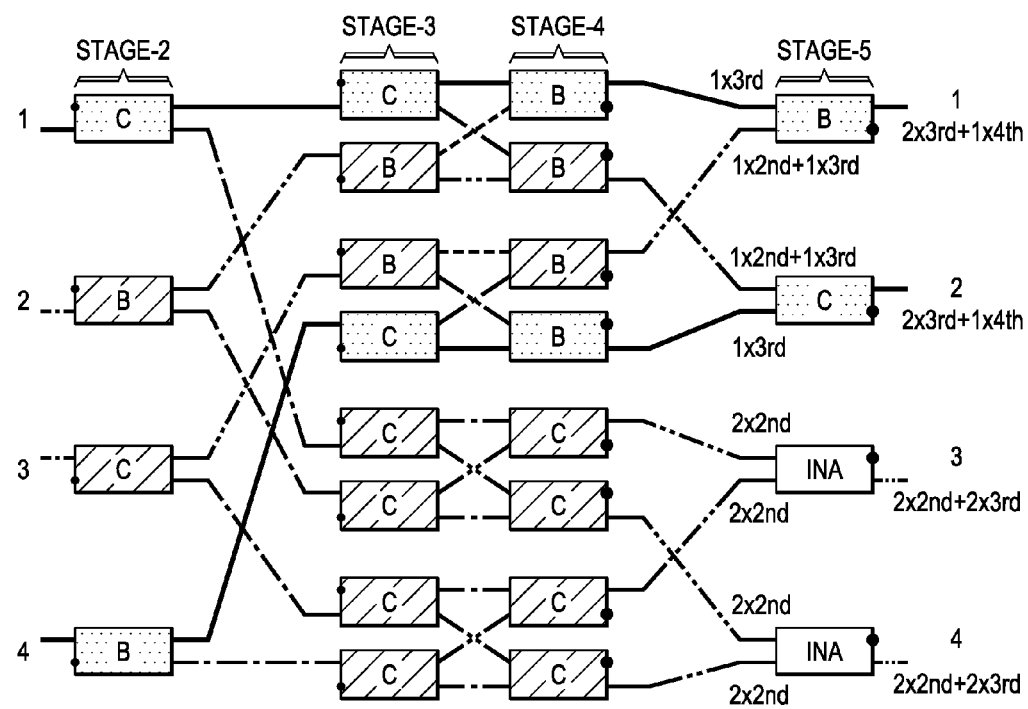
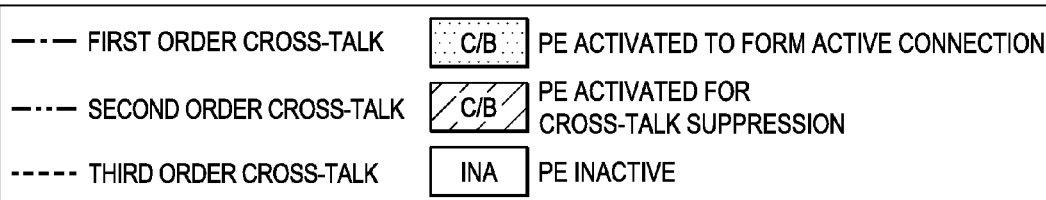
FIG. 17J

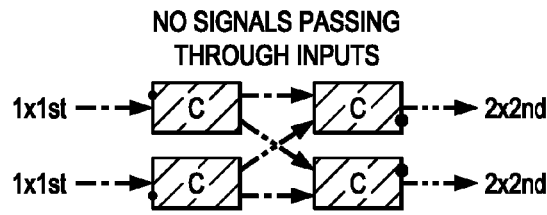
FIG. 19A
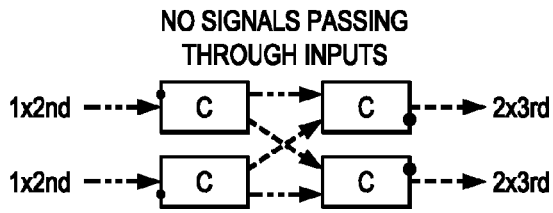
FIG. 19B
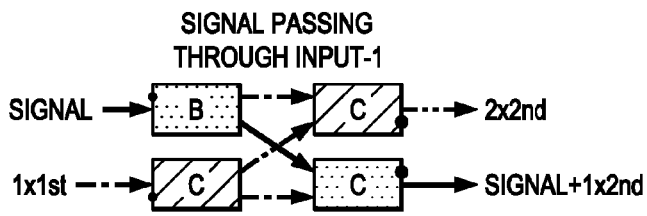
FIG. 19C
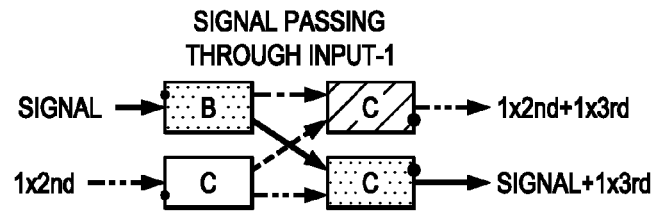
FIG. 19D
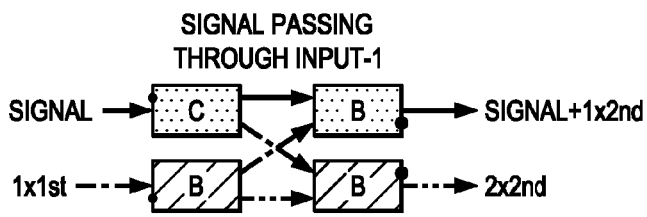
FIG. 19E
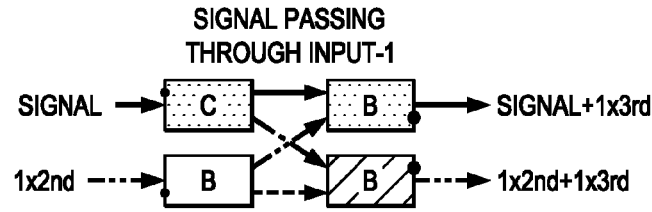
FIG. 19F
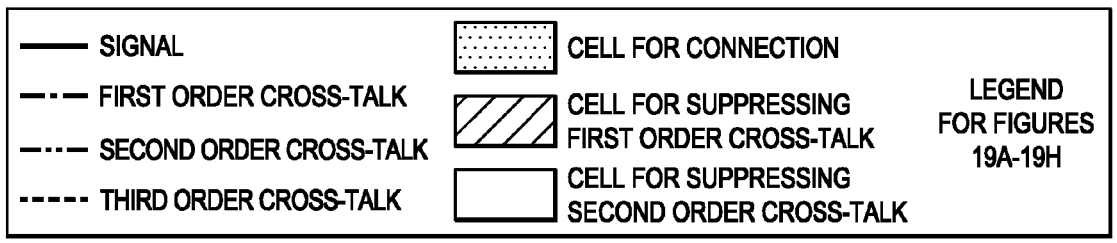

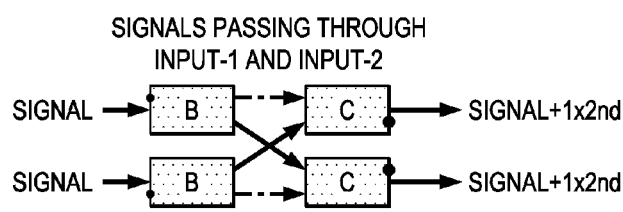
FIG. 19G
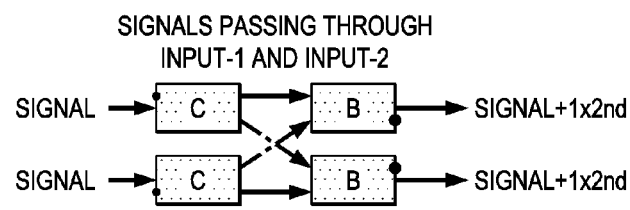
FIG. 19H
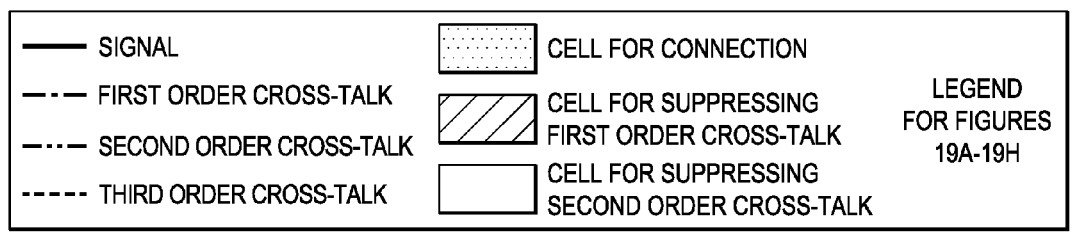

METHOD FOR CROSSTALK AND POWER OPTIMIZATION IN SILICON PHOTONIC BASED SWITCH MATRICES

This application claims the benefit of U.S. Provisional Application No. 61/818,296 filed on May 14, 2013, entitled "Method for Crosstalk and Power Optimization in Silicon Photonic Based Switch Matrices," which is incorporated herein by reference as if reproduced in its entirety.

TECHNICAL FIELD

The present invention relates to Photonic Integrated Circuits (PICs), and, in particular embodiments, to methods for crosstalk and power optimization in silicon photonic based switches.

BACKGROUND

Modern day optical networks may use N×N photonic switching fabrics to interconnect inputs and outputs in central offices and other network switching locations. The N×N photonic switching fabrics may include multiple passive silicon photonic elements. By way of example, an 8×8 photonic switch may include a total of 112 1×2 photonic elements with half of them is 1×2 and the other half is 2×1. In practice, the photonic elements exhibit non-ideal performance such that at least a portion of the signal leaks over to the non-selected output. For example, in a 1×2 photonic element having a "bar" configuration (e.g., input-1 is connected to output-1), at least a portion of the signal will leak over the output-2. Likewise, in a 1×2 photonic element having a "cross" configuration (e.g., input-1 is connected to output-2), at least a portion of the signal will leak over the output-1. The degree to which the signal leaks across may depend on the extinction ratio of the photonic element, with photonic elements having high extinction ratios exhibiting less leakage than those having low extinction ratios. Signal leakage across the individual photonic elements accumulates throughout the switch fabric and ultimately leads to cross-talk noise amongst the various output ports in the N×N photonic switch, which degrades network performance. Accordingly, techniques and mechanisms for reducing crosstalk in N×N photonic switches is desired.

SUMMARY OF THE INVENTION

Technical advantages are generally achieved, by embodiments of this disclosure which describe methods for crosstalk and power optimization in silicon photonic based switches.

In accordance with an embodiment, a method for reducing crosstalk is provided. In this example, the method includes establishing active connections between input ports and output ports of a photonic switching fabric. The photonic switching fabric is composed of a plurality of photonic elements. Establishing the active connections comprises activating photonic elements in the plurality of photonic elements that are positioned along connection paths of the active connections. The method further includes suppressing crosstalk in the photonic switching fabric by activating at least some unused photonic elements in the plurality of photonic elements. The unused photonic elements are excluded from the connection paths of the active connections. An apparatus for performing this method is also provided.

In accordance with an embodiment, a photonic switching fabric is provided. In this example, the photonic switching fabric includes a plurality of input ports, a plurality of output ports, and a plurality of photonic elements coupled between the input ports and the output ports. The photonic switching fabric further includes a control plane adapted to configure the photonic switching fabric in accordance with a connection map by activating used photonic elements in the plurality of photonic elements to establish active connections between the input ports and the output ports, and by activating at least some unused photonic elements in the plurality of photonic elements to suppress the propagation of crosstalk over the photonic switching fabric.

In accordance with another embodiment, a method for determining switching configurations of idle cells to suppress cross-talk in photonic switching fabrics is provided. In this example, the method includes identifying a connection map of an N×N photonic switching network. The N×N photonic switching network includes input ports, output ports, and a plurality of photonic elements (PEs). The plurality of PEs are arranged to form a first column of PEs coupled to the input ports, a last column of PEs coupled to the output ports, and a plurality of N/2×N/2 switching modules positioned in-between the first column of PEs and the last column of PEs. The method further includes determining a cross-talk suppression map for the N×N photonic switching network in accordance with a recursive algorithm. The recursive algorithm requires determining switching configurations for idle PEs in outermost columns of the N/2×N/2 switching modules prior to determining switching configurations for idle PEs in innermost columns of the N/2×N/2 switching modules.

BRIEF DESCRIPTION OF THE DRAWINGS

For a more complete understanding of the present invention, and the advantages thereof, reference is now made to the following descriptions taken in conjunction with the accompanying drawing, in which:

FIG. 11 illustrates a table depicting optimization methods with associated average crosstalk profiles and power consumption;

FIGS. 19A-19H illustrate diagrams of embodiment switching configurations for 2×2 photonic switching sub-networks;

DETAILED DESCRIPTION OF ILLUSTRATIVE EMBODIMENTS

Figure 1A:
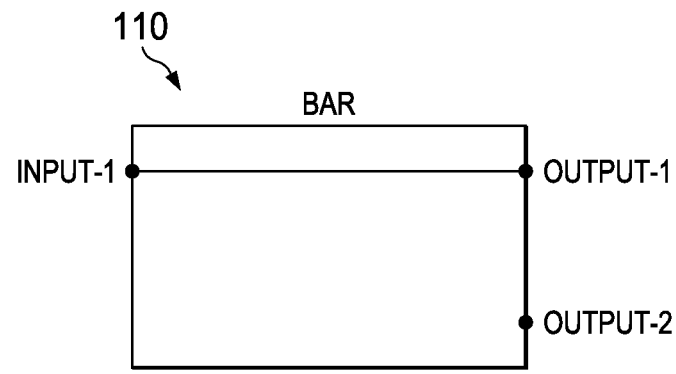
FIG. 1A illustrates a diagram of an embodiment photonic element in a bar configuration.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Photonic elements operate in either an active (i.e., powered) mode or an inactive (i.e., unpowered) mode depending on whether a power signal is being supplied. In the active mode, the switching configuration of the photonic element is selected by the operator to determine which output is connected to the input. In the inactive state, the switching configuration is not determined by the operator, and instead varies depending on environmental conditions (e.g., temperature, time, etc.) and/or characteristics of the photonic element. Conventional photonic switching fabrics are configured to supply a power signal only to those photonic elements needed to establish a connection, which allows photonic elements that are excluded from the active connections to remain inactive for the purpose of conserving power. However, the inactive photonic elements nevertheless reside in a cross or bar configuration, and therefore inactive connections are formed within the switching fabric. These inactive connections allow crosstalk to propagate to the output ports, thereby producing noise in the output signals and reducing the ratio of signal power to noise power.

Aspects of this disclosure suppress crosstalk in photonic switching fabrics by activating selected unused photonic elements in order to manipulate the inactive connections in a manner that inhibits the propagation of cross-talk over the switching fabric. More specifically, unused photonic elements can be set to a cross or bar configuration to block first and second order crosstalk from propagating to the output ports, thereby reducing noise in the output signals. In some embodiments, all of the unused elements can be activated in order to maximize crosstalk suppression. In other embodiments, fewer than all of the unused elements may be activated to achieve a balance between crosstalk suppression and energy conservation. In some embodiments, photonic switch architectures are configured to use pre-determined modes of crosstalk suppression (e.g., patterns of activated unused cells) for the various switching configurations. In some embodiments, there may be multiple modes for each configuration in order to achieve different levels of crosstalk suppression and power consumption. The crosstalk suppression techniques described herein allow photonic switches to be adapted to various network and/or noise conditions. Additionally, crosstalk suppression techniques of this disclosure provide increased flexibility in the manufacturing and/or acquisition of photonic elements, as switching fabrics that include lower quality photonic elements (e.g., photonic elements having low signal to noise ratio (SNR) or low extinction ratio) can achieve similar performance as those using higher quality photonic elements which is harder to manufacture them. Aspects of this disclosure further provide a recursive algorithm for determining cross-talk suppression maps for various connection maps in an N×N architecture.

Figure 1B:
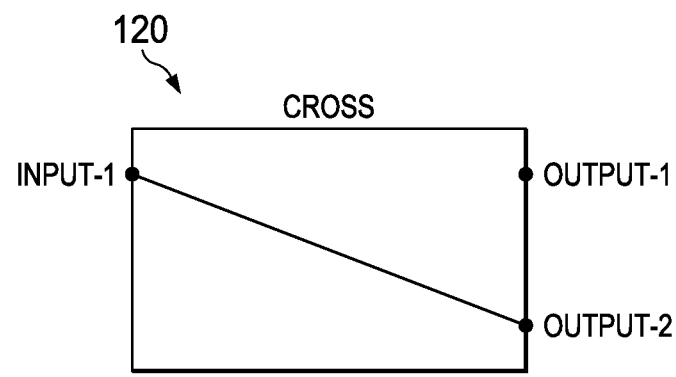
FIG. 1B illustrates a diagram of an embodiment photonic element in a cross configuration.

Photonic elements come in a variety of configurations, including 1×2 and 2×2 configurations. The descriptions included herein discuss photonic elements primarily in the context of a 1×2 configuration. However, aspects of this disclosure are extendable to other photonic element configurations, including (but not limited to) 2×2 configurations. Photonic elements can be in either a bar or cross configuration. FIG. 1A illustrates a photonic element 110 comprising a bar configuration in which the input port (input-1) being connected to the first output port (output-1), while FIG. 1B illustrates a photonic element 120 comprising a cross configuration in which the input port (input-1) is connected to the second output port (output-2).

Figure 2A:
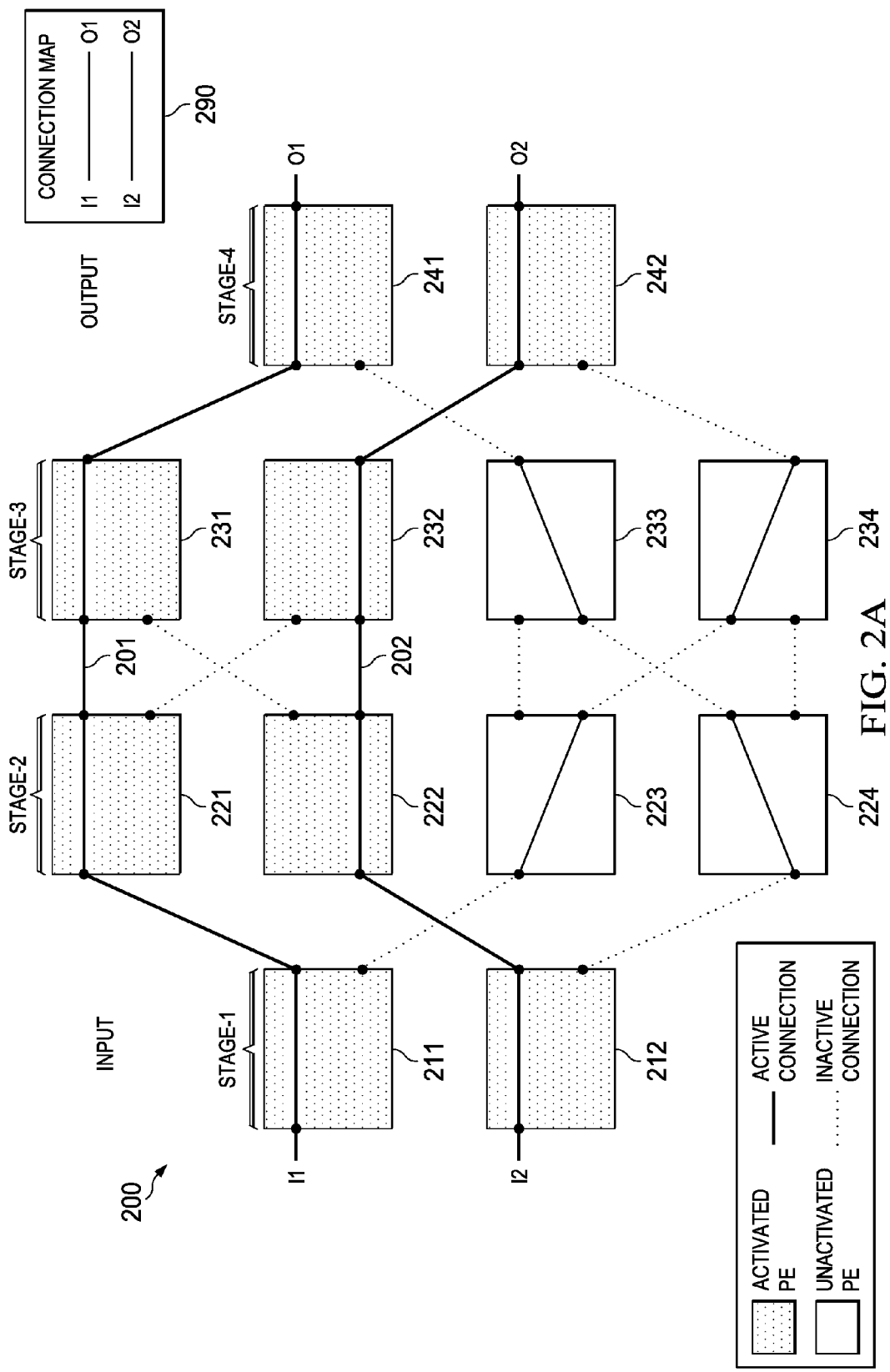
FIGS. 2A-2B illustrate diagrams of a photonic switching fabric.

Groups of photonic elements may be arranged to form a photonic switching fabric. FIG. 2A illustrates a photonic switching fabric 200 comprising a first input port ($I_1$), second input port ($I_2$), first output port ($O_1$), a second output port ($O_2$), and a plurality of photonic elements. The photonic elements are arranged in a first stage of photonic elements 211, 212, a second stage of photonic elements 221-224, a third stage of photonic elements 231-234, and a fourth stage of photonic elements 241, 242. As shown, a switching configuration of the photonic switching fabric 200 is defined by a connection map 290, which specifies that $I_1$ is connected to $O_1$ and $I_2$ is connected to $O_2$. To achieve this switching configuration, photonic elements 211, 221, 231, 241, are activated to form the active connection 201 between $I_1$ and $O_1$, while photonic elements 212, 222, 232, 242, are activated to form the active connection 202 between $I_2$ and $O_2$. Conventionally, photonic elements 223, 224, 233, 234 would remain inactive, as they are not used to form active connections.

Figure 2B:
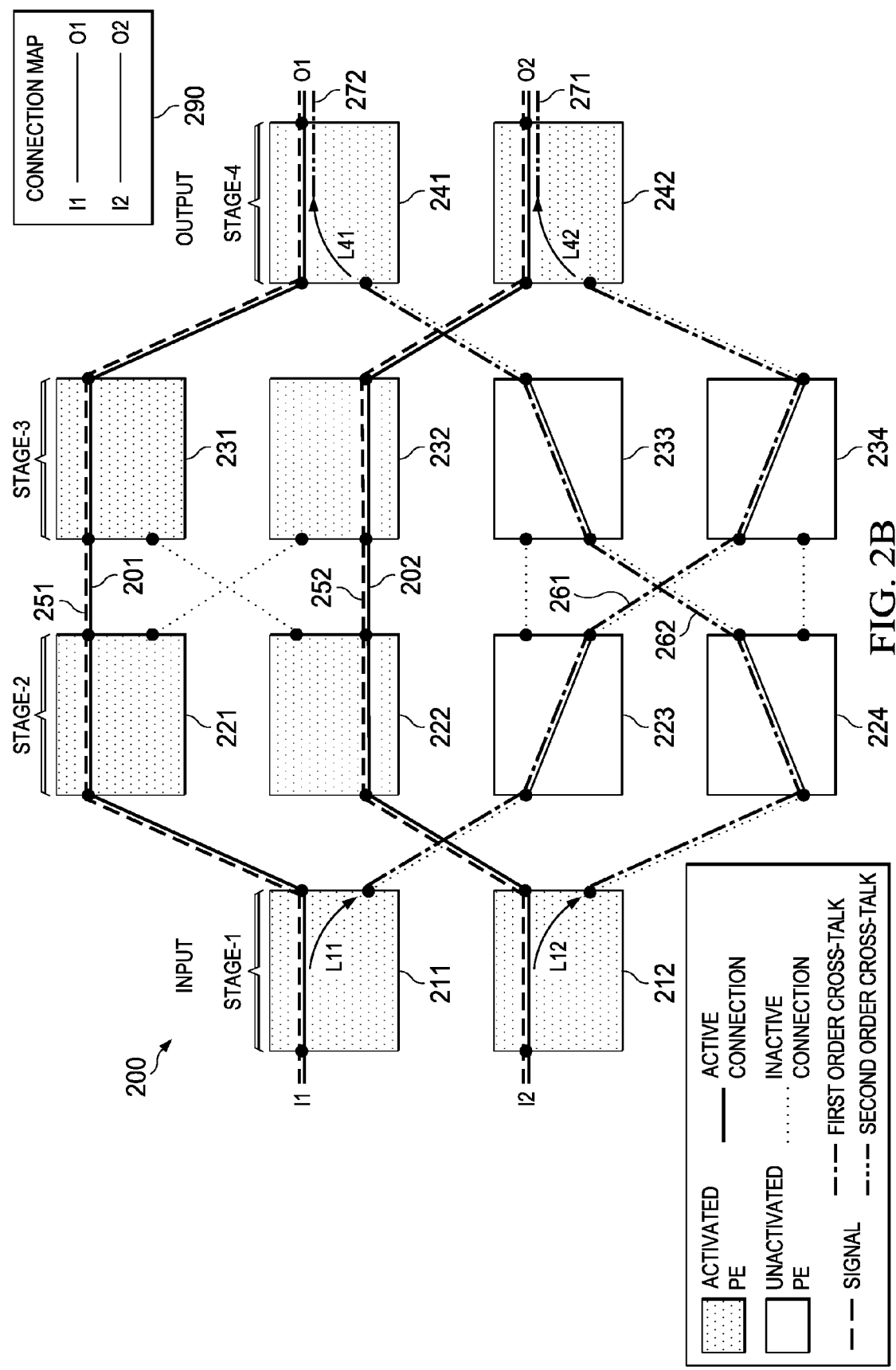

FIG. 2B illustrates how signals 251, 252 are transferred from the input ports to the output ports over the active connections 201 and 202. Notably, first stage photonic elements 211, 212 have an extinction ratio that allows a portion ($L_{11}$, $L_{12}$) of the signals 251, 252 to leak across the outputs of the photonic elements, thereby producing first order cross-talk signals 261, 262. For purposes of clarity and concision, the cross-talk produced by the active photonic elements 221, 222, 231, 232 is disregarded in FIG. 2B. Conventionally, the unused photonic elements 223, 224, 233, 234 are inactive, and therefore can assume either a bar or cross configuration depending on environmental conditions and/or photonic element characteristics. In this example, the inactive photonic elements 223, 224, 233, 234 have a cross configuration, which allows the first order crosstalk signals 261, 262 to propagate all the way to the fourth stage photonic elements 241, 242. The fourth stage photonic elements 241, 242 also have an extinction ratio that allows a portion ($L_{41}$, $L_{42}$) of the first order cross-talk signals 261, 262 to leak across the inputs, thereby forming second order cross-talk signals 271, 272. Accordingly, the output signal of $O_1$ includes the signal 251 as well as a second order cross-talk signal 272, while the output of $O_2$ includes the signal 252 as well as a second order cross-talk signal 271.

Figure 3:
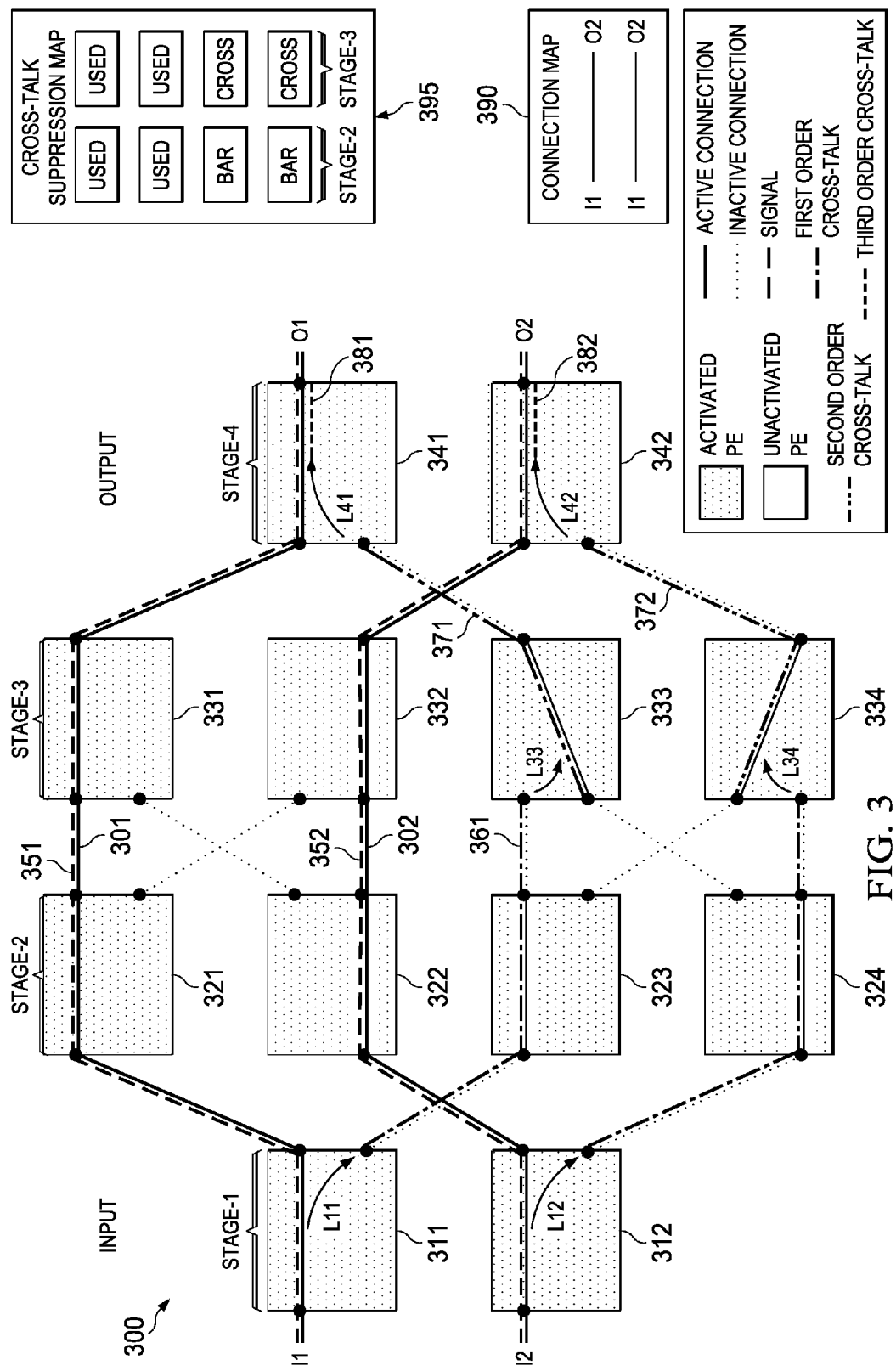
FIG. 3 illustrates a diagram of an embodiment photonic switching fabric.

Aspects of this disclosure activate unused photonic elements in order to suppress crosstalk in photonic switching fabrics. FIG. 3 illustrates a photonic switching fabric 300 that is configured for cross-talk suppression. The photonic switching fabric 300 has a similar structure to the switching fabric 200, and includes a plurality of photonic elements 311-342 that are arranged in four stages. The photonic switching fabric 300 has a switching configuration that is defined by a connection map 390. The connection map 390 is identical to the connection map 290, and consequently the photonic elements 311, 312, 321, 322 331, 332, 341, and 342 are activated to form the active connection 301, 302, over which the signals 351, 352 propagate from the input ports to the output ports. However, the photonic switching fabric 300 differs from the photonic switching fabric 200 in that the unused photonic elements 323, 324, 333, 334 are activated in order to suppress crosstalk. More specifically, the unused photonic elements 323, 324, 333, 334 are activated in accordance with the crosstalk suppression map 395 such that the photonic elements 323,324 are set to a bar configuration and the photonic elements 333, 334 are set to a cross configuration. Activation of the unused photonic elements 323, 324, 333, 334 in this manner blocks the first order crosstalk signals 361, 362 from reaching the third stage of the photonic switching architecture 300. The photonic elements 333, 334 have extinction ratios that allow a portion ($L_{33}$ and $L_{34}$) of the first order crosstalk signals 361, 362 to leak across the inputs, thereby creating second order crosstalk signals 371, 372. The second order crosstalk signals 371, 372 produce third order crosstalk 381, 382 at the fourth stage of the switching fabric 340, and the third order crosstalk signals 381, 382 produce interference over the output ports $O_1$ and $O_2$. As a note, residual crosstalk that would normally be produced from the extinction ratios of the photonic elements 321-322 and 331-332 is disregarded in FIG. 3 for the sake of clarity. Notably, activating the unused photonic elements 323, 324, 333, 334 reduces the order of crosstalk experienced over the output ports of the switching fabric architecture 300, thereby reducing the average level interference in the output signals.

The principles described above can be applied to larger switching fabrics, as well as to switching fabrics that include 2×2 photonic elements. Another class of architectures uses 1×2 and 2×1 switch elements in a dilated Banyan fabric. Features of a dilated Banyan architecture include the ability to eliminate first order crosstalk at the output. Dilated Banyan architectures often require many more switch elements, as only parts of them are used for establishing connections between inputs and outputs, meaning that some unused elements exist.

For dilated Banyan that uses 1×2 and 2×1 photonic integrated circuits (PIC) elements as a building block, there is a need for an optimizer algorithm. The algorithm uses Switch Element (SE) Crosstalk level (or extinction ratio interchangeably is used in some arts) and intelligently optimizes both power consumption and crosstalk level by applying a connection map dependent state assignment to the unused switching elements. The method/algorithm achieves an acceptable level of crosstalk at the output and minimizes the power consumption of the switch. In this disclosure, a switch architecture equipped with this method is referred to as an "Enhanced Dilated Banyan" (EDB). The algorithm offers flexibility based on Switch Element (SE) Crosstalk level to flexibly adjust crosstalk and/or power levels for each connection map. The algorithm reduces crosstalk levels for High Crosstalk SEs. The algorithm minimizes power consumption for low crosstalk SEs. The algorithm optimizes both the crosstalk level and power for medium crosstalk SEs.

The next generation photonic switches for Metro and Packet switching should not only be non-blocking and scale, but also should offer low cross-talk and crosstalk uniformity at each output of the switch to allow for a better transient behavior.

Figure 4:
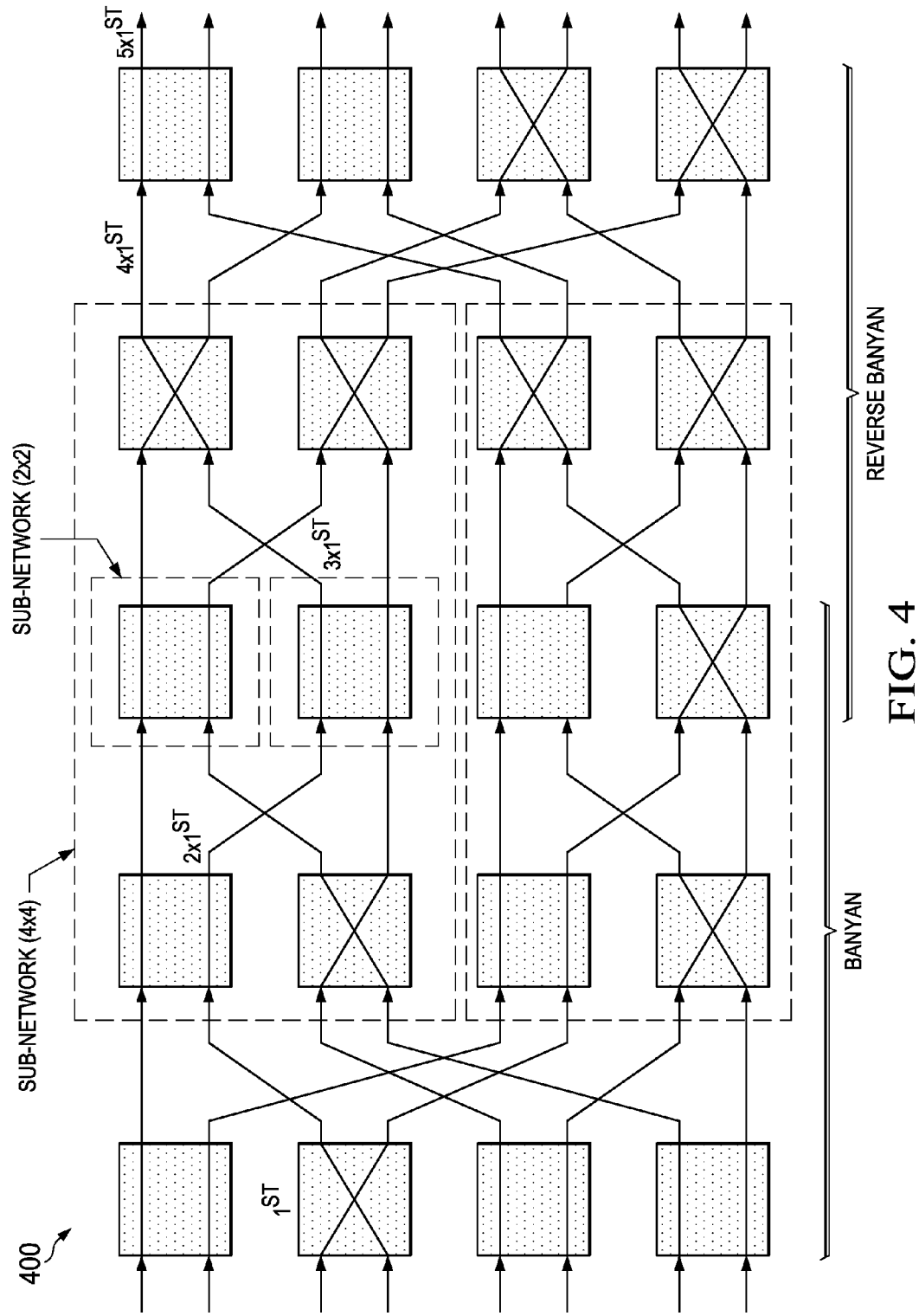
FIG. 4 illustrates a diagram of a recursive construction of a Benes network.

One class of optical switches uses 2×2 switching elements (e.g., MMI-based implementation using passive silicon photonics) as building blocks arranged in a multistage Benes architecture. The benefit of the Benes architecture is low chip count and low power. However, the problem is the buildup of crosstalk noise on a certain channel due to the interference with other signals inside the 2×2 Switch elements, resulting in appearance of first order crosstalk at the output. This crosstalk propagates to the output, and is added at each stage. FIG. 4 illustrates a recursive construction of Benes network from 2×2 switching elements. As shown in each output there are five elements of first order crosstalk. This is because at the output of each stage, there is a first order cross-talk from the other outputs.

Another class of the switches uses 1×2 and 2×1 elements (also implemented using passive silicon photonic) connected in a dilated Banyan architecture. The benefit of dilated Banyan is lower cross talk compared to the Benes architecture. However, the problem is high chip count and lower utilization of the chips as there will be many unused elements. Simple method of un-powering all the un-used elements result in relatively higher crosstalk at the output (which is still much lower than Benes) but may not be acceptable for high SE crosstalk (or low extinction ratio). Putting all the unused switch cells in a fixed state of 'cross' or 'bar' may not yield the required crosstalk performance while it adds to power consumption or heat for the chip.

The dilated Banyan architecture inherently eliminates the first order crosstalk; however, the level of second order crosstalk at each output could vary. The existing methods do not have any crosstalk optimization embedded into connection map algorithm. The novelty of this disclosure is to intelligently assign some or all of the unused switch cells to offer a low and uniform crosstalk at all the outputs. The assigned unused cells depend on a connection map. For an N×N switch, total number of connection maps is N!=1×2 . . . ×N. The proposed algorithm offers both crosstalk and power optimization depending on the modes of operation and/or depending on the extinction ratio of manufactured cells.

Figure 5:
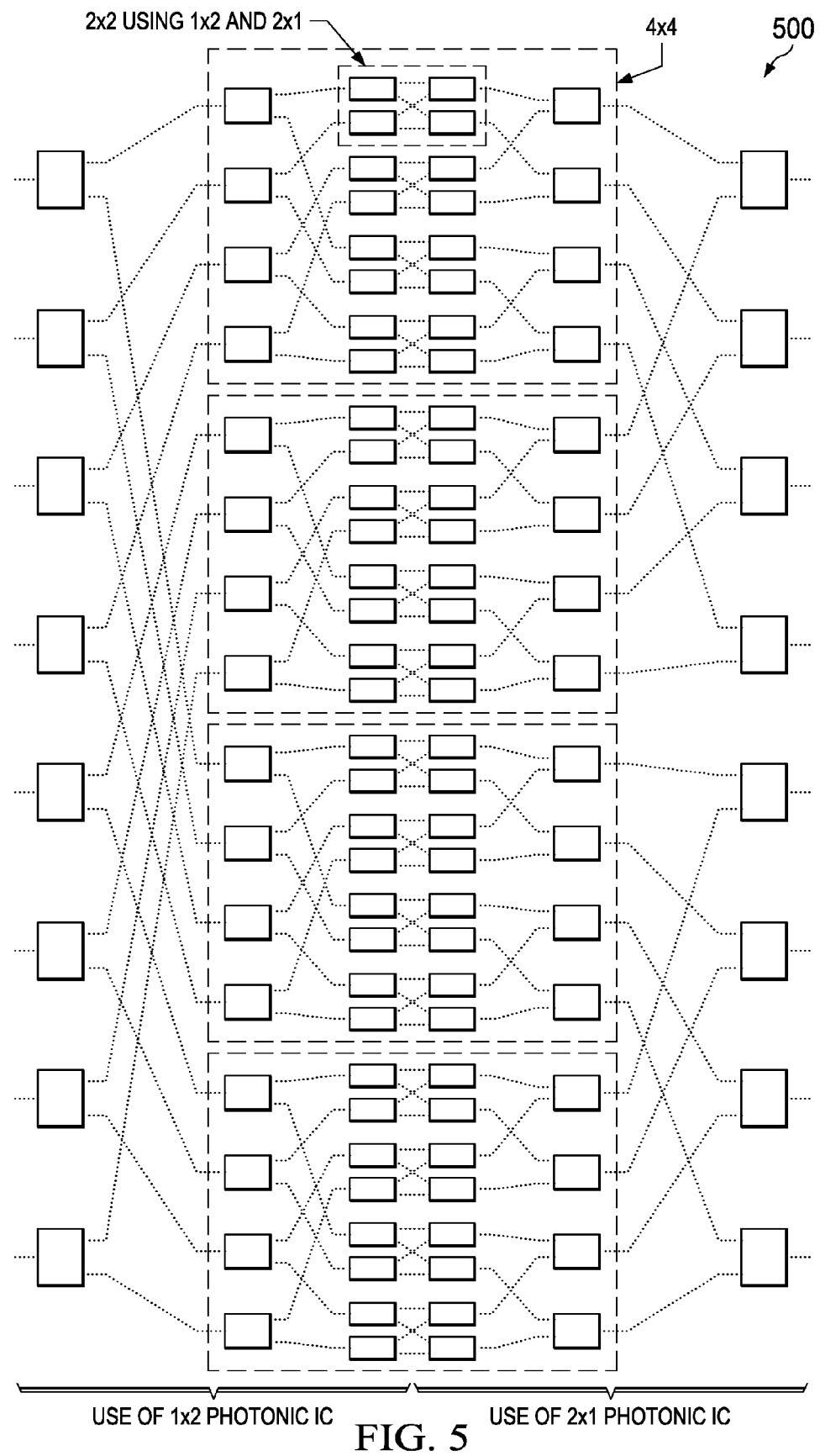
FIG. 5 illustrates a diagram of a dilated Banyan architecture.

The dilated Banyan architecture for building non-blocking low crosstalk switch has been shown in FIG. 5. The building block is 1×2 and 2×1 switching elements implemented in Photonic Integrated Circuit (PIC). As seen, the recursive nature has some similarity and some differences with Benes architecture. The following describes techniques for building 2×2, 4×4, 8×8, and 16×16 switching elements in accordance with this disclosure: 2×2 switching elements include First stage columns (Two 1×2) and Second stage columns (Two 2×1); 4×4 switching elements include First stage columns (Four 1×2), Middle stage columns (Four 2×2), and Third stage columns (Four 2×1); 8×8 switching elements (shown in FIG. 5) include First stage columns (Eight 1×2), Middle stage columns (Four 4×4), Third stage columns (Eight 2×1); 16×16 switching elements include First stage columns (Sixteen 1×2), Middle stage columns (Four 8×8), and Third stage columns (Sixteen 2×1); N×N switching elements include First stage columns (N 1×2), Middle stage columns (Four N/2×N/2); and Third stage columns (N 2×1).

Figure 6:
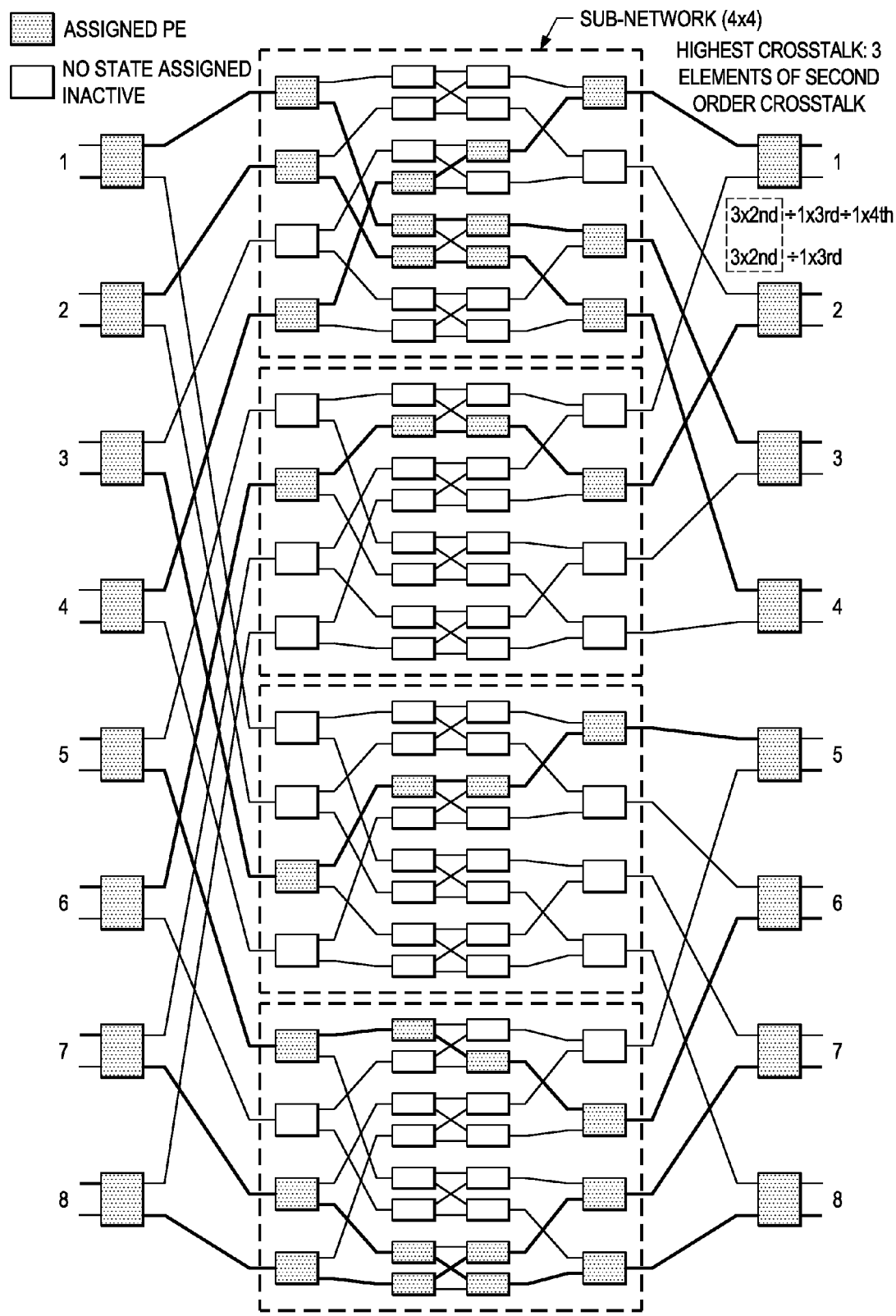
FIG. 6 illustrates a diagram of a maximum crosstalk of a dilated Banyan architecture.

The switching element architecture can be described using a four metrics point of view, namely blocking, crosstalk, implementation, and power. (i) Blocking—Architecture in FIG. 4 is re-arrange-able non-blocking while the architecture in FIG. 5 is strictly non-blocking; (ii) Crosstalk—The architecture differences between the two lead to significant performance improvement in terms of crosstalk. For 8×8 Benes, as shown in FIG. 4, the maximum amount of crosstalk at the output is five elements of first order. However, for dilated Banyan, the maximum amount of crosstalk at the output is when the inactive cell is swinging to worst possible state and results in 3 elements of second crosstalk at the output as shown in FIG. 6; (iii) Implementation—Both could use the same silicon Photonic using MZI 2×2 or 1×2; (iv) Power—Assuming bar state consumes most power (say a normalized unit of 1), and cross state consumes a normalized unit of 0.5 and inactive state consumes a normalized unit of 0.1, then the total power is Benes: 10×cross+10×Bar=15, Dilated Banyan with no crosstalk optimization: 24×Cross+24*Bar+68*Inactive=42.8. FIG. 6 illustrates a Maximum Crosstalk of a dilated Banyan with no optimization performed. All unused cells are un-powered.

Regarding crosstalk optimization, with no loss of generality, we assume an 8×8 dilated Banyan based on 1×2 and 2×1 switching cells as an illustrative example of a dilated architecture. For a given connection map of 8 inputs connecting to 8 outputs: 48 used elements (dotted cells as in FIG. 6); and 64 unused elements (white Cells as in FIG. 6).

For a given switch element crosstalk (or extinction ratio), with no optimization, a maximum of 3 elements of second Order crosstalk appears at each output. The key idea is to use the unused idle switch elements to reduce crosstalk level at the output while minimizing the overall switch power. The crosstalk optimized case is used when low extinction ratio of each element result in high output crosstalk, hence, it is important to reduce the level of crosstalk from the maximum of 3 elements on each output.

Figure 7A:
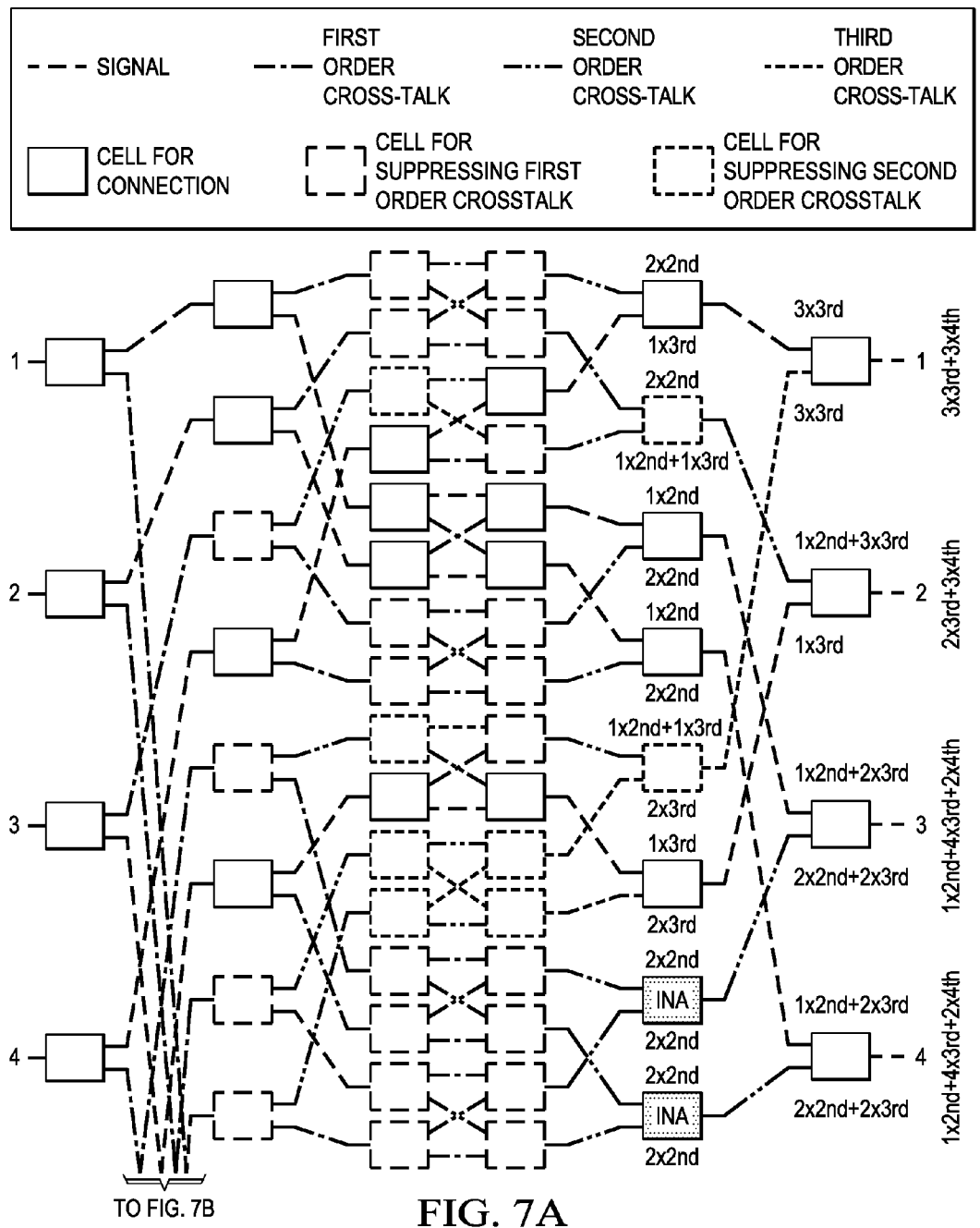
FIGS. 7A-7B illustrates a diagram of crosstalk optimization for a given connection map.
Figure 7B:
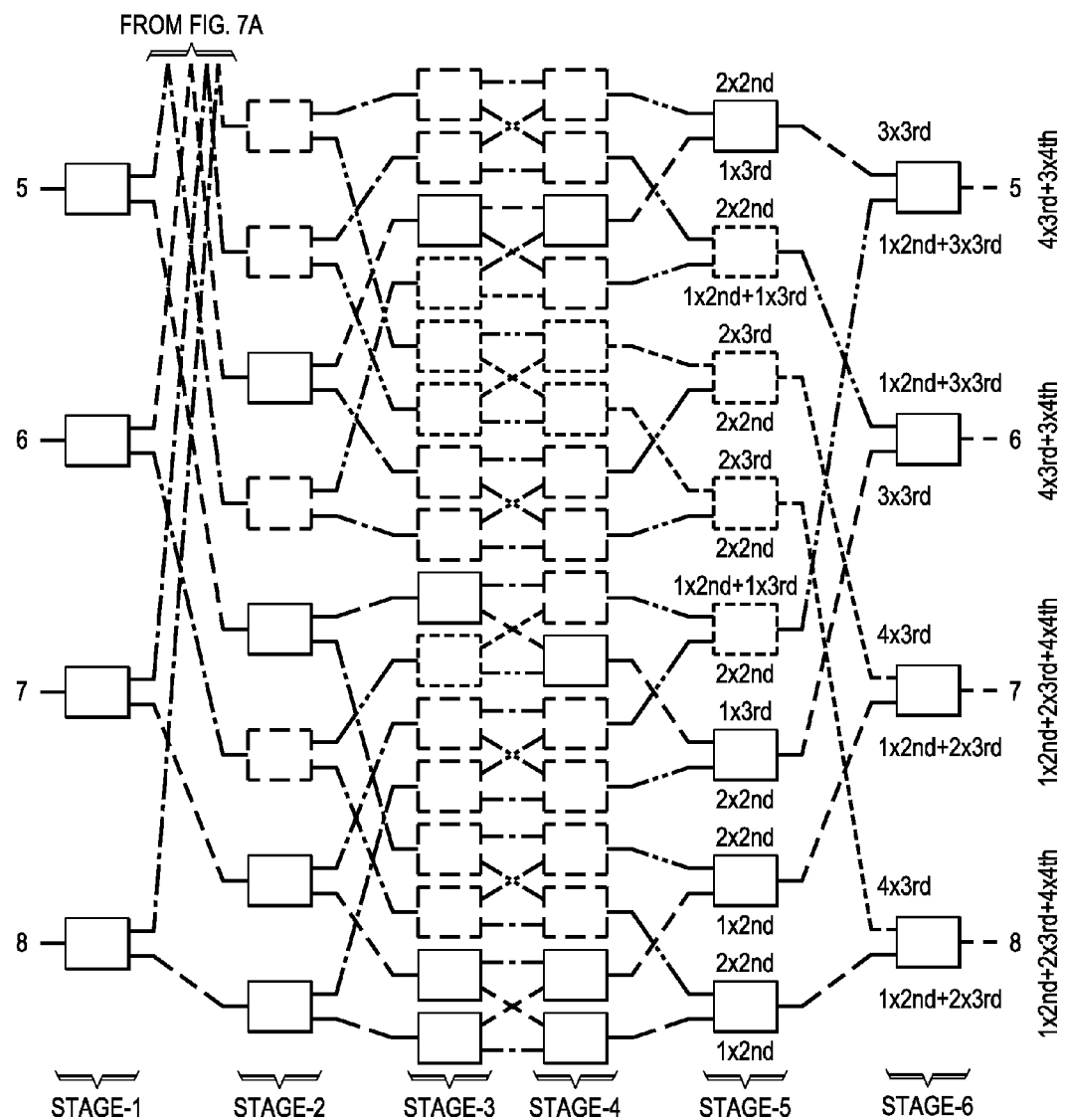

FIGS. 7A-7B illustrates an example of crosstalk optimization for a given connection map. Note that for an 8×8, there are 8!=40320 different connection maps. FIG. 7A-7B illustrate crosstalk optimized case with an average of 0.43 element of second crosstalk on each output (comparing to a maximum of 3 elements of second crosstalk). This means that 43% of all the connection in 40320 maps have one second order crosstalk element at the output while 57% of them has no second order crosstalk at the output.

The optimizer algorithm looks into crosstalk level at each stage, and makes proper assignments of the unused cells to degrade the crosstalk level that is propagated to the outputs. For crosstalk optimized case, all or most of unused cells are assigned at the expense of higher power or heat. For other cases, where it is desirable to have the power reduced, the crosstalk severity at each stage is ordered and subsets of the unused cells are assigned so the remainder of unused cells can be un-powered.

Figure 8:
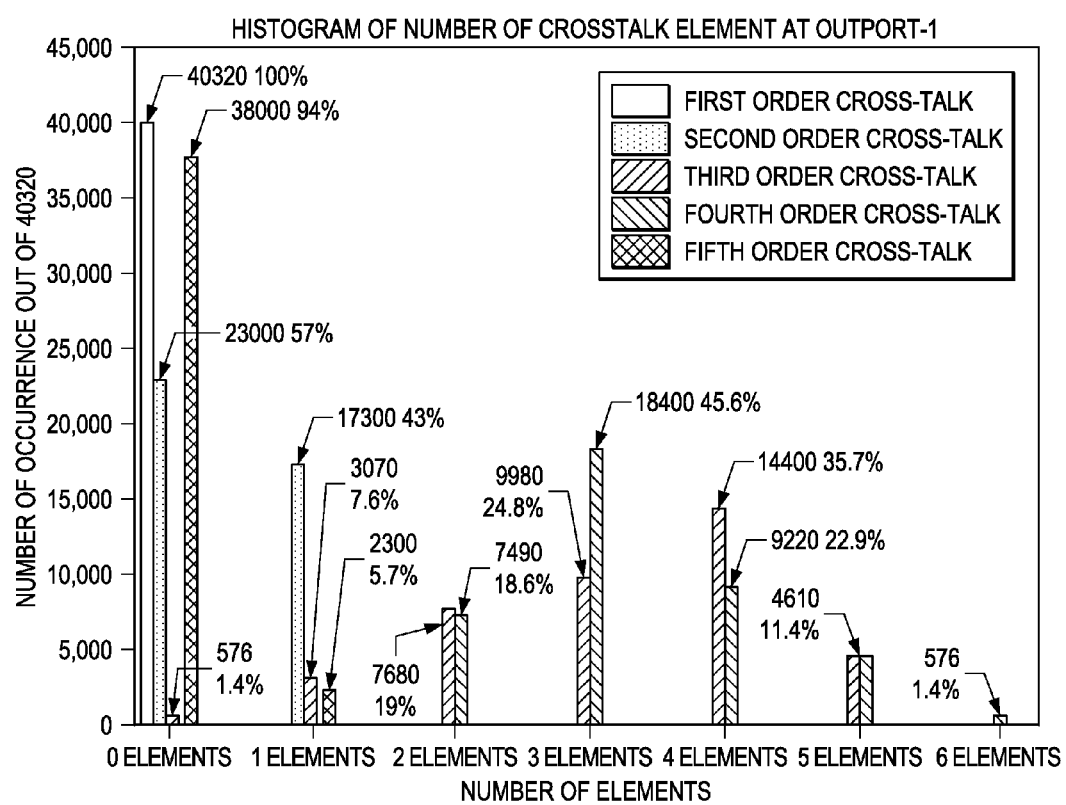
FIG. 8 illustrates a graph depicting a histogram of crosstalk elements.

The optimizer algorithm that assigns certain states (cross, bar or inactive) based on the input/output connection map has been applied to all 8! cases and the results of optimization has been obtained. FIG. 8 illustrates a Histogram of crosstalk elements on all different input/output connection maps. As shown there is no first order crosstalk on any output as the x-axis with "0 elements" covers 100% of the first order. There are 57% of the outputs that have no second crosstalk while 43% have one element of second crosstalk. In contrast, the non-optimized case has 3 elements of second order crosstalk. The algorithms use the unused switch cells and assign them proper states so as to reduce the order of the crosstalk at the expense of increasing power.

Figures 9, 10:
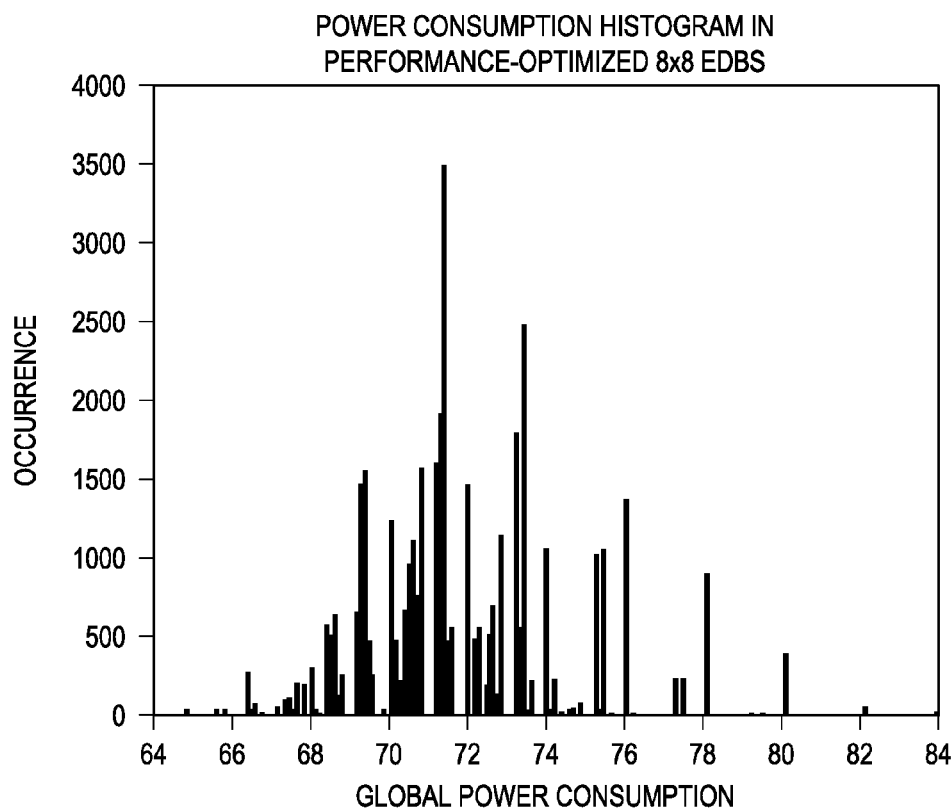
FIG. 9 illustrates a graph depicting global power consumption.
FIG. 10 illustrates a table depicting various crosstalk profiles for crosstalk optimization.

With respect to the calculation of power consumption (based on the assumption of 1 for bar, 0.5 for cross and 0.1 for inactive) for the crosstalk optimized case for all 40320 cases has been shown in FIG. 9. For connection cells there are 48 elements with 24 cells in cross and 24 cells in bar states requiring 36 units of power for connection. After crosstalk optimization with assigning states to unused cells, the average global power consumption is 71.8552—that means the performance optimization cost almost the same amount as full connection power consumption. FIG. 9 illustrates a power consumption Histogram for all connections when only crosstalk optimization is performed.

FIG. 10 illustrates a table depicting various crosstalk profiles for Crosstalk optimized case. For the total of 40320 connection map possibilities, there are eleven classes of crosstalk for fully crosstalk optimized case. Column 1 of FIG. 10 shows occurrence of each class out of 40320 possibilities. As shown, five classes have no second order crosstalk and six classes have one element of second order crosstalk. This is in contrast with worst case of three elements of second crosstalk for non-optimized case.

Regarding power optimization, one goal of power optimization is to develop an algorithm by which the full connection 8×8 Enhance Dilated Banyan switch can have a fair output crosstalk performance with minimized power consumption. As seen in FIG. 9, power consumption for crosstalk-optimized is between 64 and 82 with an average power of 72. Comparing this with a minimum power case of 42.8 when all idle cells are inactive, there seems to be a middle ground. Depending on the crosstalk value of the switch elements, one may decide to use the crosstalk optimized case only or power-optimized or somewhere in between. A low crosstalk value for a switch element (or high extinction ration) is −30 dB where one might perform power optimization only. A high value for switch element crosstalk (or low extinction ratio) is −12 dB, where one might consider crosstalk optimization only. For a medium value, say −18 dB, one could perform an optimization for either power or crosstalk or on both. We consider the following spectrum for optimization and we calculate both power and crosstalk results: Power-optimized case (no crosstalk optimization, no idle cell assignment); Stage 5 inactive cells assigned proper states (0 to 8 cells assignment); Fixed 16 unused cells assignment (depending on connection map, 16 cells of stage 4 and 5 are assigned); Stage 4 inactive cells assigned proper states (some or all 24 cells of stage 4 are assigned); Stages 4 and 5 inactive cells assigned proper states (0 to 24 cells of stage stages 4 and 5 are assigned depending on connection map); Fixed-40 unused cells assignment (depending on connection map, 40 cells of the 48 cells of stage 3 and 4 are assigned); Stages 3 and 4 inactive cells assigned proper states (all 48 idle cells of stages 3 and 4 are assigned); all unused switch cells in cross (Off) state meaning all 64 idle cells of 8×8 in the example are assigned cross state); crosstalk optimized case (all 64 idle cells are assigned).

FIG. 11 illustrates optimization possibilities from one spectrum of fully power-optimized (no crosstalk optimization) to another spectrum of fully crosstalk optimized with in-between cases of both power and crosstalk optimization. FIG. 11 assumes an extinction ratio of −18 dB for switch elements. As shown in FIG. 11, the results for one of the optimum scenarios in which stage 4 and 5 optimization is performed results in 0.96 element of second cross-talk in output with average power of 54.

Aspects of this disclosure provide: Crosstalk minimization for dilated Banyan architecture; crosstalk optimization for route and select architecture and switches with tree architecture; Methods to change second order crosstalk using state assignment of the unused cells; Methods to optimize the power and crosstalk based on deployment scenarios. Aspects of this disclosure relate to High capacity optical switches operating at the packet level or similar switches operating at the long-packet (differentiated packet stream) level.

A Photonic Integrated Circuit (PIC) allows integration of various photonic components such as switching fabric on a single substrate. This disclosure relate to an N×N switch matrix architecture by interconnection of 1×2 (or 1×k) and 2×1 (or k×1) switching elements integrated into a PIC chip, where k=2, 3, . . . An N×N route and select architecture shown in FIG. 12 or Dilated Banyan shown in FIG. 13-A are aspects of this disclosure. One of the salient features of dilated Banyan or route and select architecture is the elimination of first order crosstalk at switch outputs at the expense of larger number of switching elements. For this architecture, the accumulated crosstalk noise from all other channels at each switch output is at most second order crosstalk. When extinction ratio of each switch element is high, the effect of accumulated crosstalk at the output is insignificant. However, with low or medium extinction ratio, the impact of second order crosstalk is considerable and there is a need to reduce its impact.

In an N×N Dilated Banyan switch, the total number of switch elements is $2N*(N-1)$, out of which $2N*\log 2 (N)$ is used to provide the connectivity of N inputs to N outputs. For high extinction ratio switch cells, e.g., −30 dB, these idle switches can be un-powered to minimize chip power consumption. However, for low to medium extinction ratio switch cells, state assignment of these unused switches can reduce the impact and the orders of the accumulated crosstalk at the output. This disclosure provides an optimization technique that intelligently assigns unused $2N*(N-1-\log 2 (N))$ switches to 'cross', 'bar' or 'inactive' states so as to improve the crosstalk performance to an acceptable value while the chip power consumption is maintained at a relatively low level.

Aspects of this disclosure address the merits of dilated Banyan or route and select PIC switch by performing crosstalk analysis of an 8×8 fabric with no optimization, e.g., un-powering all the idle switch elements, and compare the results with that of an 8×8 Benes switch. Aspects of this disclosure apply an optimizer algorithm, for low to medium extinction ratios, to further reduce the accumulated crosstalk at the output. The results show that with a medium PICSE crosstalk of −18 dB with no-optimization the average number of second crosstalk signal at each output is 1.29, and a maximum of three second crosstalk elements, and the power consumption is minimum. With addition of layers of optimization rules at various stages, the crosstalk performance is improved while the power consumption starts to increase. The highest level of crosstalk optimization achieves an average of 0.43 element of second-order crosstalk signal on each output (one third of the average of non-optimized case) while the power is increased on average 67% from its minimum level. Dilated Banyan with optimizers are referred to as Enhanced dilated Banyans (EDBs). For each characterized value of the extinction ratio for the manufactured switch cell, the algorithm allows optimized operation of EDB based on chip power requirement and the target accumulated crosstalk performance.

The following references are related to subject matter of the present application. Each of these references is incorporated herein by reference in its entirety: Keiichi Nashimoto, David Kudzuma, Hui Han, "Nano-Second Response, Polarization Insensitive and Low-Power Consumption PLZT 4×4 Matrix Optical Switch, OSA/OFC/NFOEF 2011; Andrea Bianco, "Optical Switch Architectures Based on Microring Resonators"; L. Chen, "Silicon photonic integrated circuits for WDM technology and optical switch," Optical Fiber Communications Conference, 2013, paper OW1C.1.

An embodiment photonic switch or a plurality of such switches using 1×2 and 1×k components, where k<N and k=2, 3, . . . , can be used for fiber management at service providers' offices. An example of usage is Passive Optical Networks (PON) for automated management of fibers of Fiber To The Home (FTTH) customers. Embodiments may be implemented in a wide variety of devices. Such devices include Optical cross connects (OXC) for carriers and data centers; Multi-granularity optical cross-connects (fiber XC, waveband XC, Wavelength XC) for flexible resource allocation for carriers and cloud computing data centers based on demand changes; Optical packet switch; Transceiver components; Passive optical networks; Reconfigurable optical add-drop multiplexer (ROADM);

Automated fiber management for data center, service providers, enterprises and government applications; Service restoration from multiple optical network failures (line protection using 1+1 or 1:N switches and protection switching for 1+1 lines, mesh or ring configurations); Fiber to the home (FTTH) network automation and test; network monitoring; performance monitoring, e.g., wavelength error, bit error rate (BER), optical signal-to-noise ratio, OSNR, etc.

Figure 12:
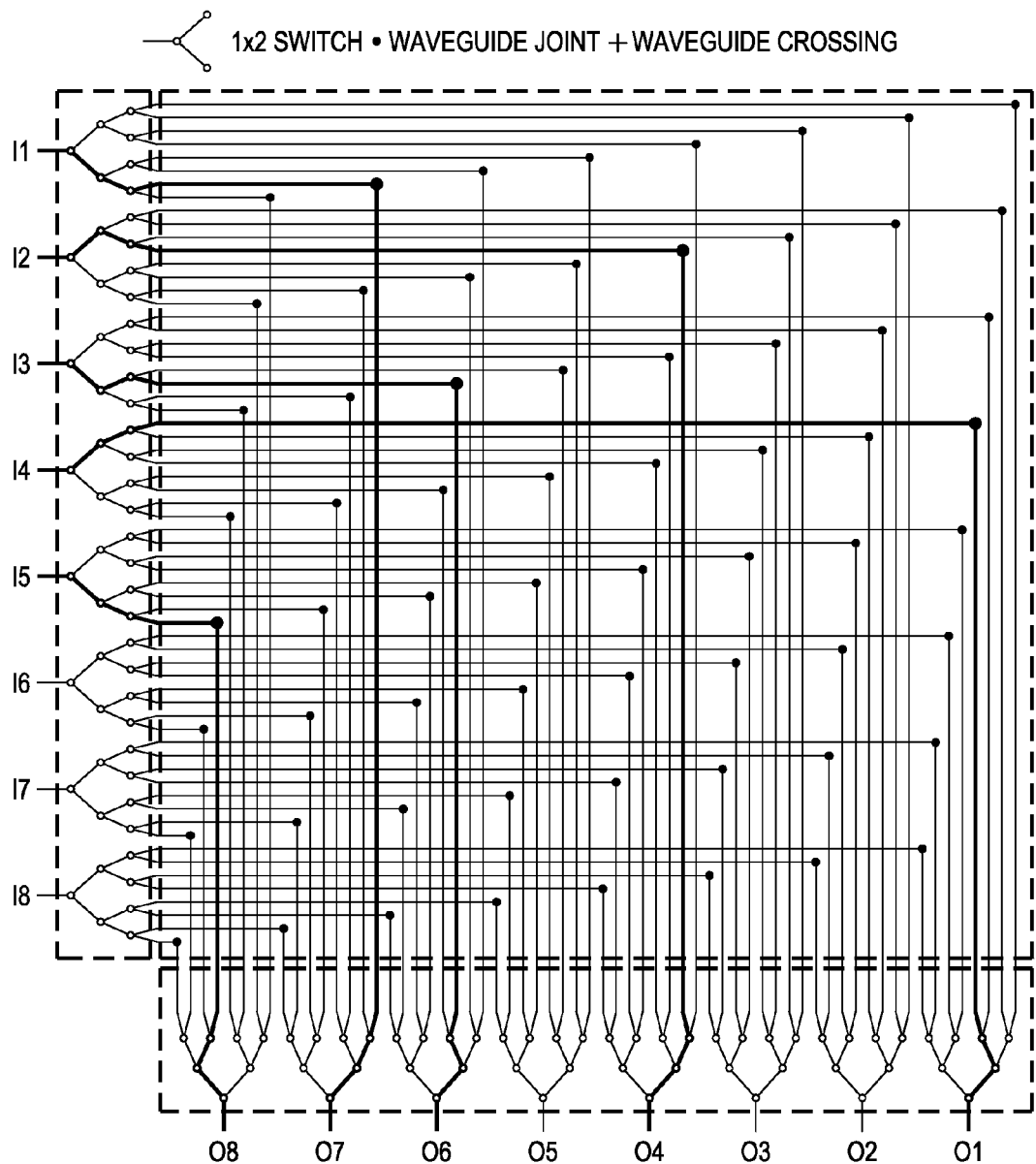
FIG. 12 illustrates a diagram of an 8×8 route-and-select switch for a silicon photonic circuit.

Embodiments can also be used in computing platforms for both optically switching and optically interconnecting the computing components such as CPU, accelerated processing unit (APU), memory, co-processors and other peripherals for high speed, high throughput, low latency, high performance connections. FIG. 12 illustrates an 8×8 route-and-select switch in a silicon photonic circuit. All the aspects of various embodiments disclosed herein also apply to a route-and-select switch fabric.

Aspects of this disclosure provide a recursive algorithm for determining cross-talk suppression maps in N×N photonic switching networks. The N×N photonic switching networks can be broken down into a first column of Photonic Elements (PEs) coupled to input ports of the N×N switching network, a last column of PEs coupled to input ports of the N×N switching network, and multiple N/2×N/2 sub-networks (referred to herein as modules) positioned in-between the first and last column. The inputs/outputs of the N×N photonic switching network are used to determine the switching configurations of the first and last columns of the N×N photonic switching network. Thereafter, individual switching configurations for each of the multiple N/2×N/2 modules are determined independently. More specifically, the N/2×N/2 modules can be broken down into a first column of PEs coupled to inputs of the N/2×N/2 module, a last column of PEs coupled to input ports of the N/2×N/2 module, and multiple N/4×N/4 sub-networks. The inputs of each N/2×N/2 module are used to determine the switching configurations of the first and last columns of that N/2×N/2 module. This process is repeated until the switching configuration for 2×2 modules (located in the center of the N×N photonic switching network) are obtained. These concepts are explained in greater detail below, where the recursive algorithm is explained in the context of an 8×8 photonic switching network. However, those of ordinary skill in the art will recognize, upon reviewing this disclosure, that these concepts are applicable to any N×N photonic switching network, e.g., 16×16, 32×32, etc.

Figure 13A:
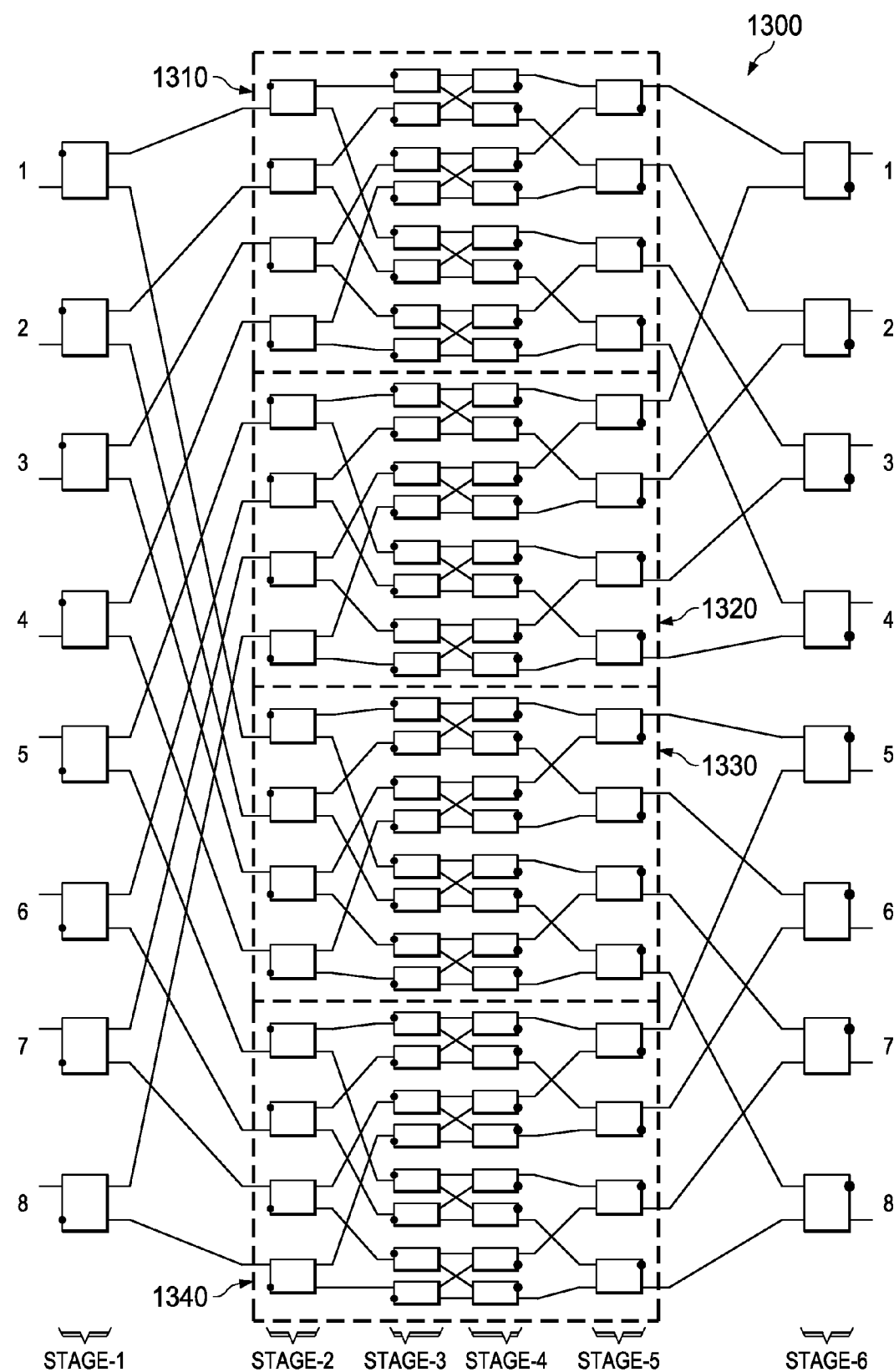
FIGS. 13A-13B illustrate diagrams of an embodiment 8×8 photonic switching network.
Figure 13B:
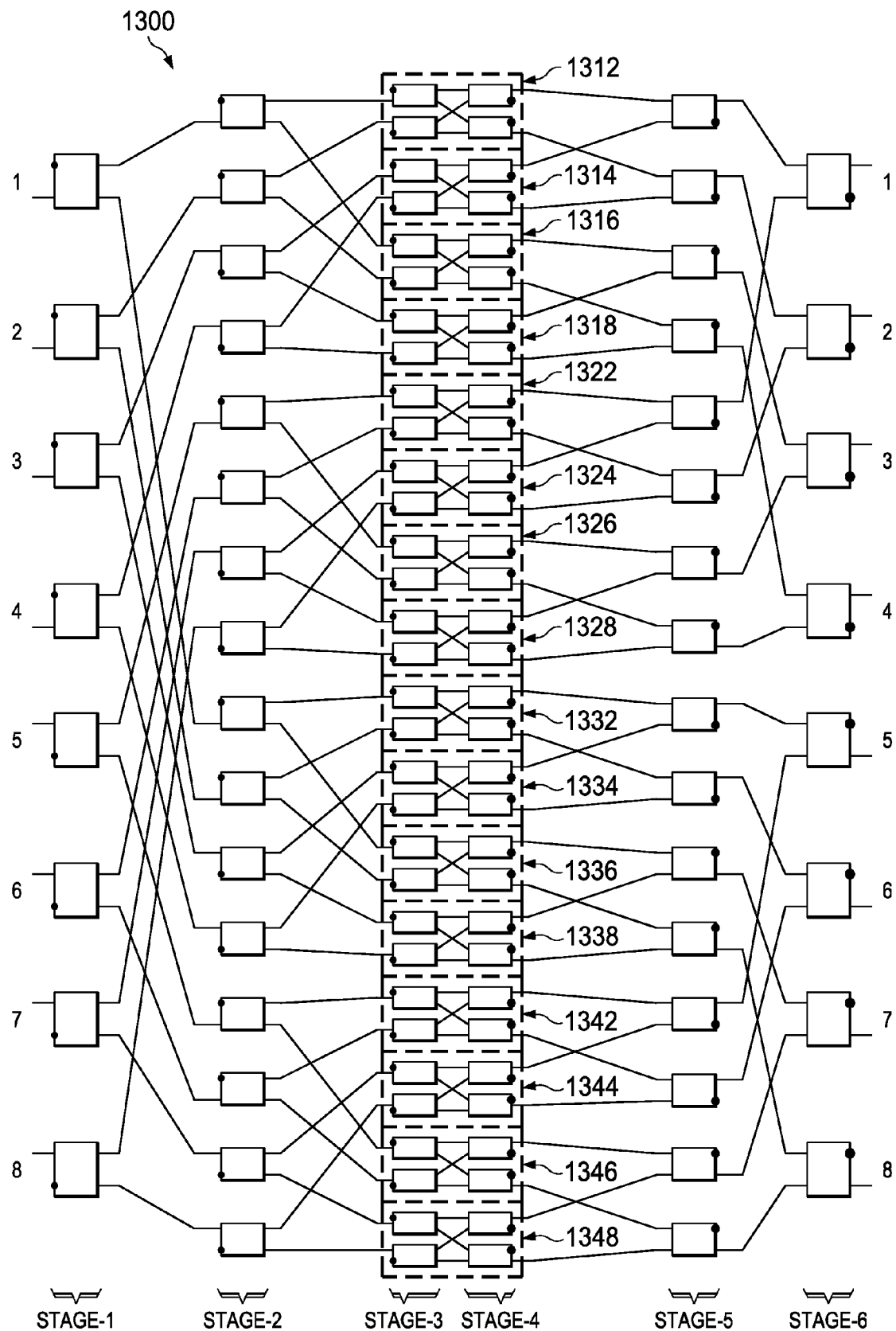
Figure 14:
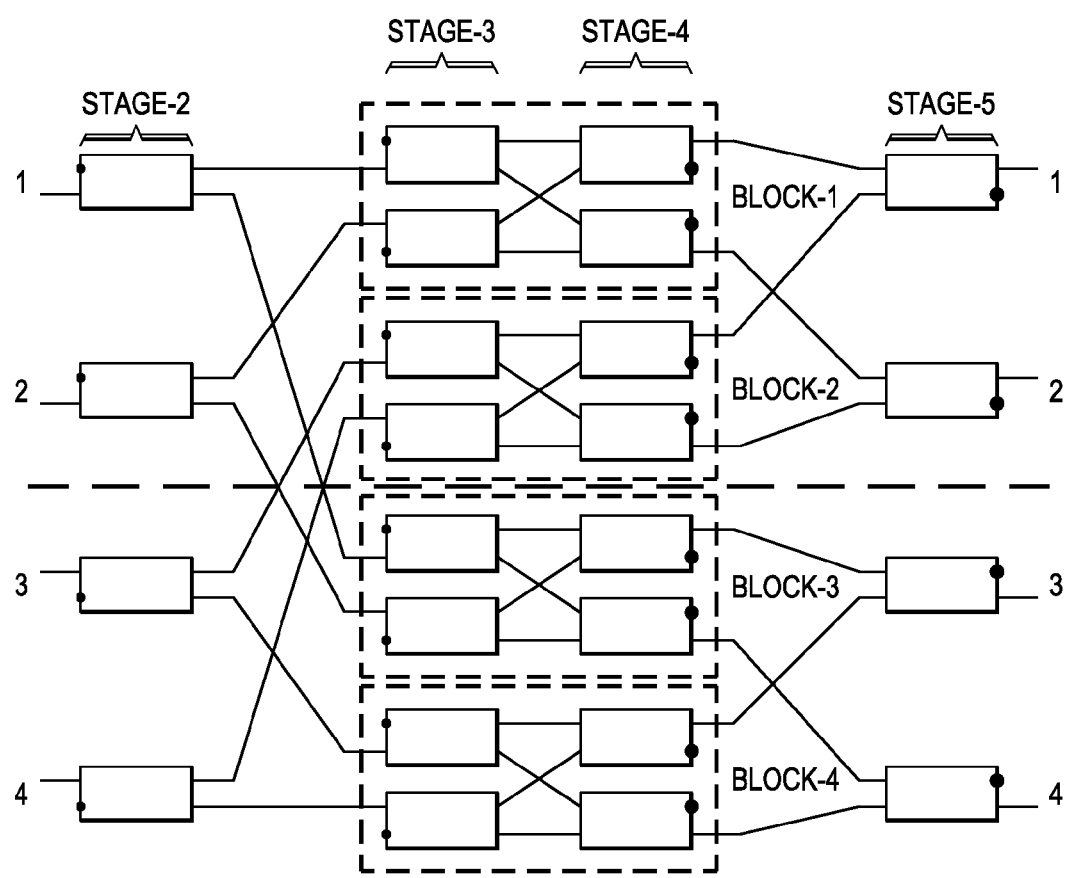
FIG. 14 illustrates a diagram of the symmetric prosperities of a 4×4 photonic switching sub-network.

FIGS. 13A-13B illustrate an 8×8 photonic switching network 800 comprising a plurality of 4×4 switching sub-networks 1310, 1320, 1330, 1340. The 4×4 switching sub-network 1310 includes 2×2 switching modules 1312, 1314, 1316, and 1318, the 4×4 switching sub-network 1320 includes 2×2 switching modules 1322, 1324, 1326, and 1328, the 4×4 switching sub-network 1330 includes 2×2 switching modules 1332, 1334, 1336, and 1338, and the 4×4 switching sub-network 1340 includes 2×2 switching modules 1342, 1344, 1346, and 1348. Switching configurations for photonic elements in stage-1 and stage-6 are defined by the connection map. Switching configurations for each of the intermediate 4×4 sub-networks 1310, 1320, 1330, 1340 are determined on an individual basis. More specifically, switching configurations for photonic elements in stage-2 and stage-5 are determined by applying a first set of rules (described below) to the input signals entering the respective 4×4 sub-networks 1310, 1310, 1320, 1330, 1340. Thereafter, switching configurations for photonic elements in stage-3 and stage-4 are determined by applying a second set of rules (described below) to the input signals entering the respective 2×2 sub-networks 1312, 1314, 1316, 1318, 1322, 1324, 1326, 1328, 1332, 1334, 1336, 1338, 1342, 1344, 1346, 1348. The rules for determining the switching configurations are demonstrated in FIGS. 15-19H, with the 4×4 module being symmetric about the dashed line shown in FIG. 14.

Figure 15:
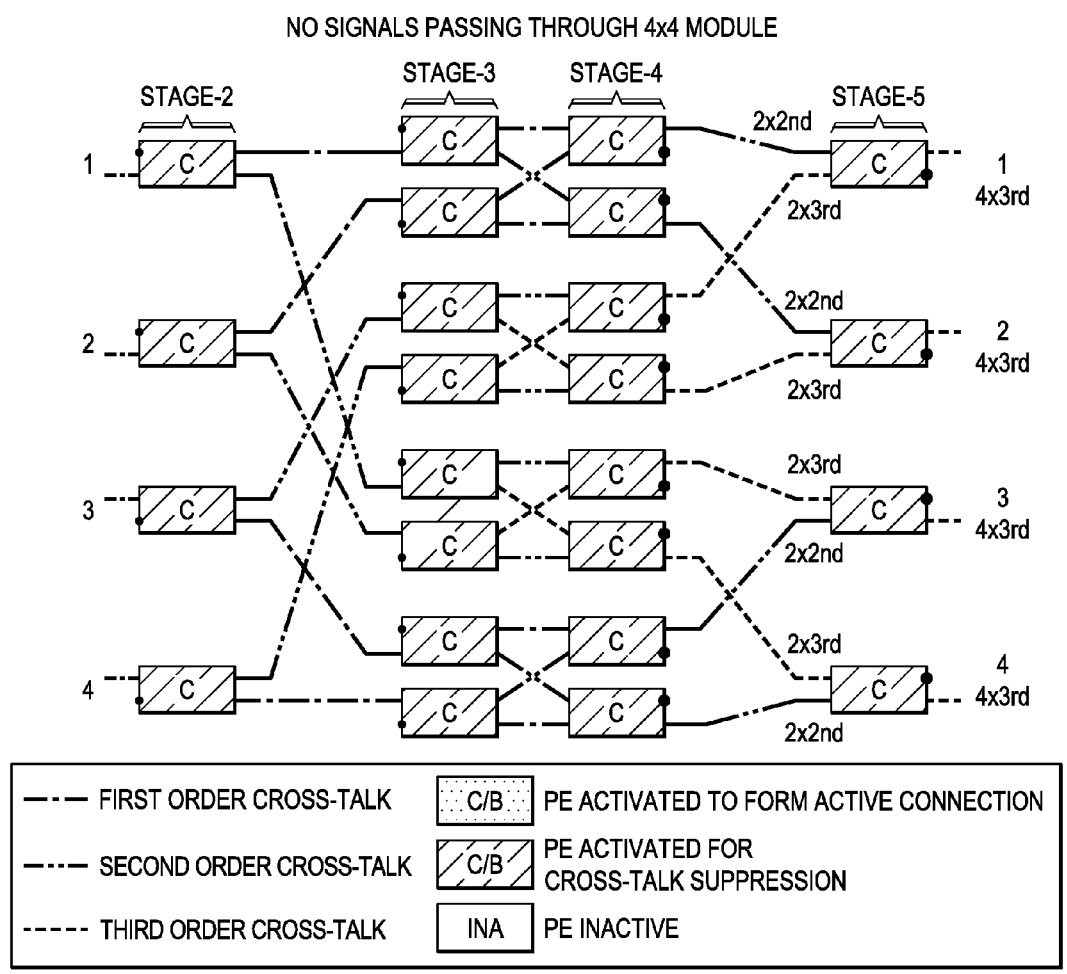
FIG. 15 illustrates a diagram of embodiment switching configuration for a 4×4 photonic switching sub-network.
Figure 16A:
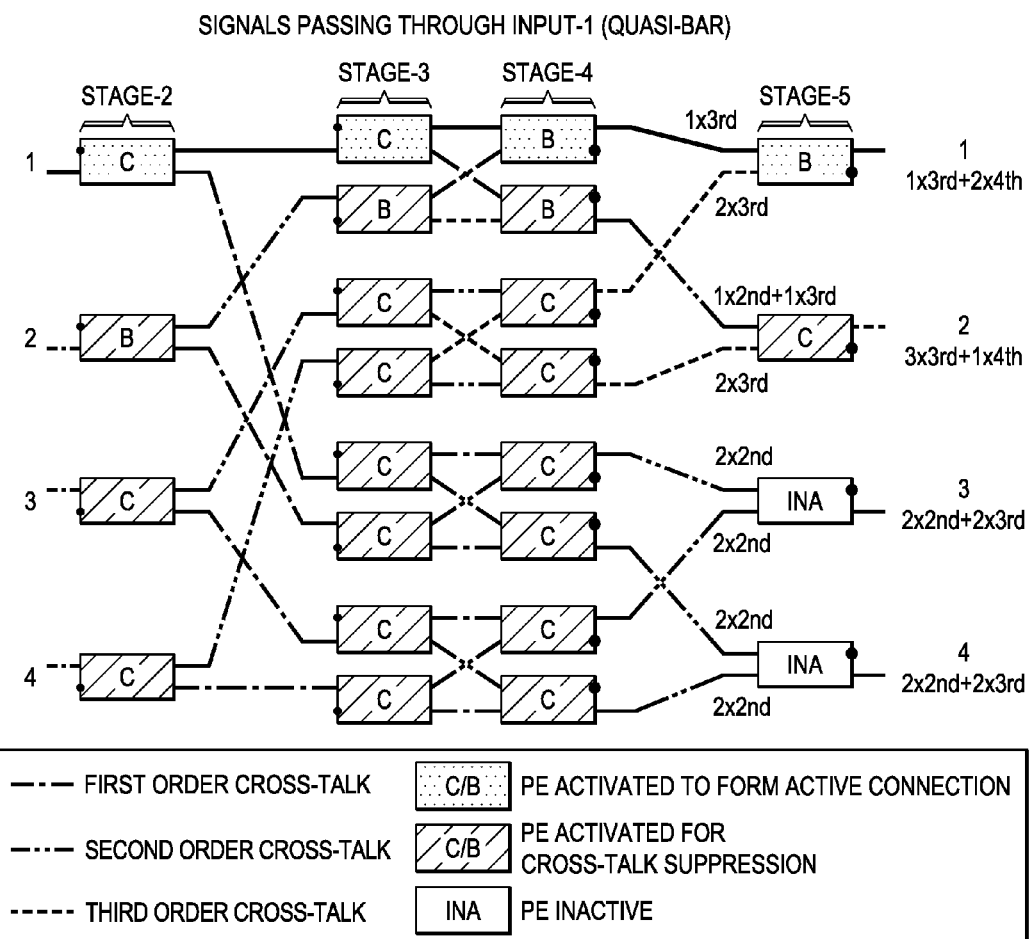
FIGS. 16A-16D illustrate diagrams of additional embodiment switching configurations for 4×4 photonic switching sub-networks.
Figure 16B:
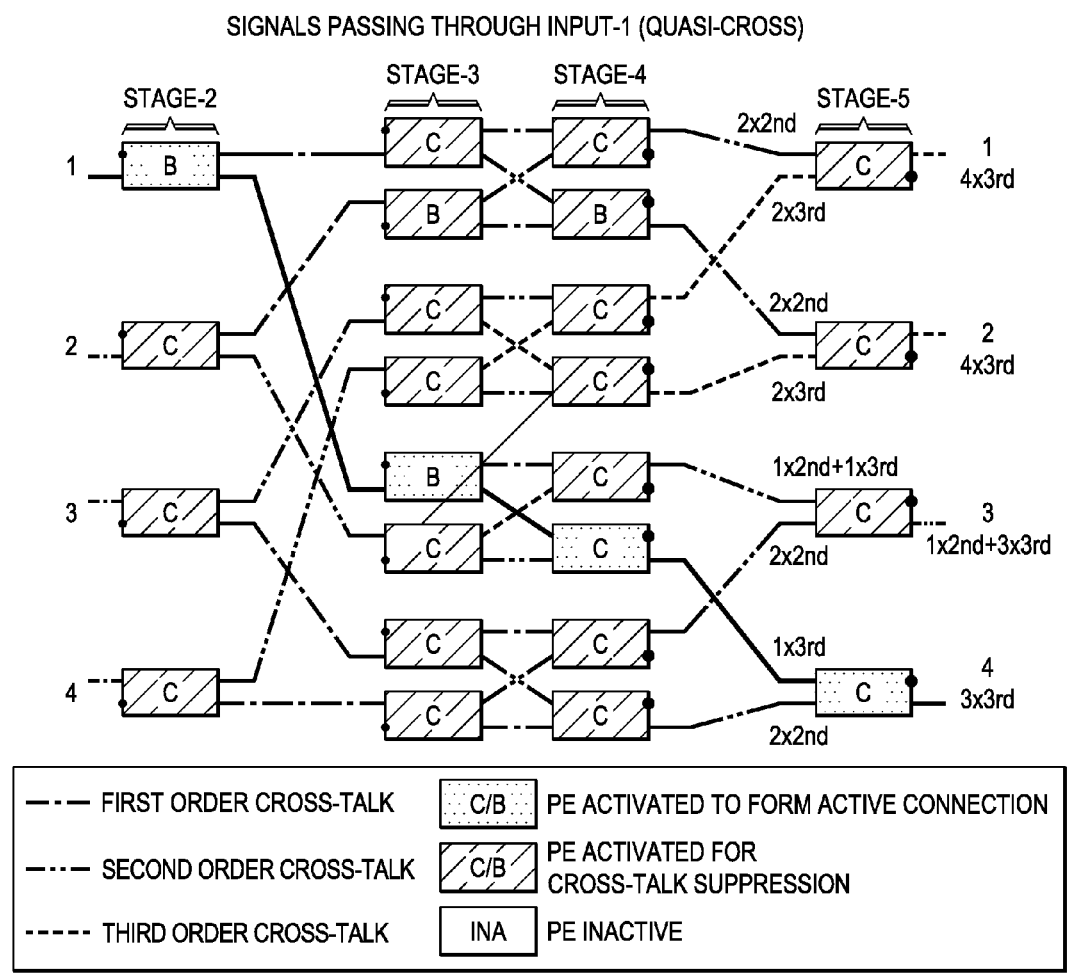
Figure 16C:
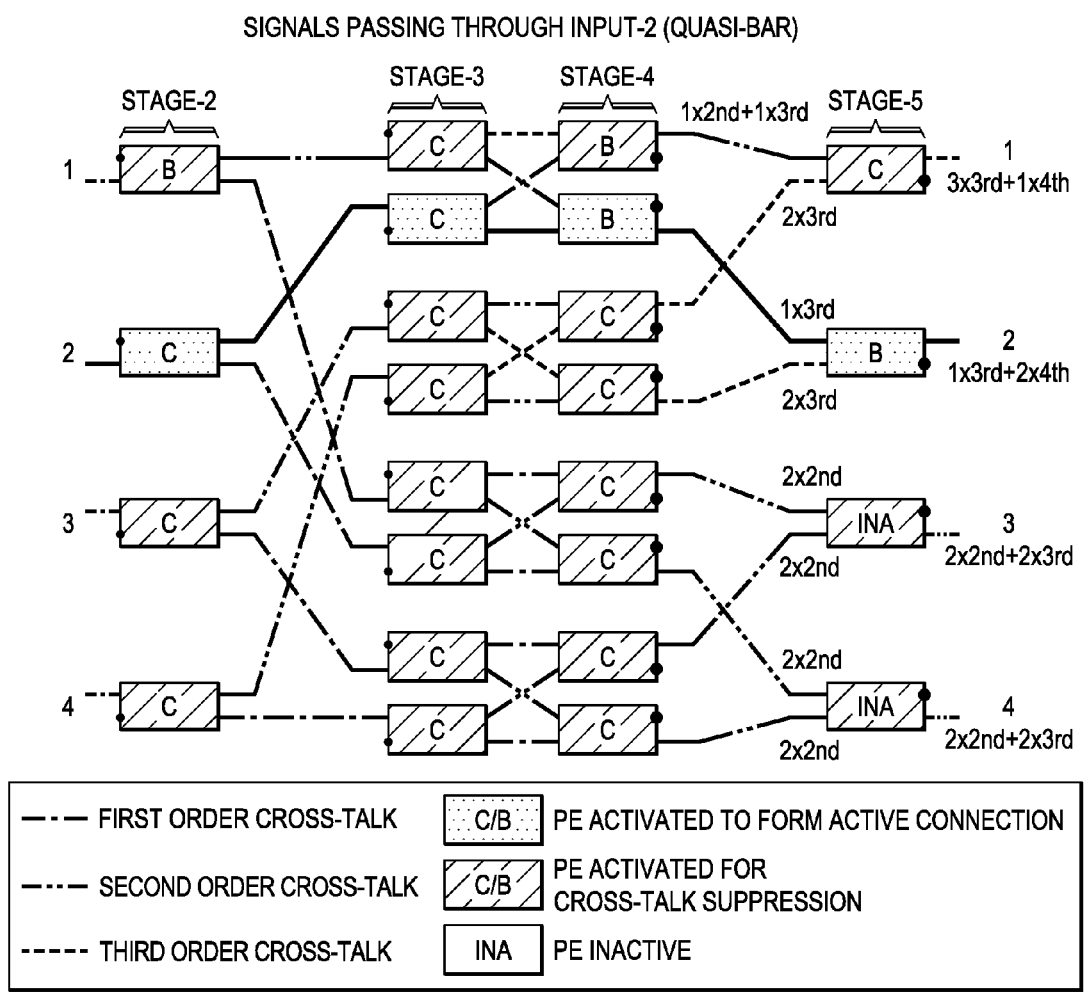
Figure 16D:
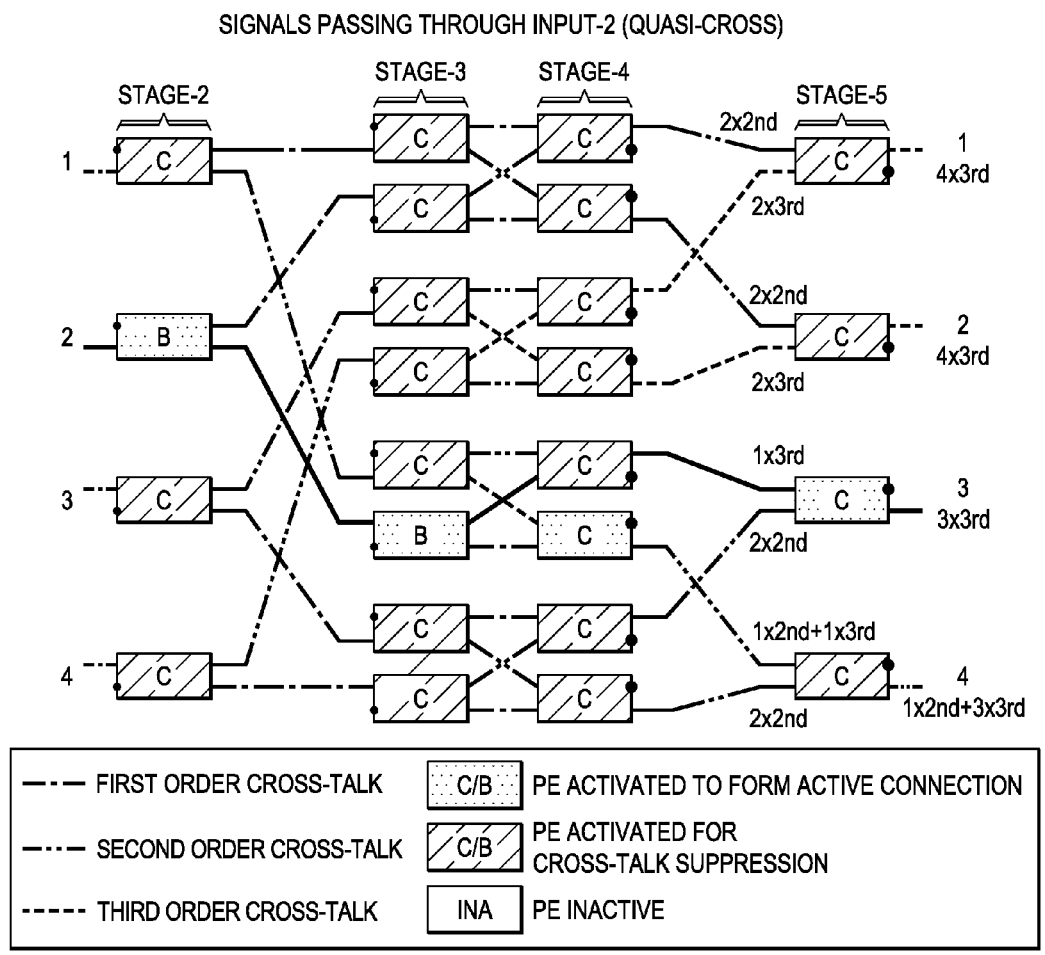
Figure 17A:
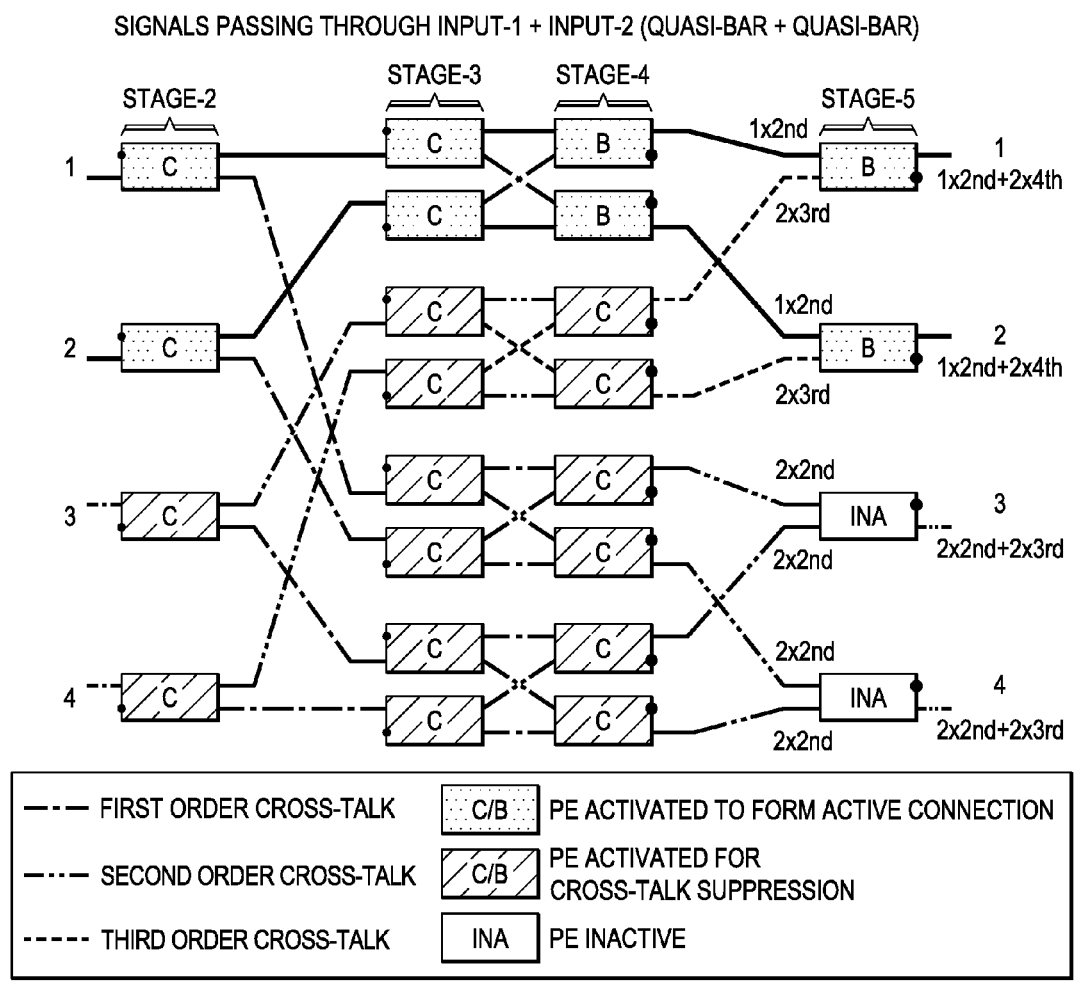
FIGS. 17A-17P illustrate diagrams of yet additional embodiment switching configurations for 4×4 photonic switching sub-networks.
Figure 17B:
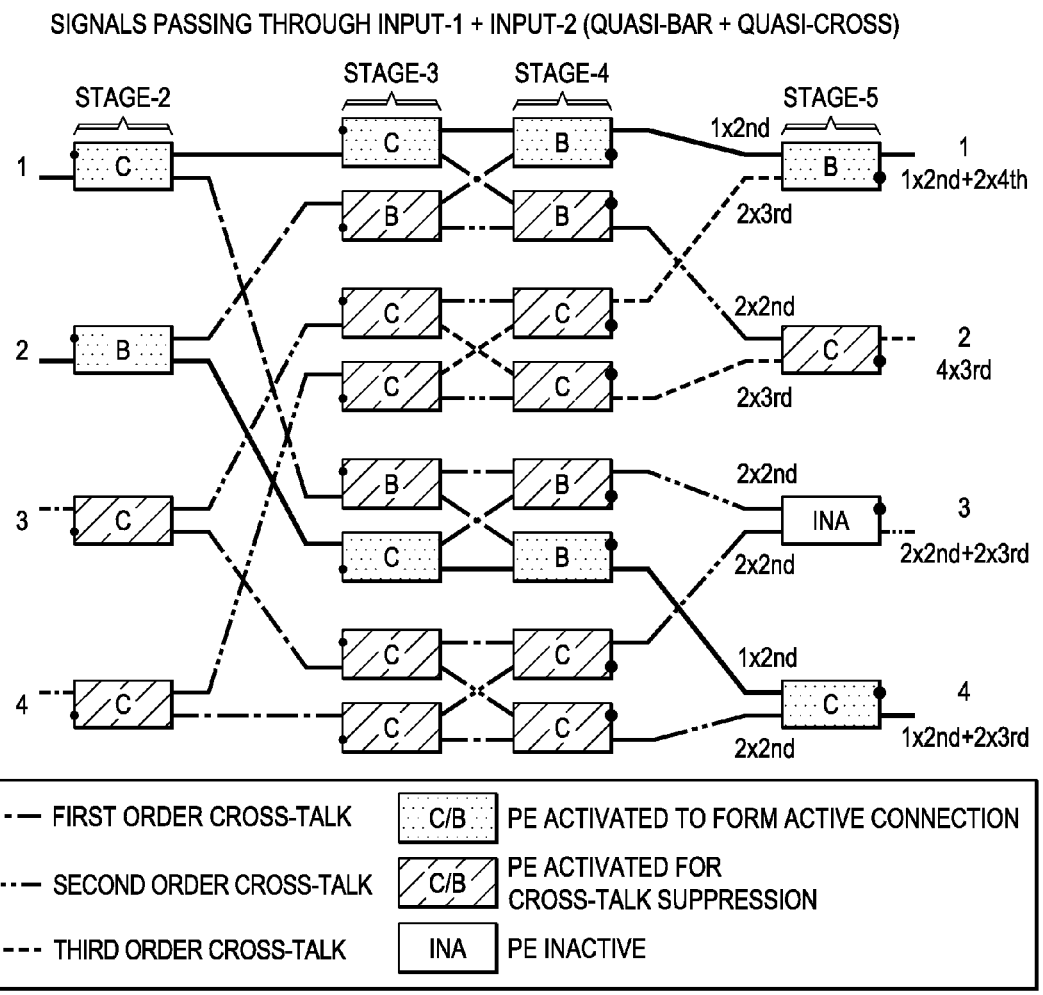
Figure 17C:
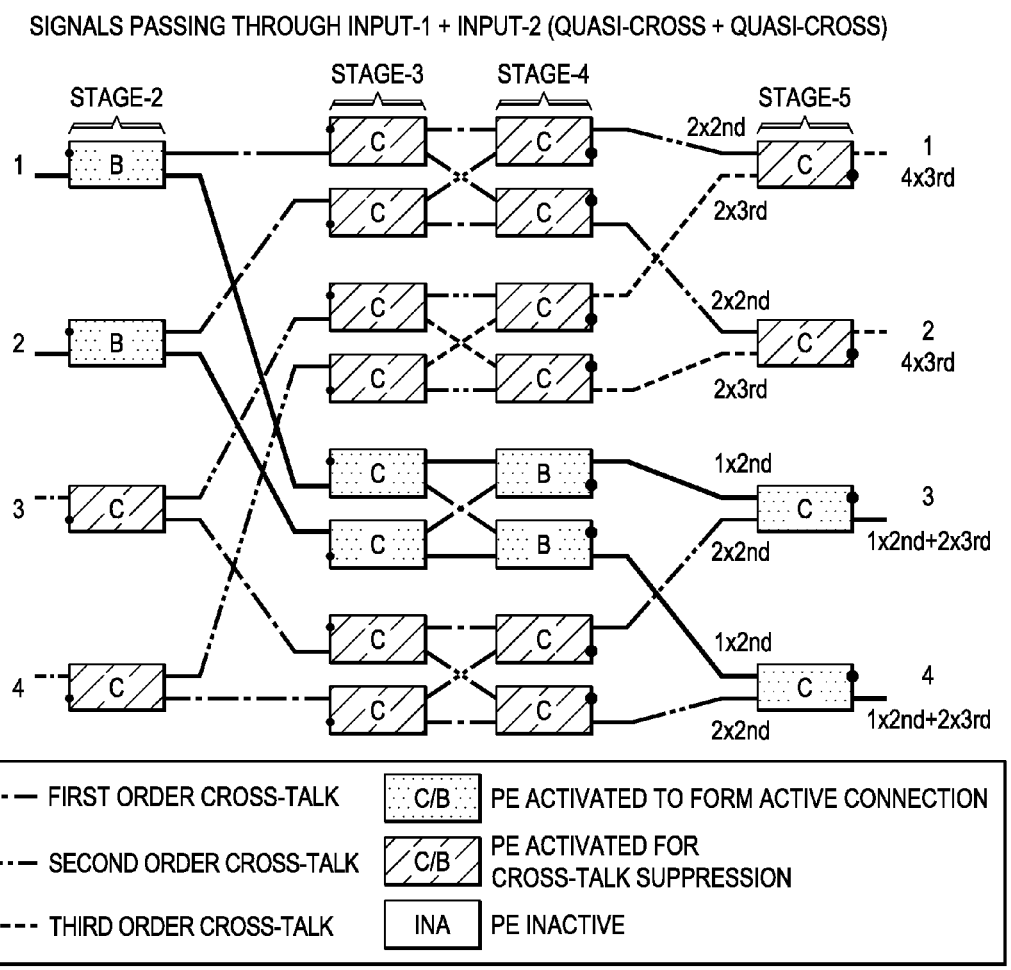
Figure 17D:
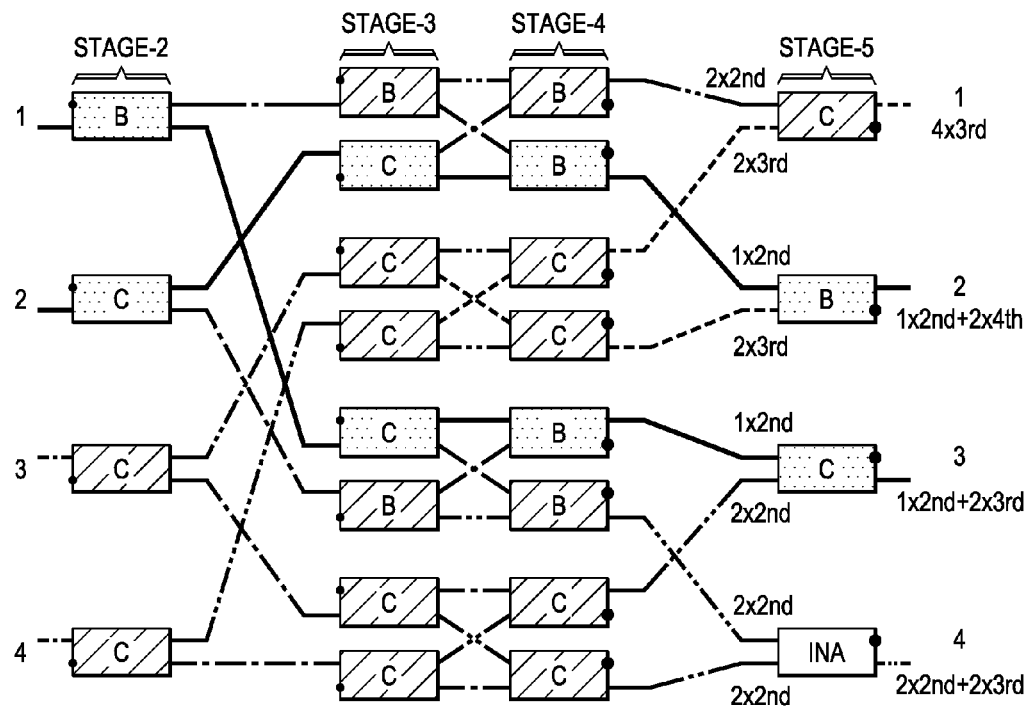
Figure 17E:
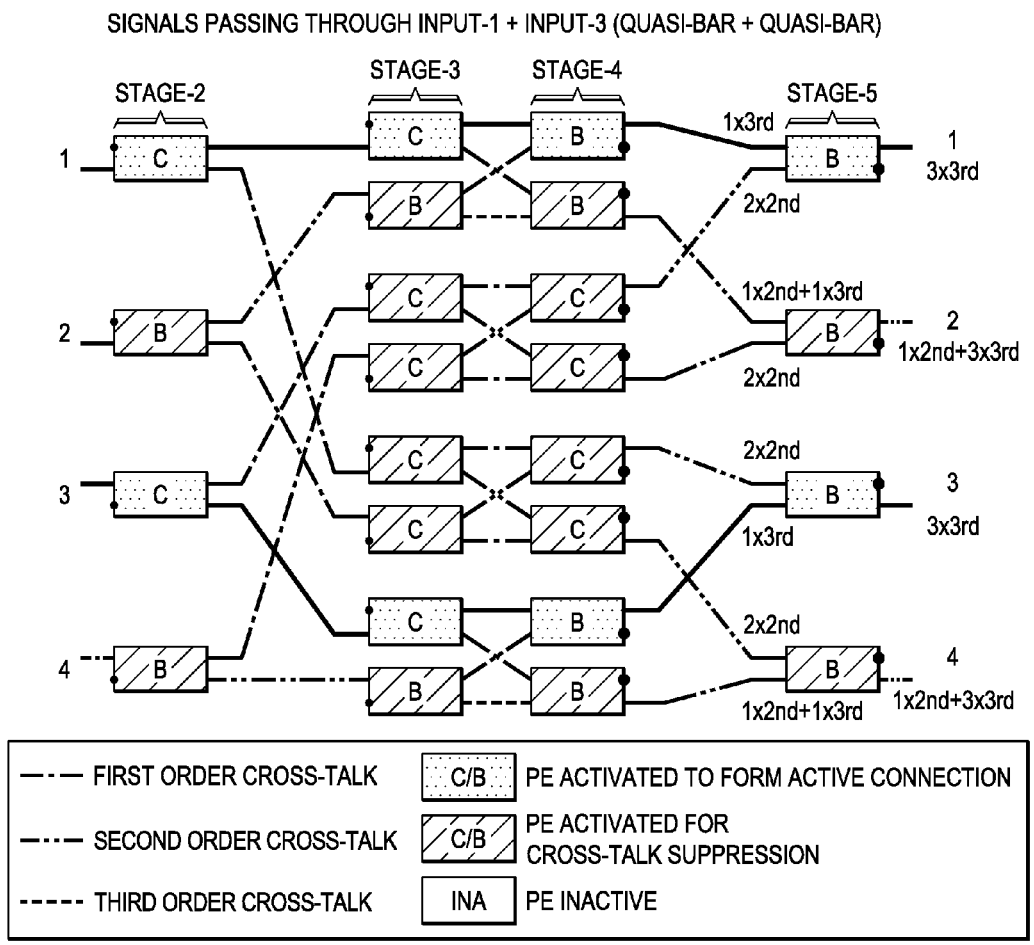
Figure 17F:
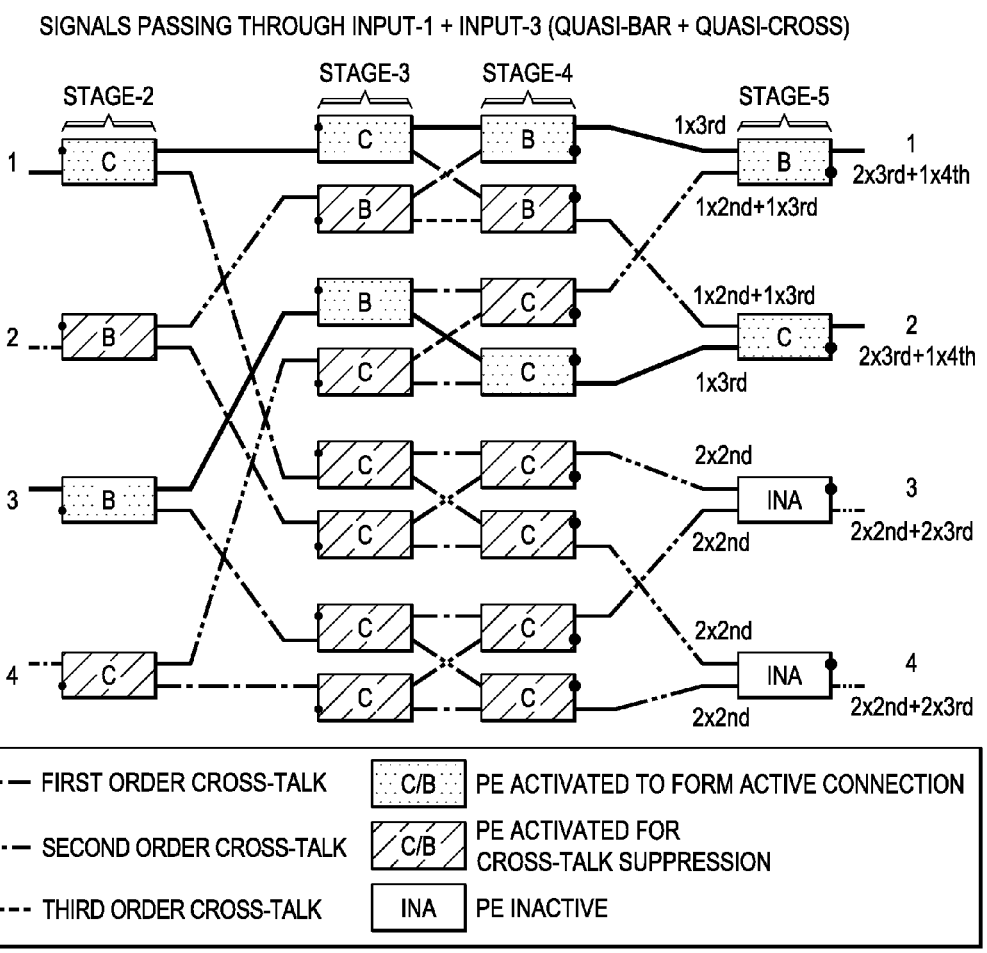
Figure 17G:
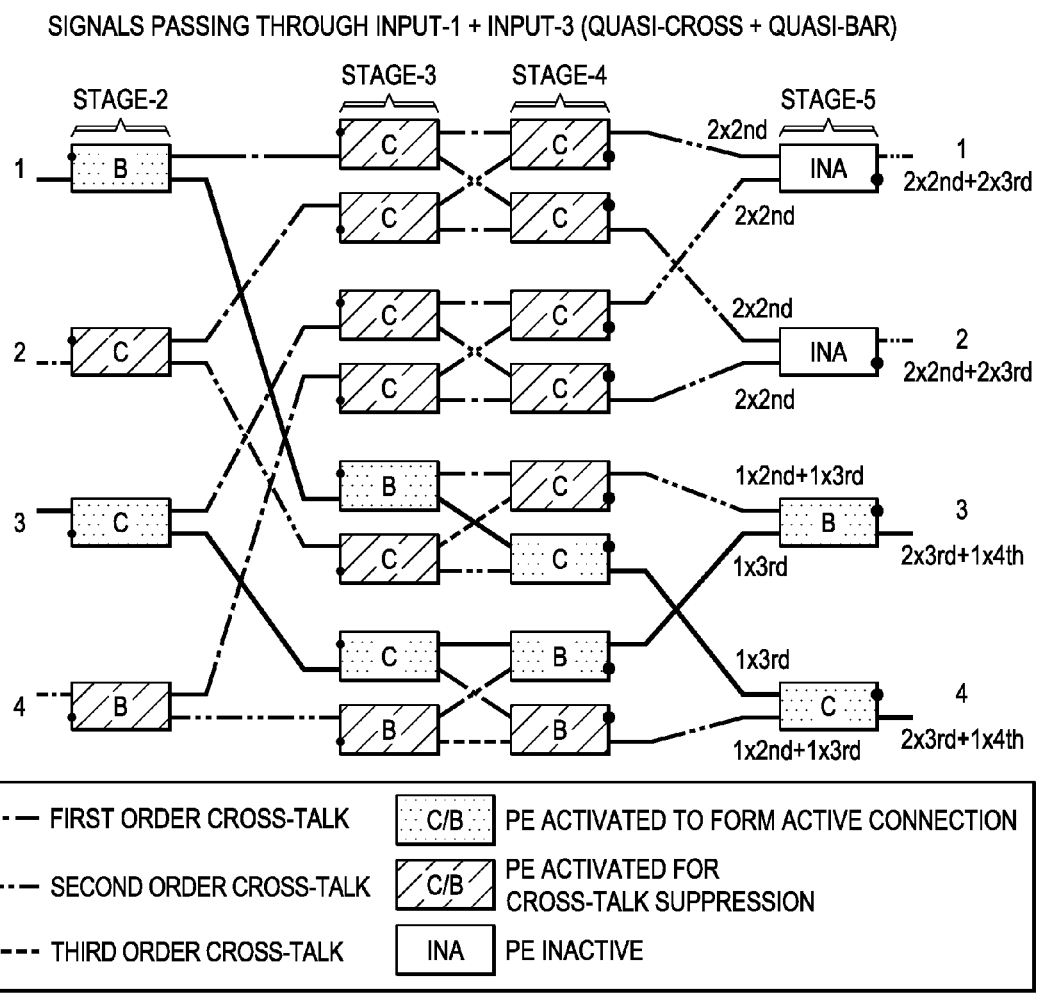
Figure 17H:
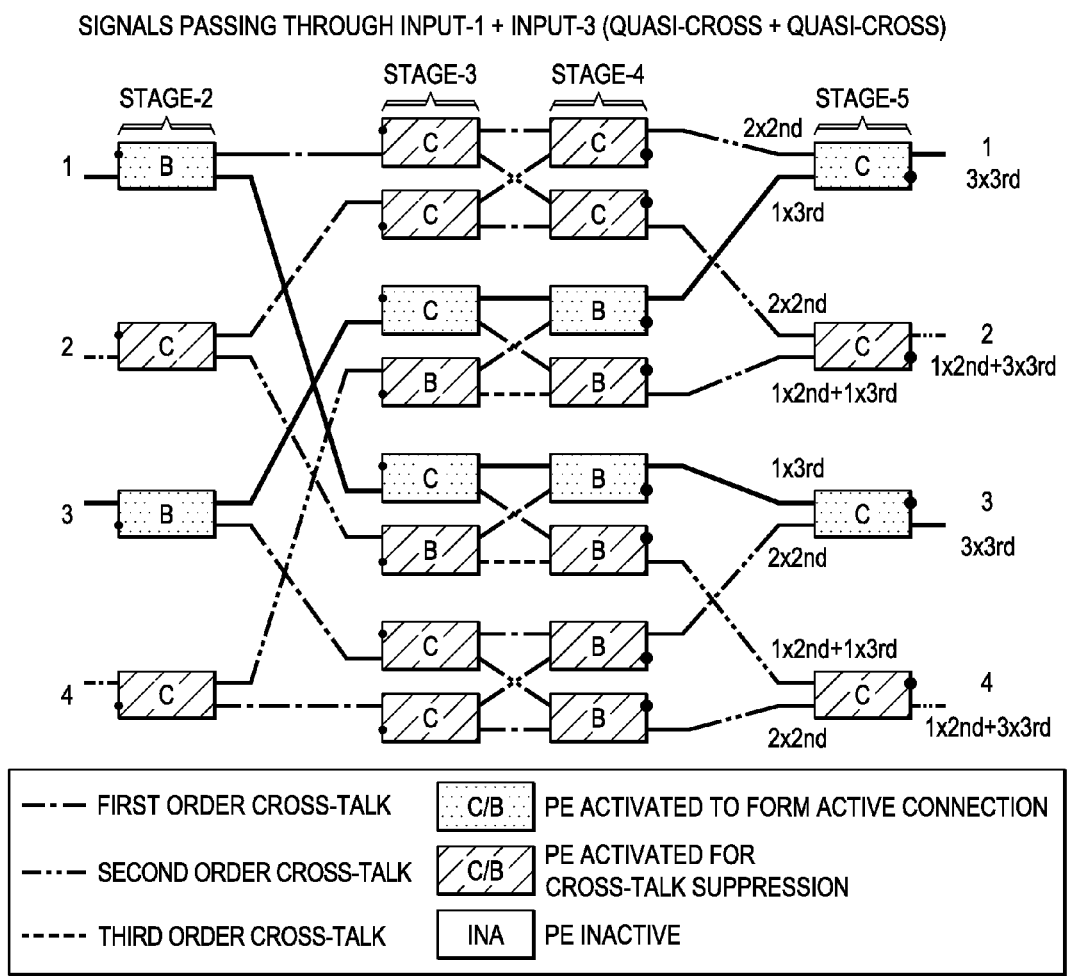
Figure 17I:
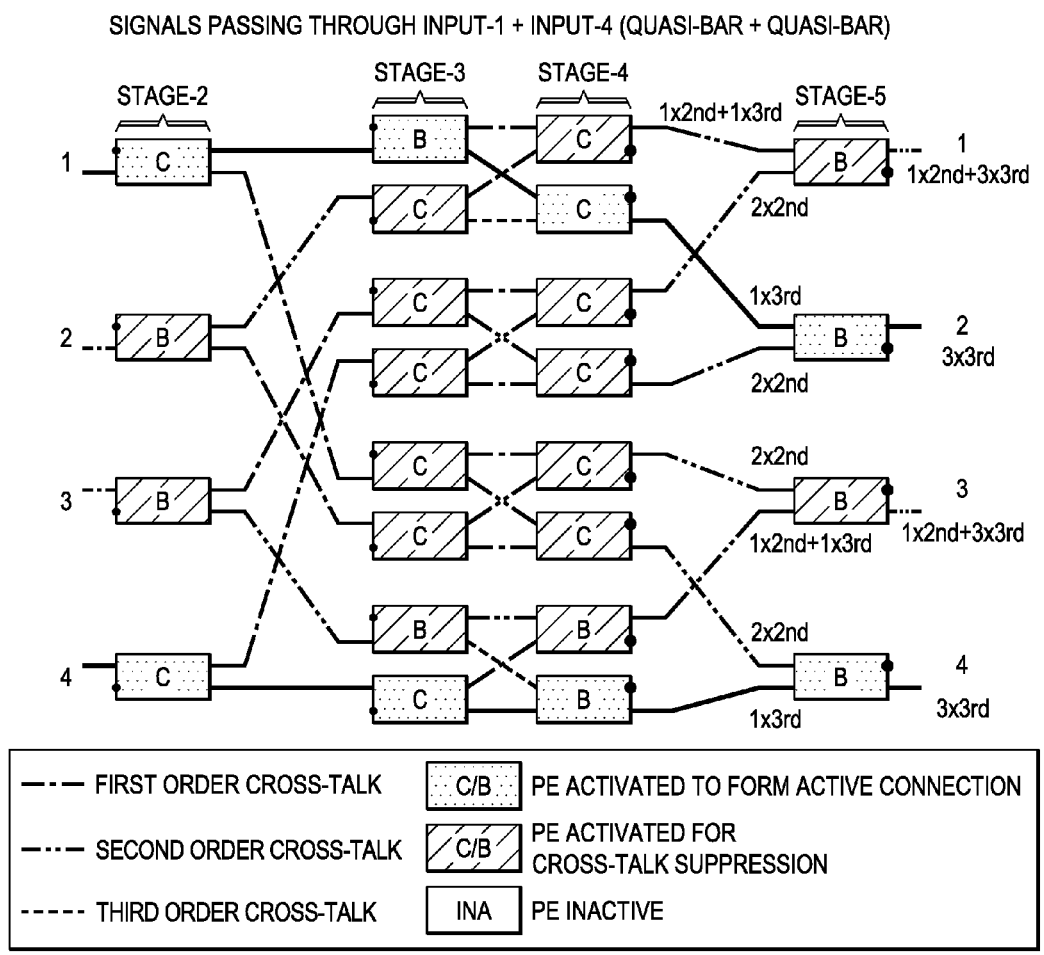
Figure 17K:
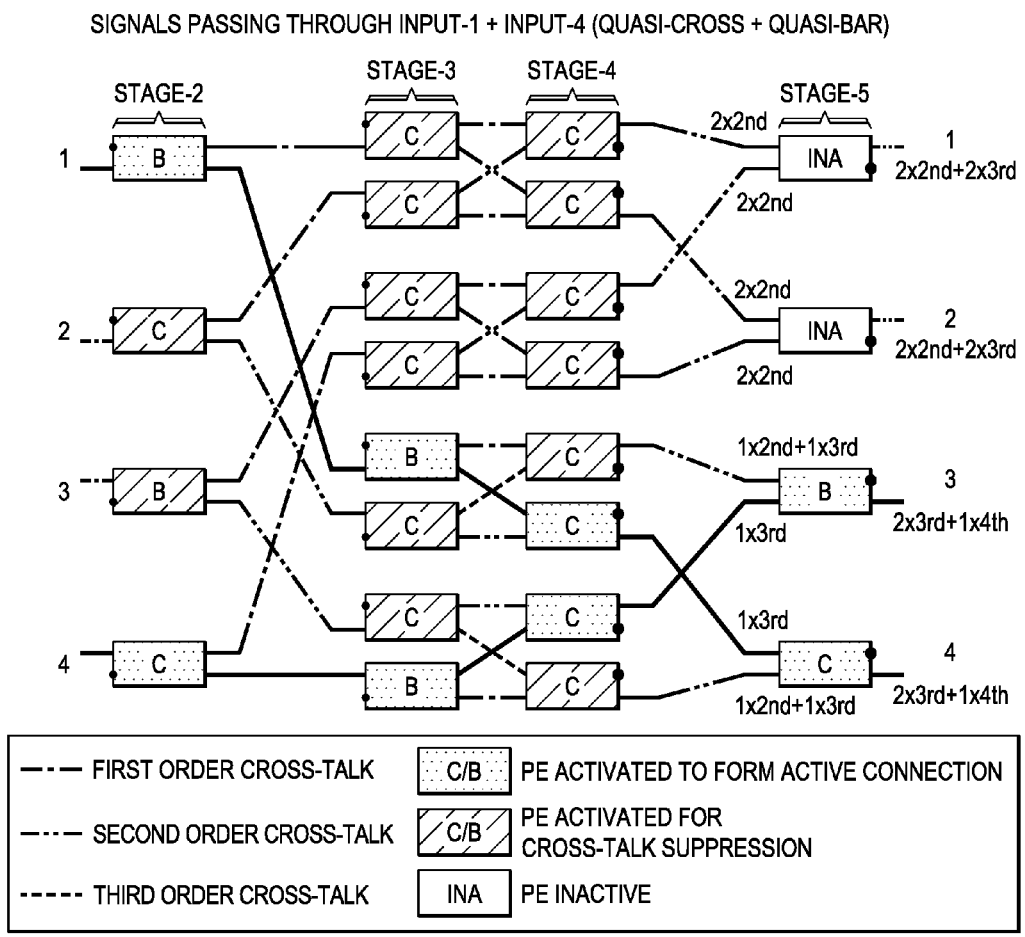
Figure 17L:
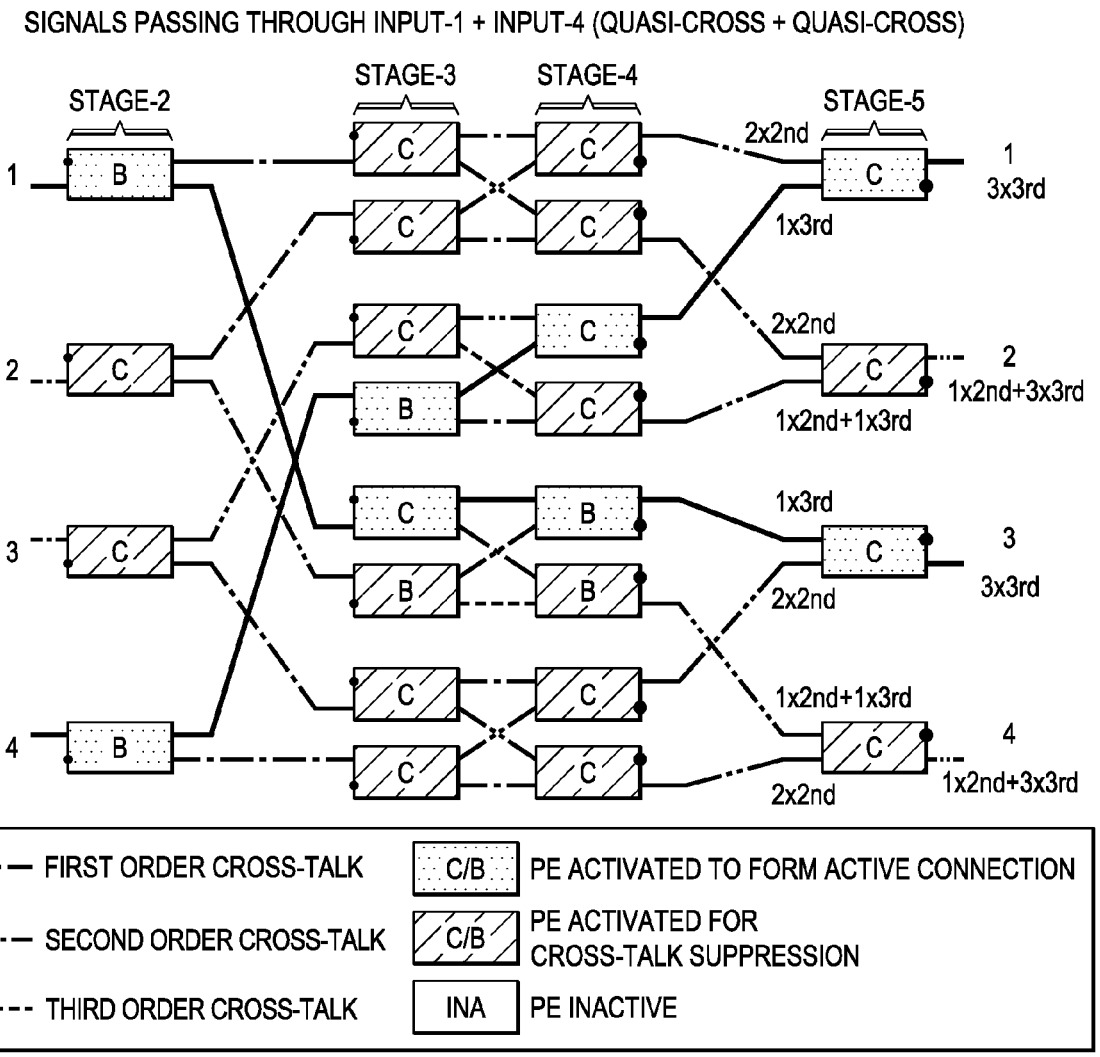
Figure 17M:
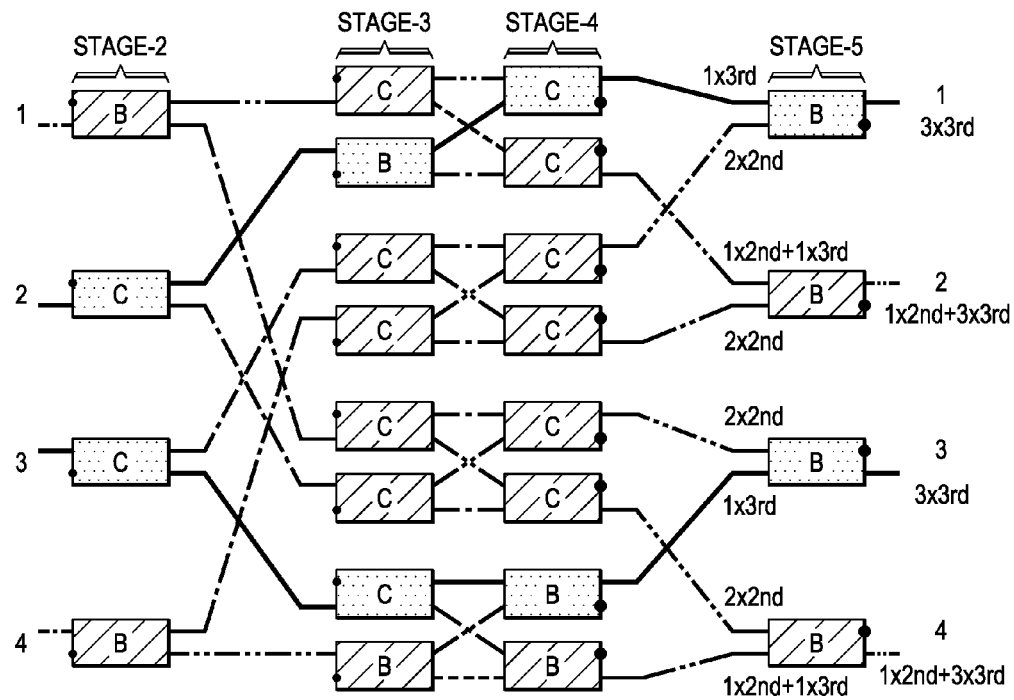
Figure 17N:
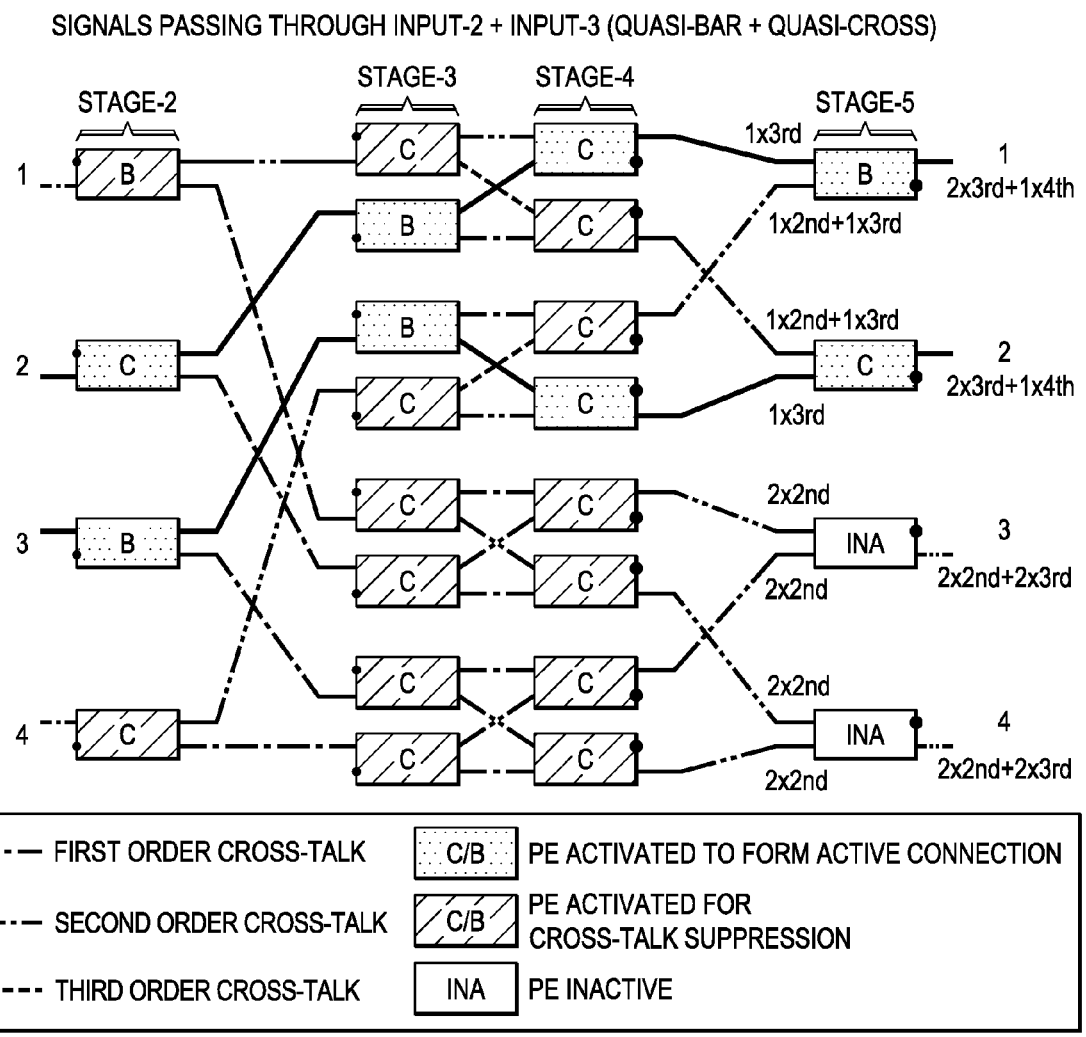
Figure 17O:
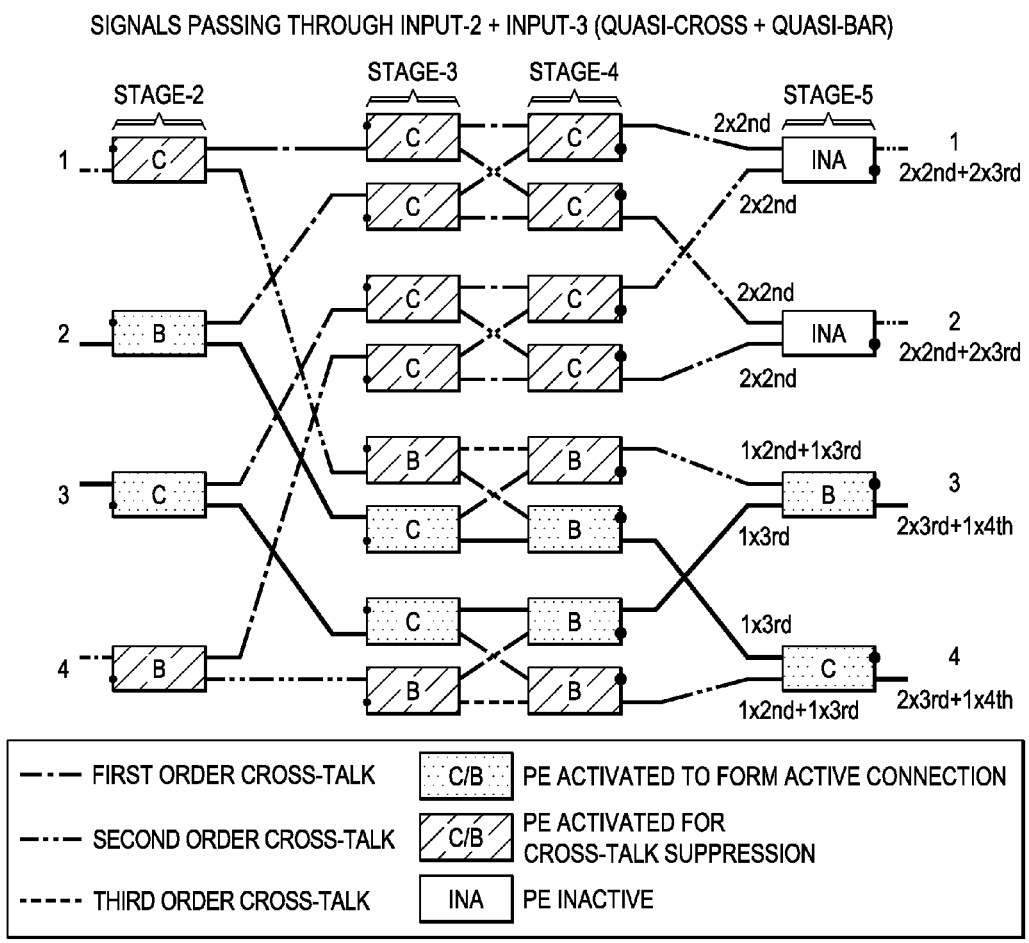
Figure 17P:
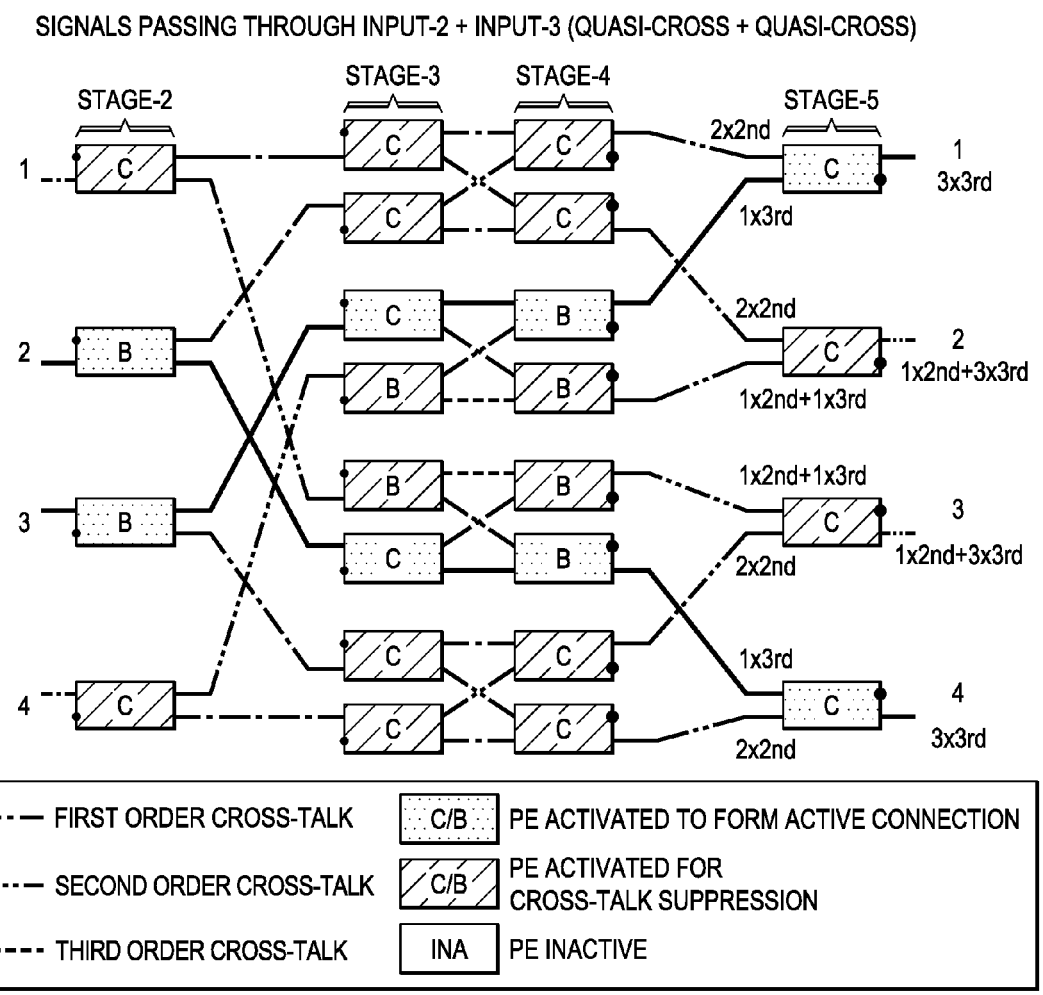
Figure 18A:
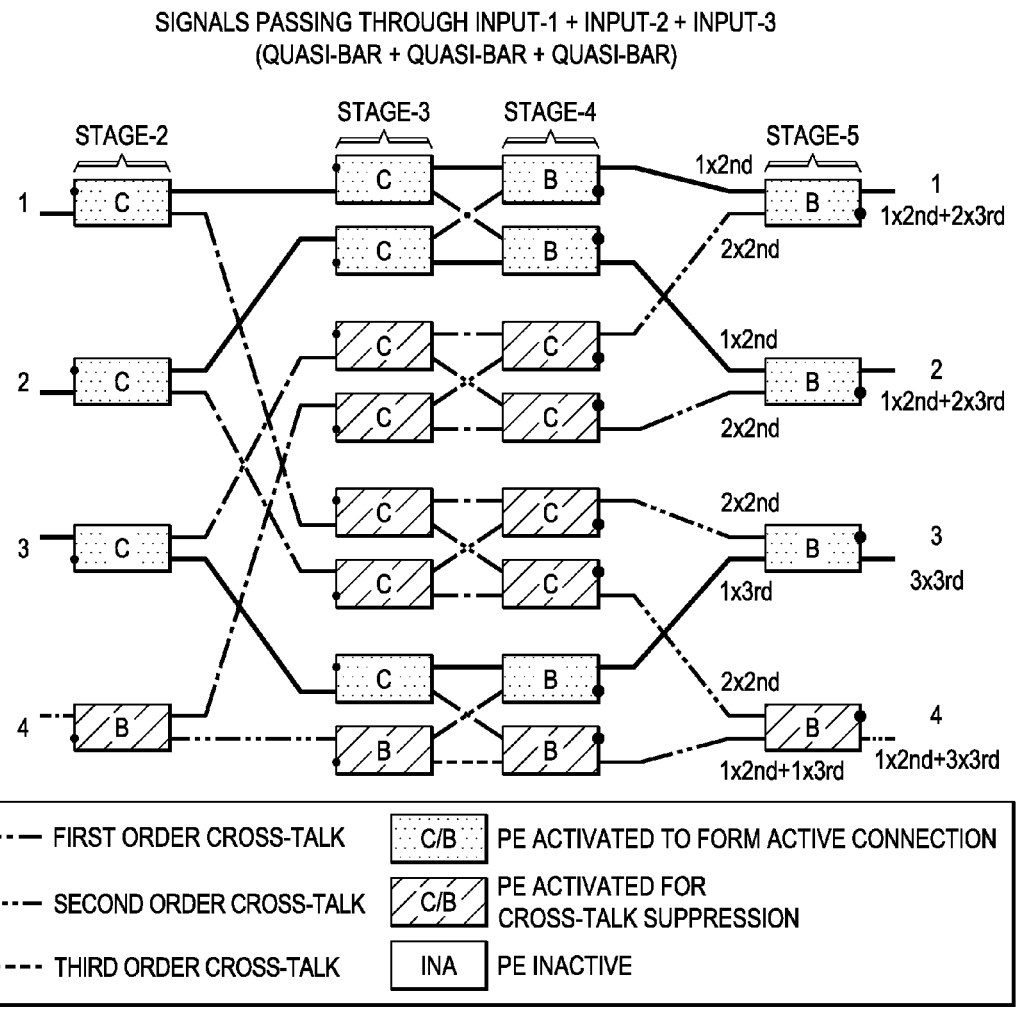
FIGS. 18A-18L illustrate diagrams of yet additional embodiment switching configurations for 4×4 photonic switching sub-networks.
Figure 18B:
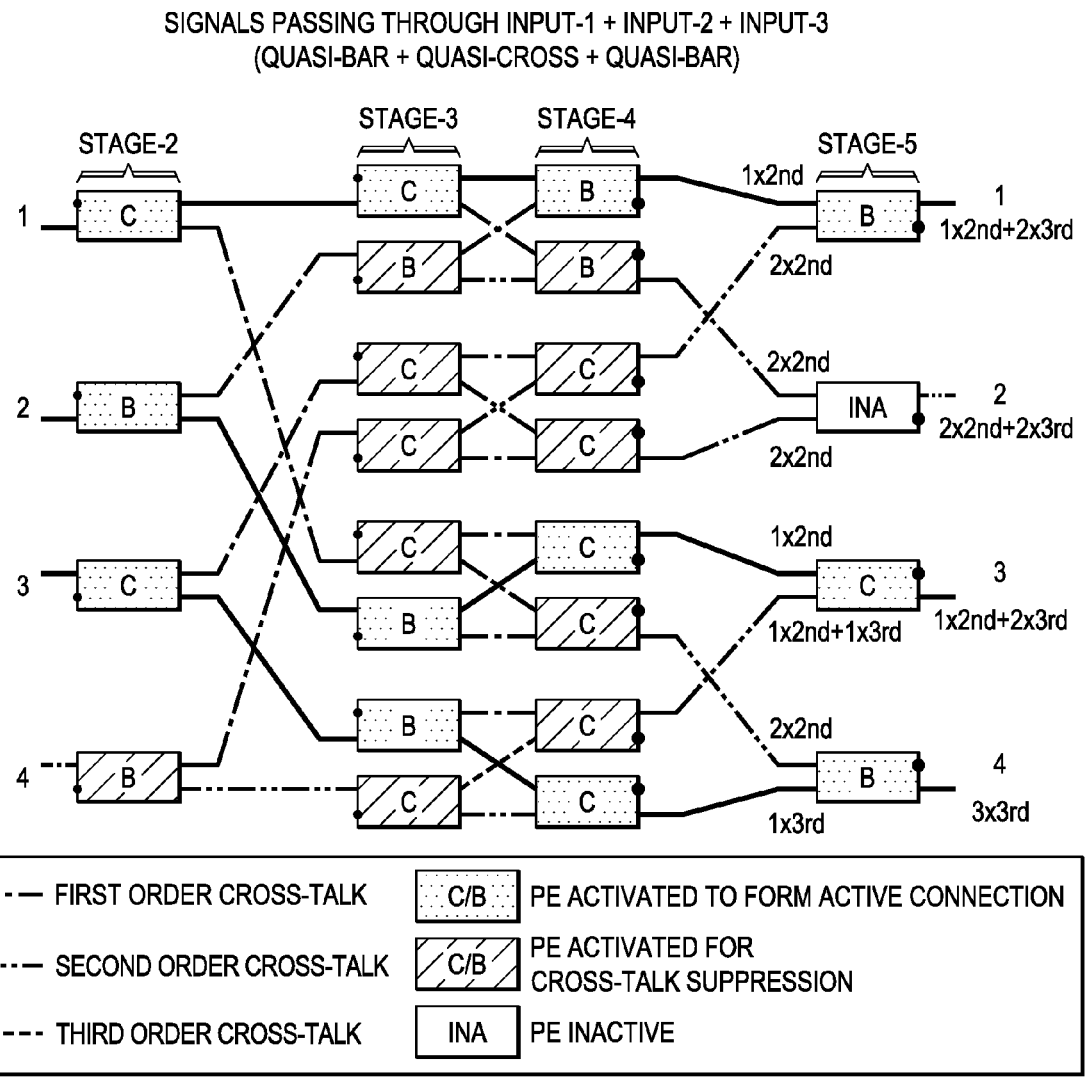
Figure 18C:
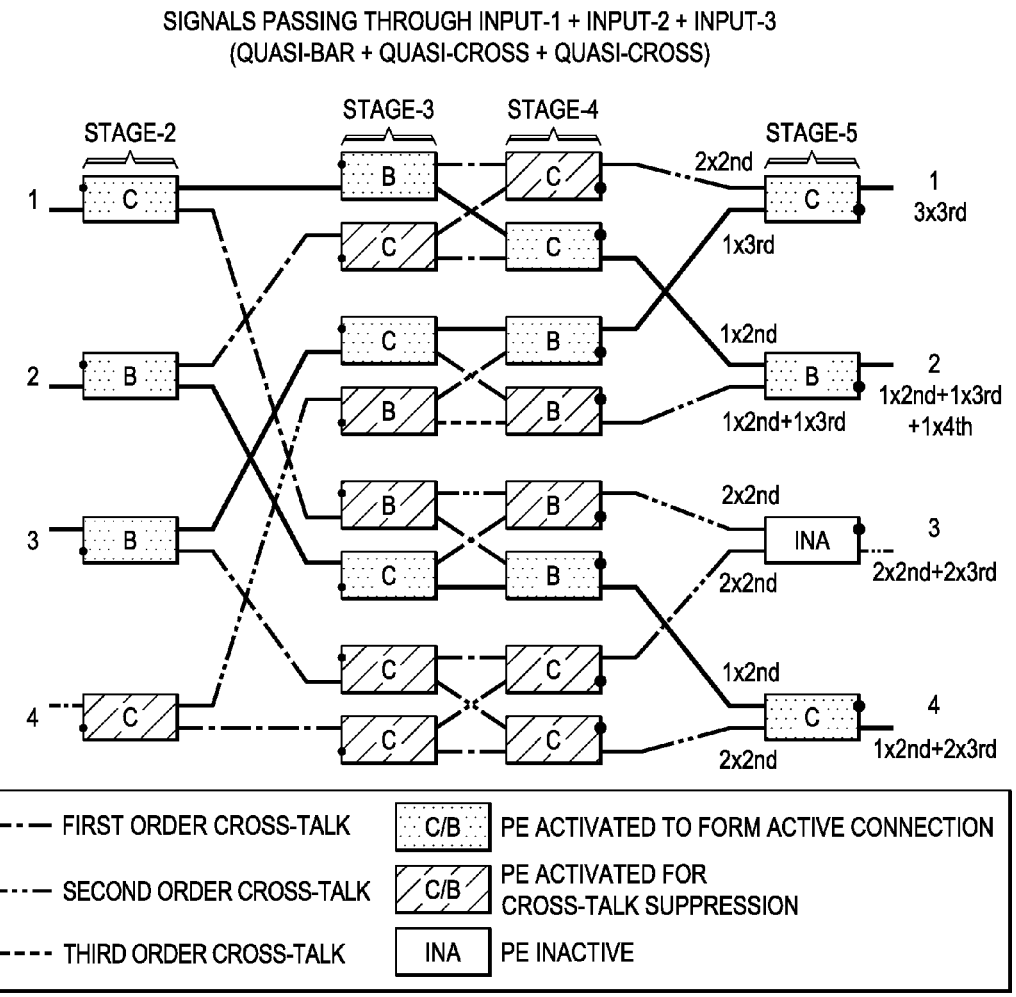
Figure 18D:
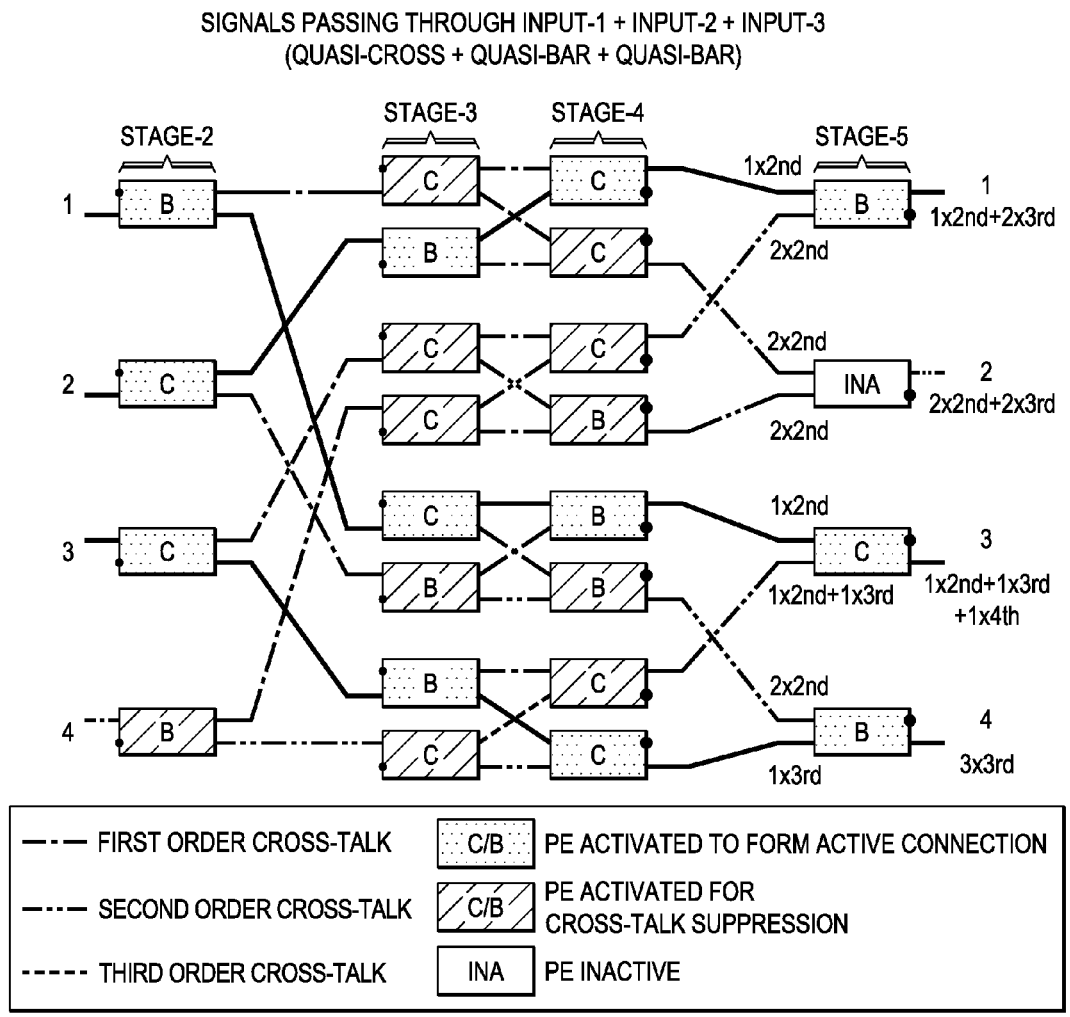
Figure 18E:
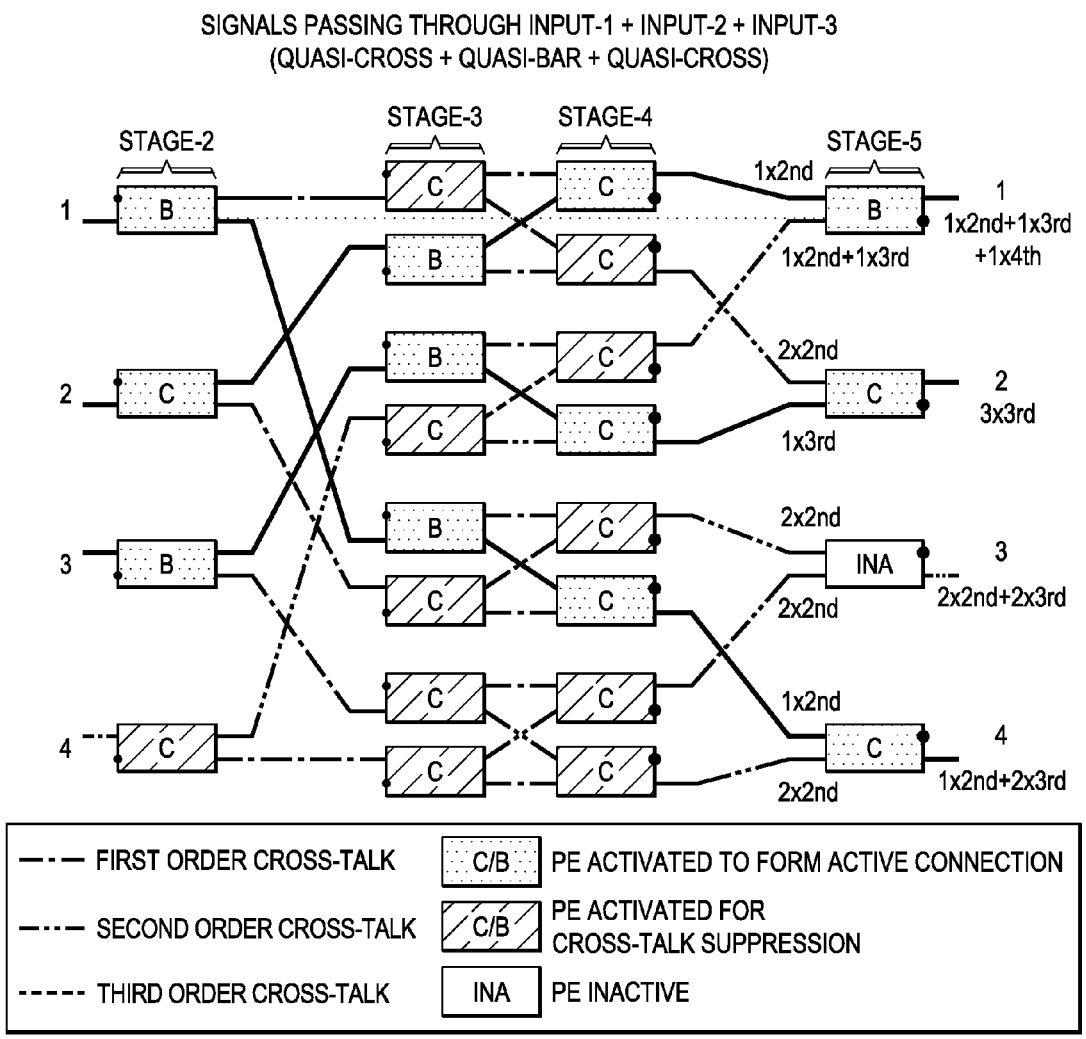
Figure 18F:
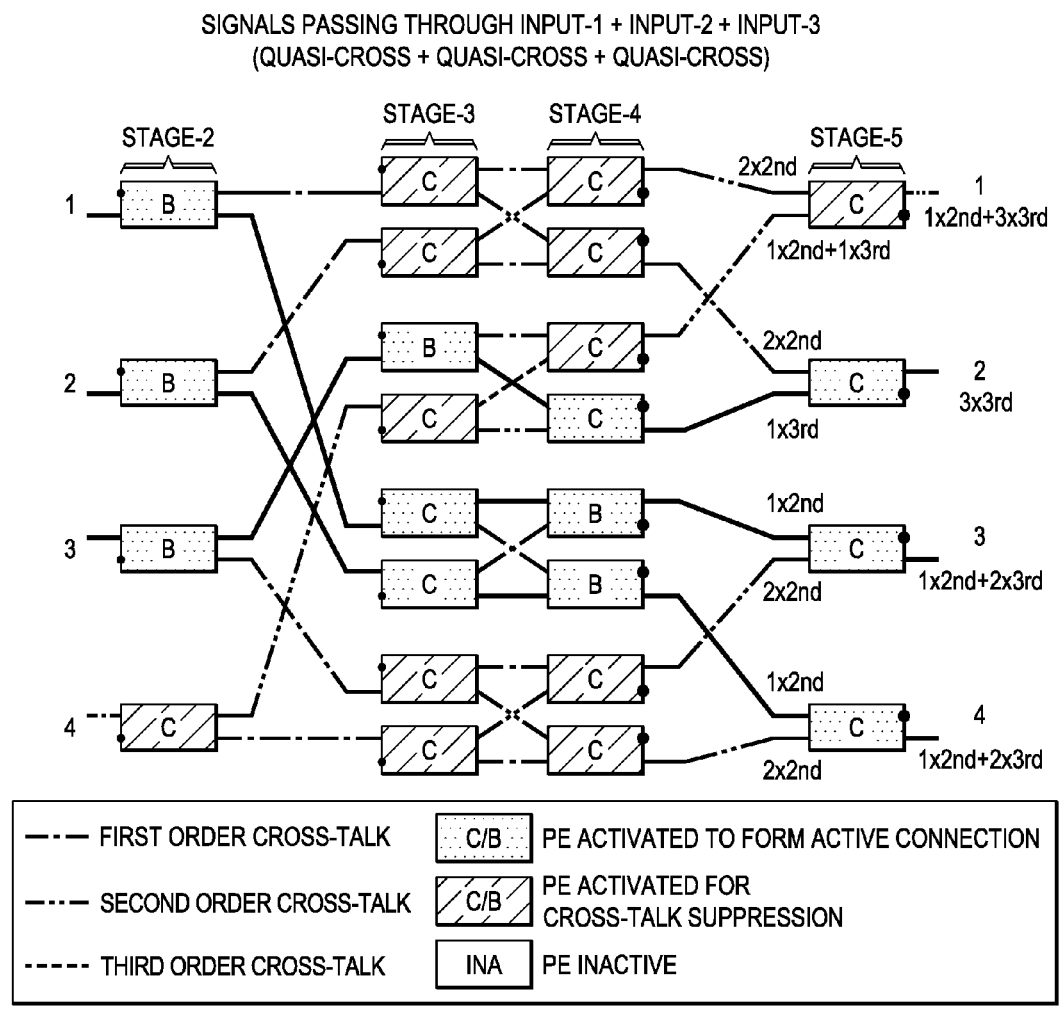
Figure 18G:
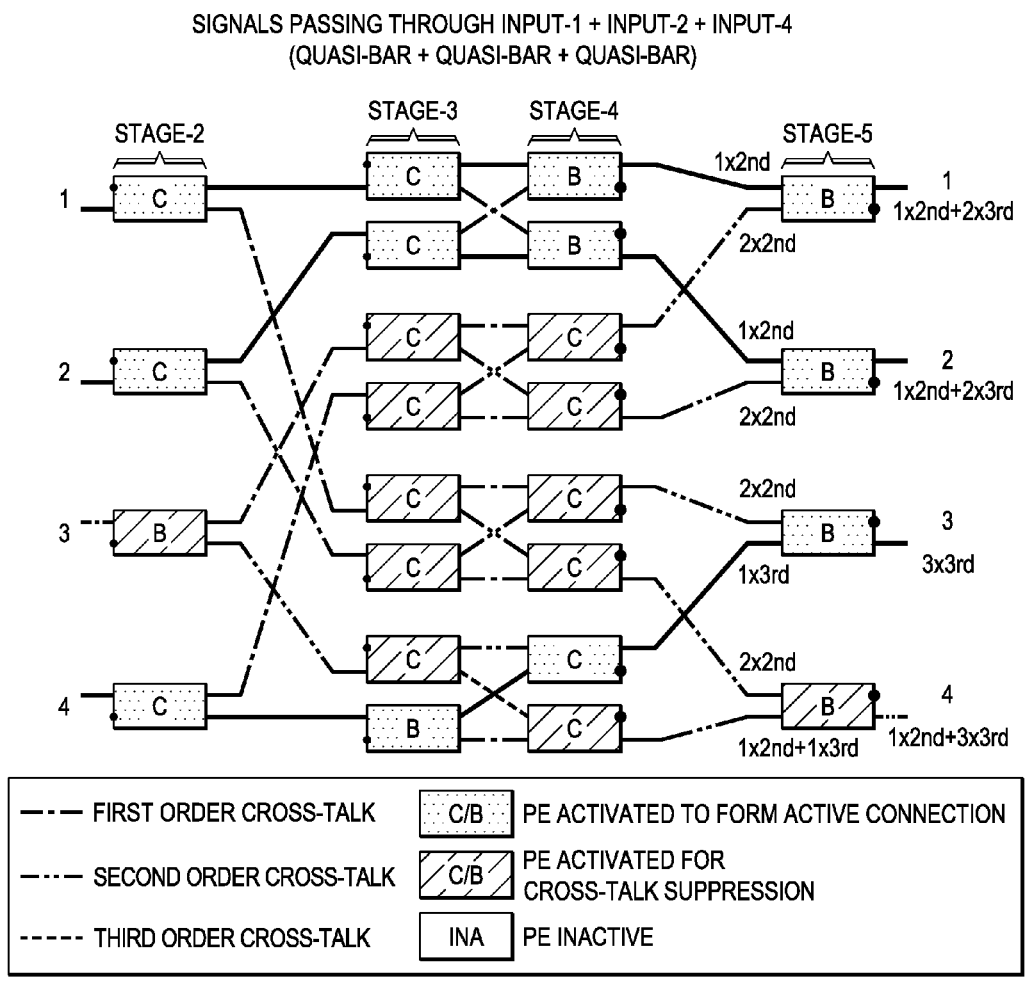
Figure 18H:
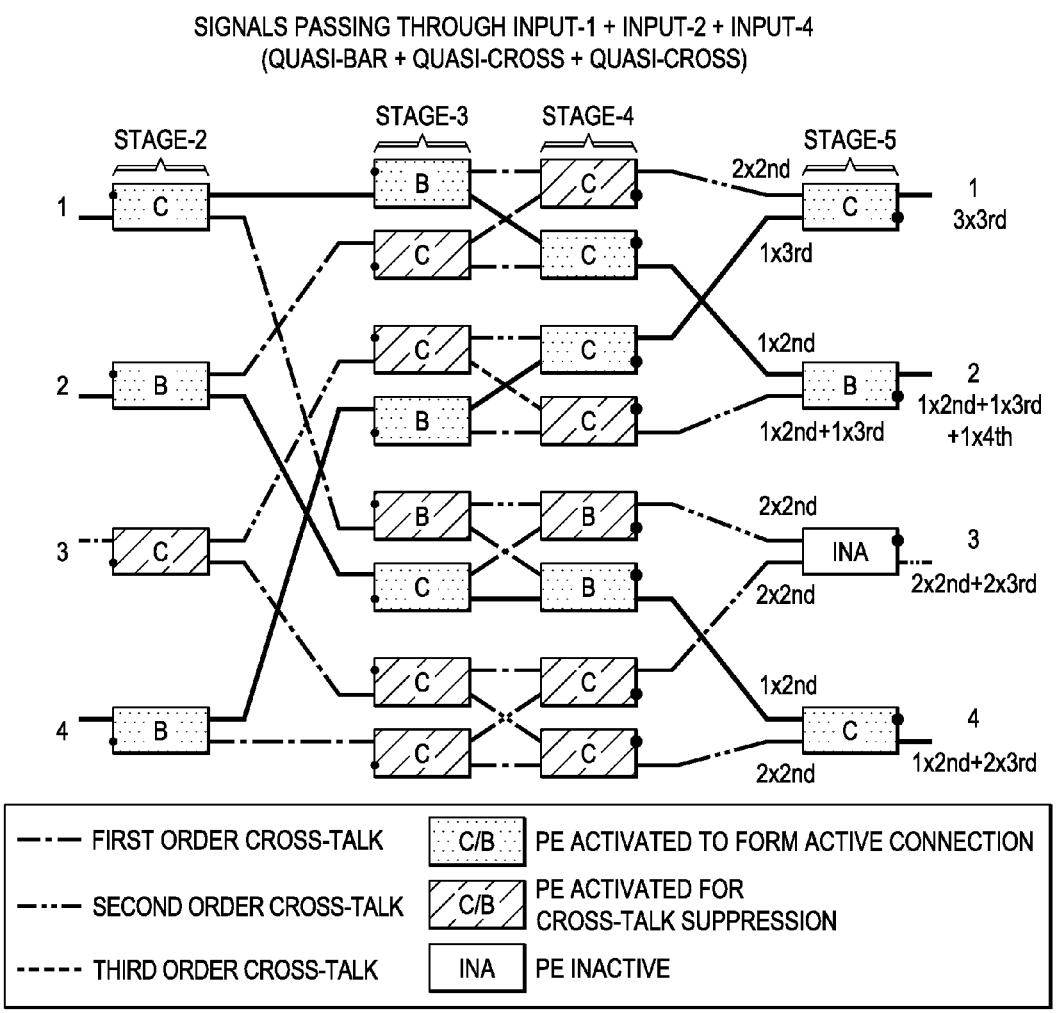
Figure 18I:
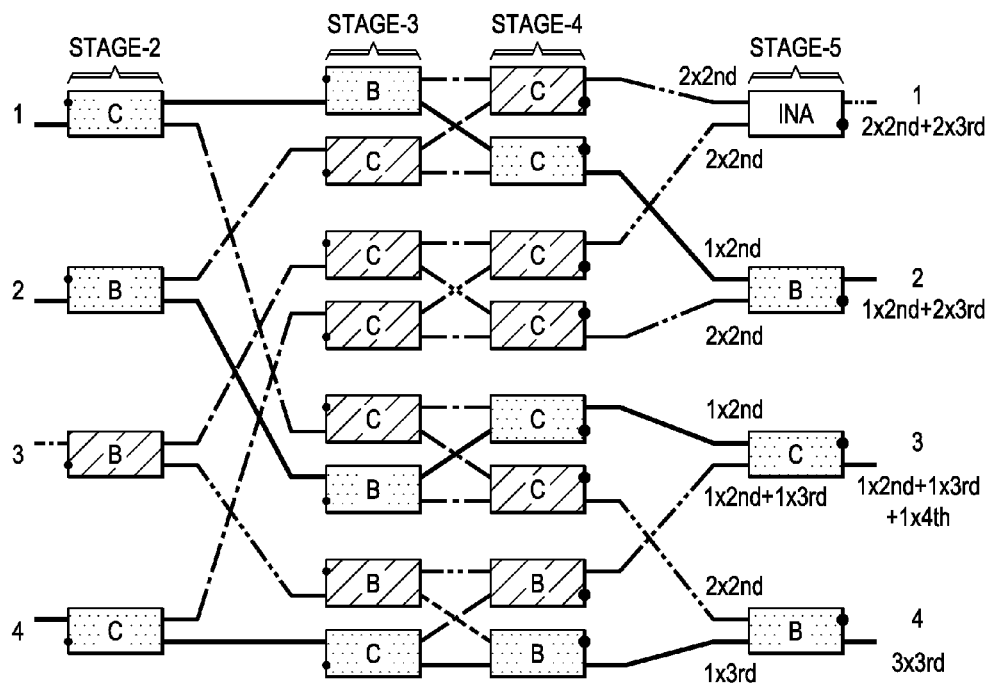
Figure 18J:
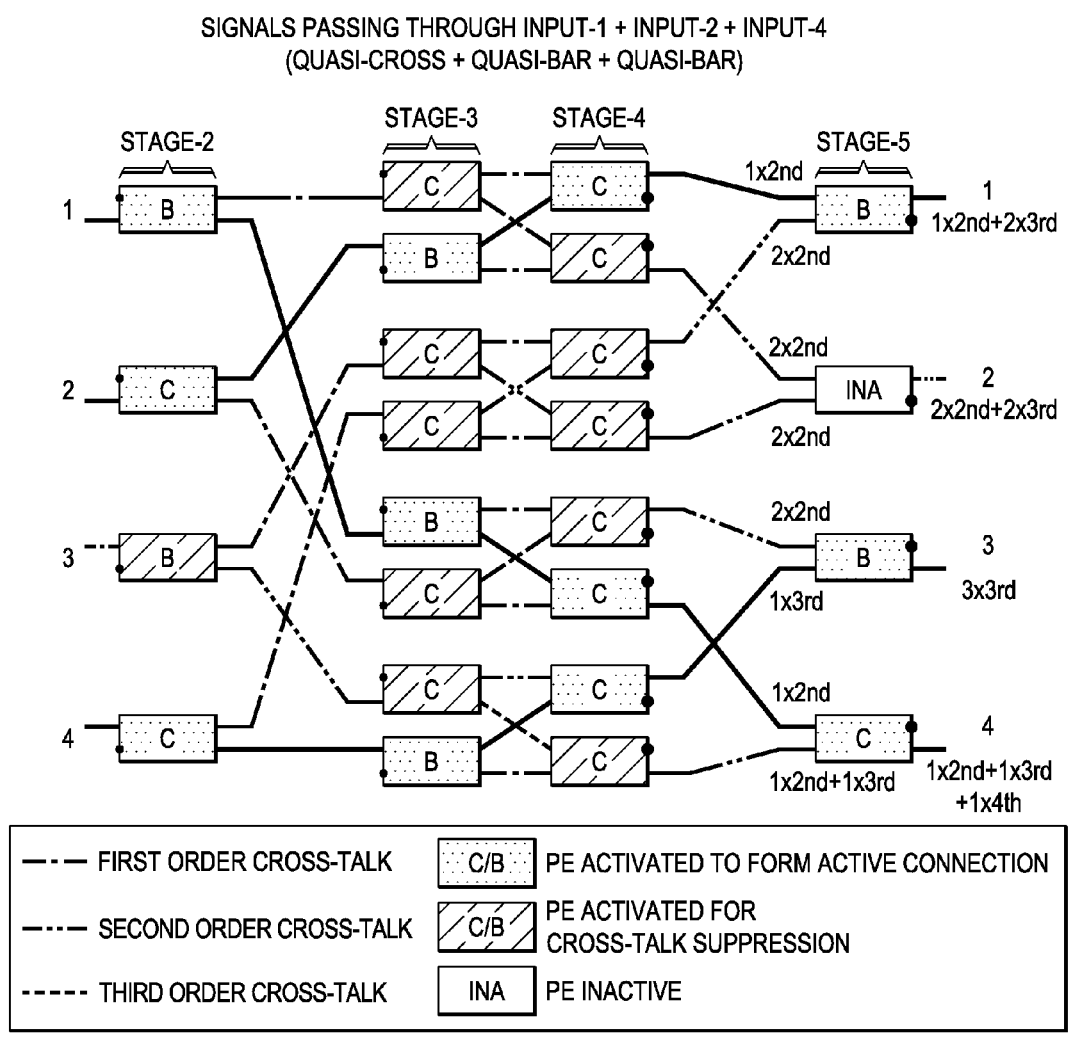
Figure 18K:
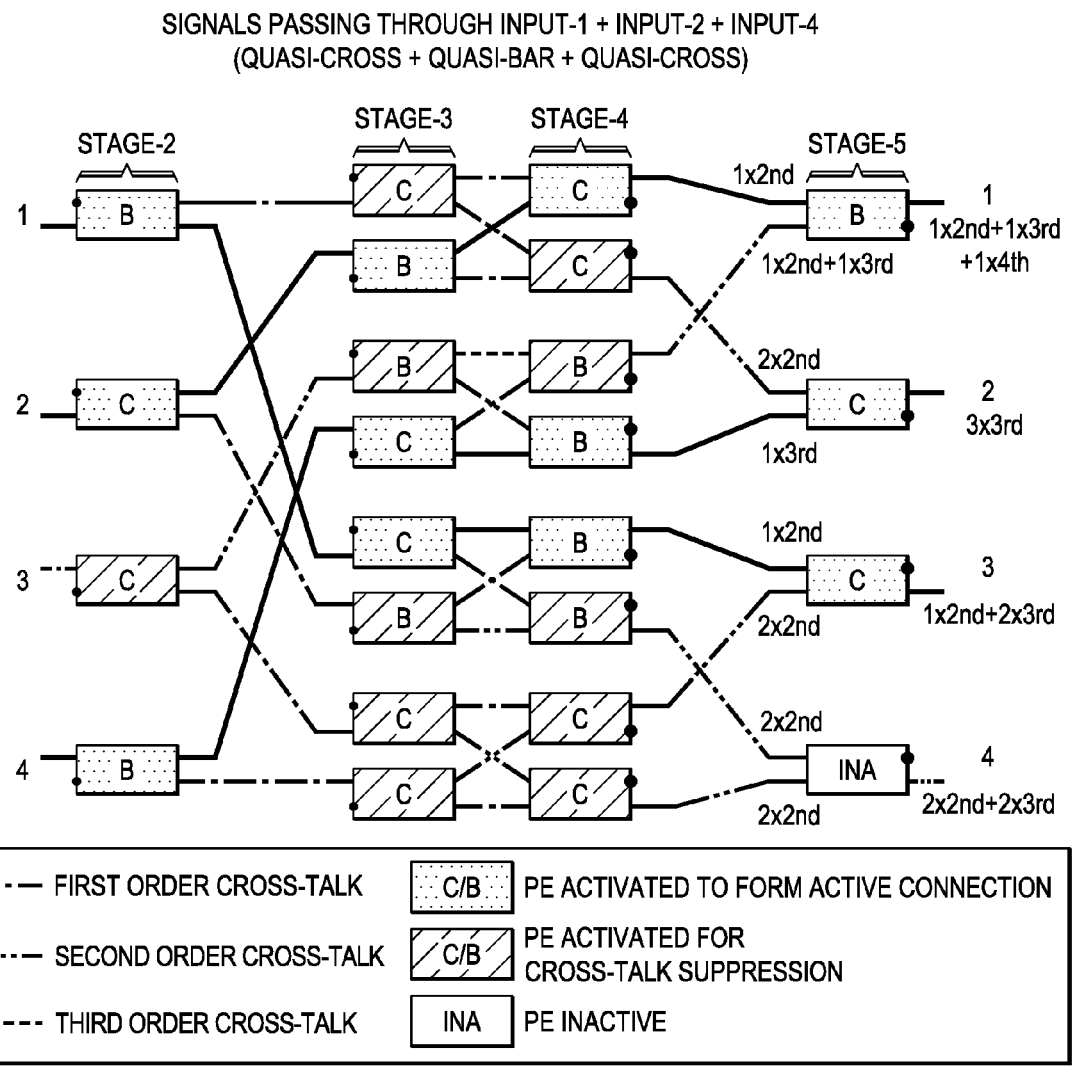
Figure 18L:
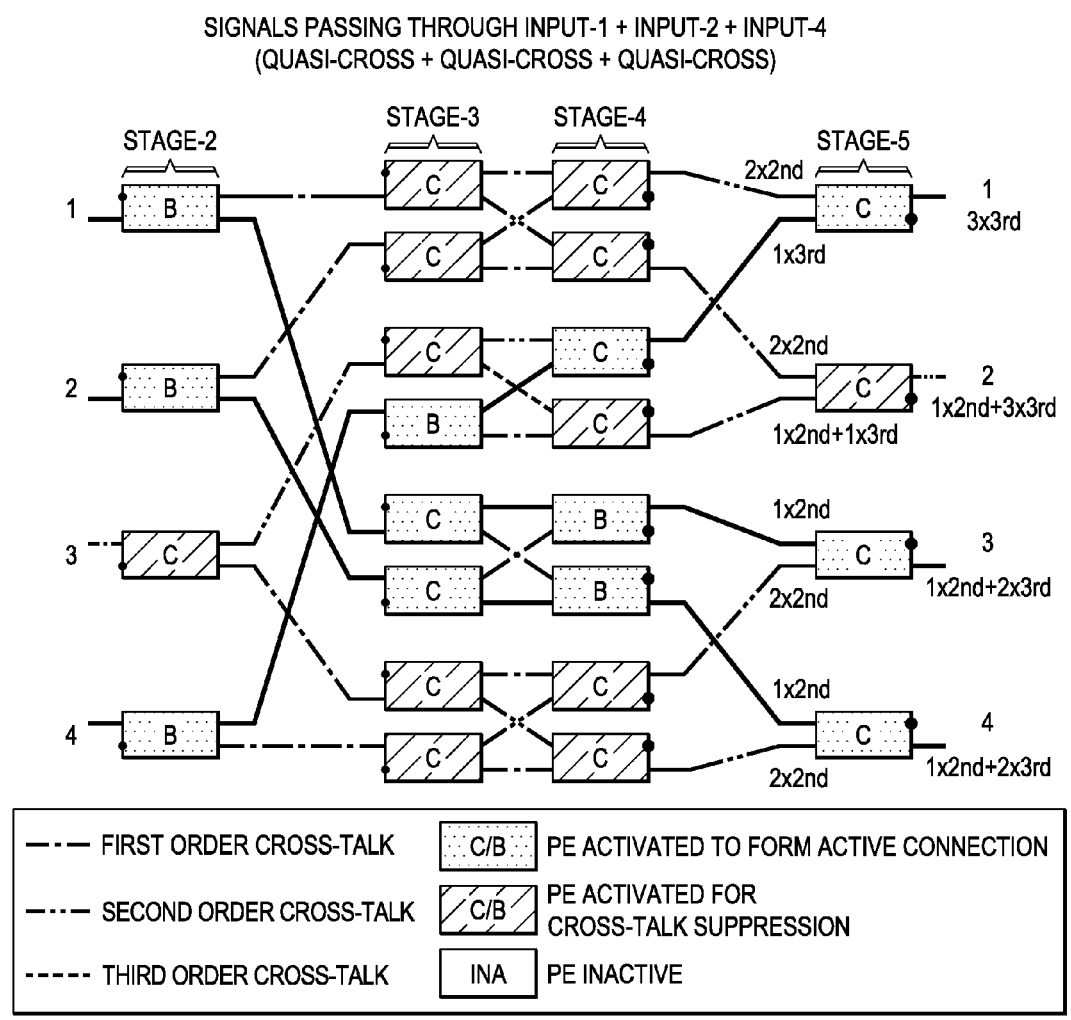

FIG. 15 illustrates the switching configurations if no signals pass through the 4×4 module. FIGS. 16A-16B illustrate the switching configurations if one signal passes through input-1 of the 4×4 module, and FIGS. 16C-16D illustrate the switching configurations if one signal passes through input-2 of the 4×4 module. The switching configurations for when one signal passes through the input-3 or the input-4 can be derived from FIGS. 16A-16D because the 4×4 module is symmetric about the dashed line shown in FIG. 14. This property greatly reduces the analyzing work of 4×4 modules. For example, switching configurations for the case when one signal passes through input port-1 can be used to derive switching configurations for a case when one signal passes through input port-4. FIGS. 17A-17P illustrate switching configurations when two signals pass through the 4×4 module. FIGS. 18A-18L illustrate switching configurations when three signals pass through the 4×4 module. FIGS. 19A-19H illustrate the various switching configurations for the 2×2 modules.

As discussed herein, the term "anear" may refer to the nearby port number of a given port number in set {1,2} or {3,4}. For example, the 1's anear is 2, the 3's anear is 4. As discussed herein, the term "quasi-bar" may refer to a signal's input port being connected to the adjacent output port, e.g., when a signal's input number belongs to {1,2} and output number belongs to {1,2}, or when the signal's input number belongs to {3,4} and output number belongs to {3,4}. As discussed herein, the term "quasi-cross" may refer to a signal's input port being connected to the opposite output port, e.g., when a signal's input number belongs to {1,2} and output number belongs to {3,4}, or when the signal's input number belongs to {3,4} and output number belongs to {1,2}. In one embodiment, the rules determining the switching configurations for photonic elements in stage-2 and stage-5 are summarized as follows:

If no signal passes through the 4×4 module, then all idle cells are set to cross.

If one signal passes through the 4×4 module, then the idle cells in column 2 are set in the following manner: the connected cell and its anear idle cell have the inverse state mutually, and the other idle cells are set to cross. Idle cells in column 5 are set in the following manner: If the connected cell is set to bar, then its anear idle cell is set to cross and the other idle cells are inactive; if the connected cell is set to cross, then the remaining three idle cells are set to cross.

If two signals pass through the 4×4 module over (input-1, input-2) or (input-3, input-4), then idle cells in column 2 are set to cross, and idle cells in column are set as follows: If both connected cells are bar, the remaining two idle cells are inactive; If both connected cells are cross, then the remaining two idle cells are set to bar; If the two connected cells have different state, then the idle cell anear to the bar-configured connected cell is set to cross and the idle cell anear to the cross-configured connected cell is inactive.

If two signals pass through the 4×4 module over (input-1, input-3) or (input-1, input-4), (input-2, input-3) or (input-2, input-4), then idle cells in column 2 are set to the inverse state of their anear connected cell respectively, and idle cells in column 5 are set as follows: if the two connected cells have the same state, their anear cells both have that state; If the two connected cells have different states, the remaining two idle cells are inactive.

If three signals pass through the 4×4 module, then the idle cell in column 2 is set to the inverse state of its anear connected cell, and the idle cells in column 5 are set as follows: If the three connected cells have same state mutually, then the idle cell has that state; If the three connected cells do not have same state mutually, the idle cell is inactive.

Figure 20:
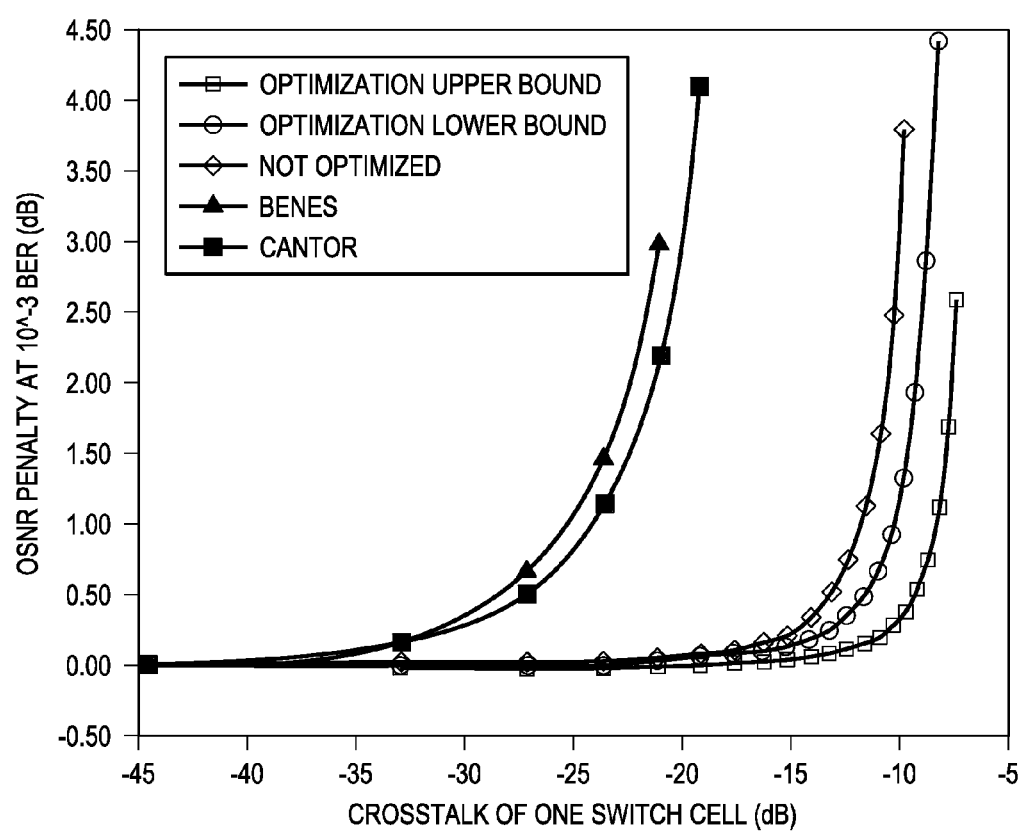
FIG. 20 illustrates a graph of crosstalk penalties for different phonic switching architectures and different levels of element crosstalk.

Aspects of this disclosure increase the manufacturing tolerances for photonic elements and/or photonic switching fabrics. FIG. 20 illustrates a graph showing the relationship between Optical Signal to Noise Ratio (OSNR) penalties for various photonic switch fabrics having different quality cells. The three lines showing the lowest OSNR penalty represent an N×N photonic switching architecture with varying degrees of crosstalk optimization, while the other lines show the OSNR penalty for Benes and Cantor architectures. For the purpose of comparison, assume that a switching fabric is being manufactured for a service provider (or customer) that desires an OSNR penalty of less than one decibel (dB). If photonic elements having an element crosstalk of −10 dB are used, then aspects of this disclosure allow the OSNR penalty for an N×N photonic switching architecture to be reduced from 3 dB (no optimization) to between 1 dB and 0.2 dB (with different levels of crosstalk optimization). If photonic elements having an element crosstalk of −12 dB are used, then aspects of this disclosure allow the OSNR penalty of an N×N photonic switching architecture to be reduced from 1 dB (no crosstalk optimization) to less than 0.1 dB (full cross-talk optimization). If −10 dB or −12 dB photonic elements are used, it may be difficult or impossible to manufacture a photonic switching fabric that meets the <1 dB performance requirement with a Benes or Cantor architectures.

Figure 21:
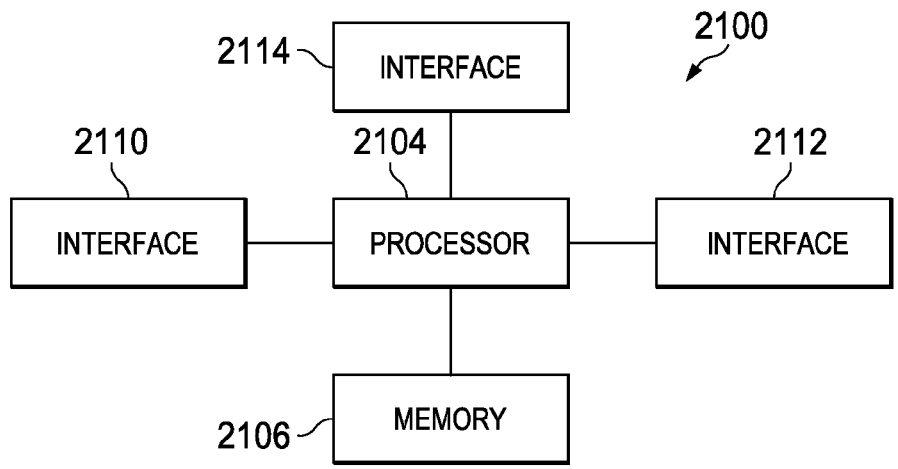
FIG. 21 illustrates a diagram of an embodiment device for performing aspects of this disclosure.

FIG. 21 illustrates a block diagram of an embodiment of a device 2100 for performing methods and techniques described herein. The device 2100 may include a processor 2104, a memory 2106, and a plurality of interfaces 2110, 2112, 2114, which may (or may not) be arranged as shown in FIG. 21. The processor 2104 may be any component capable of performing computations and/or other processing related tasks, and the memory 2106 may be any component capable of storing programming and/or instructions for the processor 2104. The interfaces 2110, 2112, and 2114 may be any component or collection of components that allows the communications device 2100 to communicate with other devices.

Figure 22:
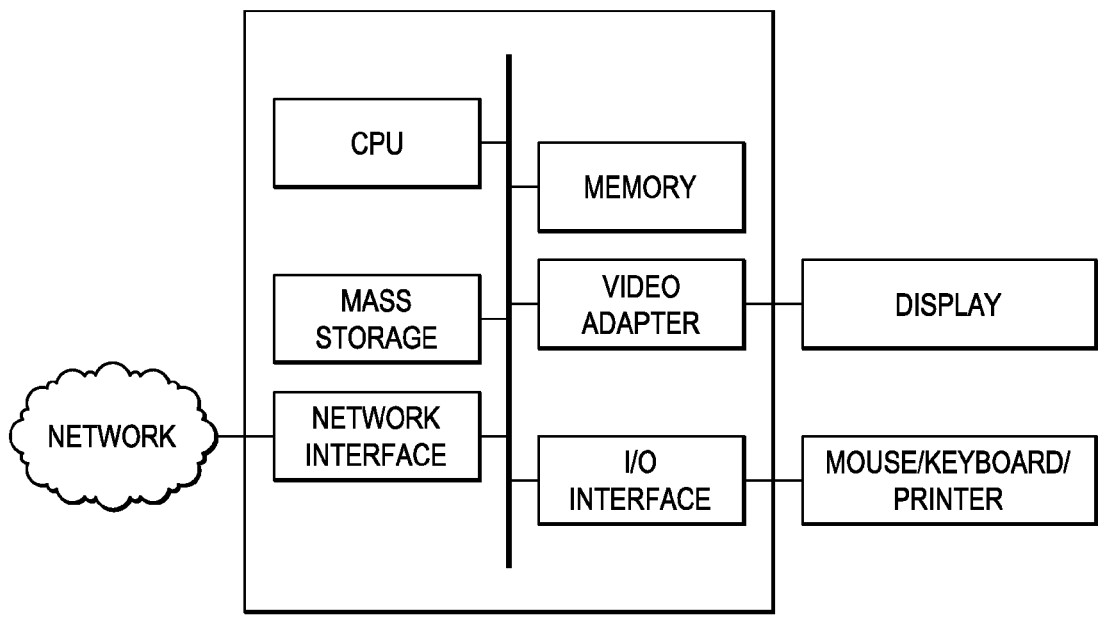
FIG. 22 illustrates a diagram of an embodiment processing system for performing aspects of this disclosure.

FIG. 22 is a block diagram of such a processing system. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The implementation of the bus can assume a silicon photonic connectivity described in the embodiment. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for reducing crosstalk, the method comprising:
   establishing active connections between input ports and output ports of a photonic switching fabric, wherein the photonic switching fabric is composed of a plurality of photonic elements, and wherein establishing the active connections comprises activating photonic elements in the plurality of photonic elements that are positioned along connection paths of the active connections; and
   suppressing, by a controller, crosstalk in the photonic switching fabric by activating at least some unused photonic elements in the plurality of photonic elements, wherein the unused photonic elements are excluded from the connection paths of the active connections, and wherein the activated unused photonic elements have closed switching configurations that are selected by the controller to mitigate crosstalk in the photonic switching fabric.

2. The method of claim 1, wherein activating at least some of the unused photonic elements prevents first order crosstalk from propagating over at least some inactive connections of the photonic switching fabric.

3. The method of claim 1, wherein activating at least some of the unused photonic elements prevents second order crosstalk from propagating over at least some inactive connections of the photonic switching fabric.

4. The method of claim 1, wherein activating at least some of the unused photonic elements
   reduces the order of crosstalk experienced over the output ports of the photonic switching fabric.

5. The method of claim 1, wherein suppressing crosstalk in the photonic switching fabric comprises:
   identifying a desired level of crosstalk suppression for the photonic switching fabric;
   selecting a number of unused photonic elements to activate in accordance with the desired level of crosstalk suppression; and
   activating the selected number of unused photonic elements.

6. The method of claim 5, wherein the desired level of crosstalk suppression comprises an Optical Signal to Noise Ratio (OSNR) of the photonic switch fabric.

7. The method of claim 5, wherein different numbers of unused photonic elements are activated for different levels of crosstalk suppression.

8. The method of claim 1, wherein suppressing crosstalk in the photonic switching fabric comprises:
   determining that an amount of crosstalk in the switching fabric exceeds a threshold; and
   determining a number of unused photonic elements to activate in order to reduce the amount of crosstalk below the threshold; and
   activating the determined number of unused photonic elements.

9. The method of claim 8, wherein the amount of crosstalk in the switching fabric comprises an Optical Signal to Noise Ratio (OSNR) of the photonic switch fabric.

10. The method of claim 1, wherein suppressing crosstalk in the photonic switching fabric comprises:
   identifying a connection map specifying a pattern of active connections between the input ports and the output ports;
   identifying a cross-talk suppression map in accordance with the connection map, wherein the cross-talk suppression map specifies which unused photonic elements to activate in order to suppress crosstalk for the connection map; and
   activating unused photonic elements in accordance with the cross-talk suppression map.

11. The method of claim 10, wherein the cross-talk suppression map is pre-associated with the connection map.

12. The method of claim 11, wherein the cross-talk suppression map is a prior information.

13. The method of claim 1, wherein suppressing crosstalk in the photonic switching fabric comprises:
   identifying a connection map specifying a pattern of active connections between the input ports and the output ports;
   selecting one of a plurality of levels of crosstalk suppression for the photonic switching fabric;
   identifying a cross-talk suppression map in accordance with the connection map and the selected level of crosstalk suppression, wherein the cross-talk suppression map specifies which unused photonic elements to activate in order to achieve the selected level of crosstalk suppression for the connection map; and
   activating unused photonic elements in accordance with the cross-talk suppression map.

14. The method of claim 13, wherein different cross-talk suppression maps achieve different levels of crosstalk suppression for the connection map.

15. The method of claim 1, wherein suppressing crosstalk in the photonic switching fabric comprises:
   identifying a connection map specifying a pattern of active connections between the input ports and the output ports;
   selecting one of a plurality of power conservation levels for operating the photonic switching fabric;
   identifying a cross-talk suppression map in accordance with the connection map and the selected power conservation level, wherein the cross-talk suppression map specifies which unused photonic elements to activate in order to achieve the selected level of crosstalk suppression for the connection map; and
   activating unused photonic elements in accordance with the cross-talk suppression map.

16. The method of claim 15, wherein different numbers of unused photonic elements are activated for different power conservation levels.

17. The method of claim 15, wherein different power conservation levels achieve different levels of crosstalk suppression.

18. A controller comprising:
   a processor; and
   a computer readable storage medium storing programming for execution by the processor, the programming including instructions to:
   establish active connections between input ports and output ports of a photonic switching fabric, wherein the photonic switching fabric is composed of a plurality of photonic elements, and wherein establishing the active connections comprises activating photonic elements in the plurality of photonic elements that are positioned along connection paths of the active connections; and
   suppress crosstalk in the photonic switching fabric by activating at least some unused photonic elements in the plurality of photonic elements, wherein the unused photonic elements are excluded from the connection paths of the active connections, and wherein the activated unused photonic elements have closed switching configurations that are selected by the controller to mitigate crosstalk in the photonic switching fabric.

19. The controller of claim 18, wherein activating at least some of the unused photonic elements prevents first order crosstalk from propagating over at least some inactive connections of the photonic switching fabric.

20. The controller of claim 18, wherein activating at least some of the unused photonic elements prevents second order crosstalk from propagating over at least some inactive connections of the photonic switching fabric.

21. A photonic switching fabric comprising:
   a plurality of input ports;
   a plurality of output ports;
   a plurality of photonic elements coupled between the input ports and the output ports; and
   a control plane adapted to configure the photonic switching fabric in accordance with a connection map by activating used photonic elements in the plurality of photonic elements to establish active connections between the input ports and the output ports, and by activating at least some unused photonic elements in the plurality of photonic elements to suppress the propagation of crosstalk over the photonic switching fabric, wherein the activated unused photonic elements have closed switching configurations that are selected by the control plane to mitigate crosstalk in the photonic switching fabric.

22. The photonic switching fabric of claim 21, wherein the used photonic elements are positioned along connection paths of the active connections, and wherein the unused photonic elements are excluded from connection paths of the active connections.

23. The photonic switching fabric of claim 21, wherein the control plane is configured to activate different numbers of photonic elements for different levels of crosstalk suppression.

* * * * *